(12) United States Patent
Yamazaki et al.

(10) Patent No.: US 8,989,551 B2
(45) Date of Patent: Mar. 24, 2015

(54) CAPTIONED VIDEO PLAYBACK APPARATUS AND RECORDING MEDIUM

(71) Applicant: Lenovo Innovations Limited (Hong Kong), Quarry Bay, Hong Kong (HK)

(72) Inventors: Masahiro Yamazaki, Kanagawa (JP);
Tomochika Ozaki, Kanagawa (JP);
Mayumi Nakade, Kanagawa (JP);
Yukinori Asada, Kanagawa (JP);
Takashi Matsubara, Kanagawa (JP)

(73) Assignee: Lenovo Innovations Limited (Hong Kong), Hong Kong (HK)

( * ) Notice: Subject to any disclaimer, the term of this patent is extended or adjusted under 35 U.S.C. 154(b) by 253 days.

(21) Appl. No.: 13/683,293

(22) Filed: Nov. 21, 2012

(65) Prior Publication Data

US 2013/0077939 A1    Mar. 28, 2013

Related U.S. Application Data

(62) Division of application No. 12/154,026, filed on May 19, 2008, now Pat. No. 8,346,049.

(30) Foreign Application Priority Data

May 21, 2007  (JP) ................. 2007-133865
Jun. 15, 2007  (JP) ................. 2007-159510
Aug. 3, 2007  (JP) ................. 2007-203612

(51) Int. Cl.
*G06F 21/00* (2013.01)
*H04N 5/93* (2006.01)
(Continued)

(52) U.S. Cl.
CPC ............. *H04N 5/93* (2013.01); *H04N 5/44513* (2013.01); *H04N 5/44591* (2013.01); *H04N 5/45* (2013.01); *H04N 21/4884* (2013.01); *H04N 5/775* (2013.01); *H04N 21/41407* (2013.01); *H04N 21/4307* (2013.01); *H04N 21/4316* (2013.01);
(Continued)

(58) Field of Classification Search
USPC ....................................... 386/69, 95; 348/564
See application file for complete search history.

(56) References Cited

U.S. PATENT DOCUMENTS

| | | |
|---|---|---|
| 5,537,151 A | 7/1996 | Orr et al. |
| 2002/0154219 A1 | 10/2002 | Dieterich et al. |

(Continued)

FOREIGN PATENT DOCUMENTS

| | | |
|---|---|---|
| JP | 2003-018491 | 1/2003 |
| JP | 2003-333504 | 11/2003 |

(Continued)

*Primary Examiner* — Jeffrey Pwu
*Assistant Examiner* — Thong Truong

(57) ABSTRACT

Disclosed is a captioned video playback apparatus comprising a storage unit that stores a caption signal defining a plurality of caption lines and a video signal defining a plurality of video images in association with a playback timing; a caption select unit that selects one of the plurality of caption lines defined by the caption signal stored in the storage unit; a caption playback unit that plays back the caption line selected by the caption select unit; a video playback unit that plays back the video signal stored in the storage unit; and a mode changeover unit that changes between a caption view mode for playing back a caption line selected by the caption select unit and a video image corresponding to the caption line using the caption playback unit and the video playback unit, and a normal view mode for playing back a video image using the video playback unit.

16 Claims, 45 Drawing Sheets

(51) Int. Cl.
*H04N 5/445* (2011.01)
*H04N 5/45* (2011.01)
*H04N 21/488* (2011.01)
*H04N 5/775* (2006.01)
*H04N 21/414* (2011.01)
*H04N 21/43* (2011.01)
*H04N 21/431* (2011.01)
*H04N 21/432* (2011.01)
*H04N 21/434* (2011.01)
*H04N 21/4402* (2011.01)
*H04N 21/472* (2011.01)
*H04N 21/482* (2011.01)
*H04N 21/61* (2011.01)
*H04M 1/725* (2006.01)
*H04N 21/845* (2011.01)

(52) U.S. Cl.
CPC ....... *H04N 21/4325* (2013.01); *H04N 21/4348* (2013.01); *H04N 21/440263* (2013.01); *H04N 21/47217* (2013.01); *H04N 21/482* (2013.01); *H04N 21/6112* (2013.01); *H04M 1/72522* (2013.01); *H04N 21/8455* (2013.01)
USPC .............................. 386/95; 386/69; 348/564

(56) References Cited

U.S. PATENT DOCUMENTS

| | | | |
|---|---|---|---|
| 2003/0039469 A1* | 2/2003 | Kim | 386/69 |
| 2006/0285821 A1 | 12/2006 | Kim et al. | |
| 2007/0010292 A1 | 1/2007 | Vetelainen et al. | |

FOREIGN PATENT DOCUMENTS

| | | |
|---|---|---|
| JP | 2004-080476 | 3/2004 |
| JP | 2005-299413 | 8/2005 |
| JP | 2005-303743 | 10/2005 |
| JP | 2006-081223 | 3/2006 |
| JP | 2006-165772 | 6/2006 |
| JP | 2006-279312 | 10/2006 |

* cited by examiner

MOVE CURSOR DOWN ↓  ↑ MOVE CURSOR UP

CONTENTS LIST DATA    124

| TITLE | RECORDING DATE | GENRE |
|---|---|---|
| STORY OF MOON | 2007/01/01 11:20—11:30 | DRAMA |
| BIRD WALK | 2006/12/03 8:20—8:30 | ACTION |
| EXPLOSIVE BROTHER | 2006/08/03 12:40—13:30 | VARIETY |
| .... | .... | .... |
| DRIVE IN CAR | 2007/02/02 21:20—22:15 | HISTORY |

CAPTION MANAGEMENT DATA

CAPTION MANAGEMENT DATA 122b

| CAPTION PLAYBACK TIME (TMn) | CAPTION LINE (Mn) | NUMBER OF CHARACTERS (KZn) | PROGRESS RATE (RTn) |
|---|---|---|---|
| 00:00:00 | GOOD MORNING. | 5 | 0 |
| 00:00:20 | GOOD AFTERNOON. | 6 | 0.001 |
| 00:01:03 | GOOD EVENING. | 6 | 0.01 |
| 00:25:21 | GOOD-BYE. | 6 | 0.24 |
| 01:16:38 | GOOD NIGHT. | 5 | 0.51 |
| ..... | ..... | .... | .... |
| 02:10:10 | IT WAS A NICE DAY TODAY. HOPE TOMORROW WILL BE FINE TOO. | 24 | 0.99 | n: 1~N

FIG. 41

CAPTION MANAGEMENT DATA 122c

| CAPTION DISPLAY TIME (TMn) | CAPTION LINE (Mn) |
|---|---|
| 00:00:00 | (TOP OF PROGRAM) |
| 00:00:04 | GOOD MORNING. |
| 00:00:09 | GOOD AFTERNOON. |
| 00:00:13 | GOOD EVENING. |
| 00:01:43 | GOOD-BYE. |
| 00:01:43 | GOOD NIGHT. |
| ..... | ..... |
| 02:10:10 | IT WAS A NICE DAY TODAY.<br>HOPE TOMORROW WILL BE FINE TOO. |

FIG. 42

CAPTIONED VIDEO PLAYBACK APPARATUS AND RECORDING MEDIUM

CROSS-REFERENCE TO RELATED APPLICATIONS

This patent application is a Divisional Application of U.S. patent application Ser. No. 12/154,026 filed May 19, 2008, which claims priority from prior Japanese Patent Applications No. 2007-133865 filed May 21, 2007, No. 2007-159510 filed Jun. 15, 2007 and No. 2007-203612 filed Aug. 3, 2007, the disclosure contents of which are hereby incorporated herein by reference in their entity.

BACKGROUND OF THE INVENTION

1. Field of the Invention

The present invention relates to a captioned video playback apparatus which processes caption lines and video images.

2. Description of the Related Art

Unexamined Japanese Patent Application KOKAI Publication No. 2003-18491 discloses a caption display device. The caption display device stores a video image and a plurality of caption lines in the video image, and displays any caption line, when selected by a user, and a video image corresponding to the selected caption line.

The caption display device displays a video image and a plurality of caption lines on the same screen. When the display area for a video image is limited, therefore, the display area for a caption line is limited too. Depending on the number of characters in a caption line, therefore, the visibility and operability of the screen, when a user views a stream or selects a caption, become degraded. This problem becomes noticeable in case of portable terminals which are demanded of downsizing and have a limited screen size for their portability feature.

The caption display device also displays a video image and a caption line corresponding to the displayed video image as well as previous caption lines to the displayed caption line (history of caption lines). This limits information which is acquired from caption lines and a video image.

SUMMARY OF THE INVENTION

Accordingly, it is an object of the present invention to improve the convenience of a user when viewing a captioned video.

It is another object of the invention to provide an apparatus with a higher visibility of a display image and a higher operability.

It is a further object of the invention to provide an apparatus capable of adequately playing back a video image corresponding to a caption line.

To achieve the object, according to a first aspect of the invention, there is provided a captioned video playback apparatus comprising:

a storage unit that stores a caption signal defining a plurality of caption lines and a video signal defining a plurality of video images in association with a playback timing;

a caption select unit that selects one of the plurality of caption lines defined by the caption signal stored in the storage unit;

a caption playback unit that plays back the caption line selected by the caption select unit;

a video playback unit that plays back the video signal stored in the storage unit; and a mode changeover unit that changes between a caption view mode for playing back a caption line selected by the caption select unit and a video image corresponding to the caption line using the caption playback unit and the video playback unit, and a normal view mode for playing back a video image using the video playback unit.

To achieve the object, according to a second aspect of the invention, there is provided a captioned video playback apparatus comprising:

a captioned video storage unit that stores a caption signal defining a plurality of caption lines and a video signal defining a plurality of video images in association with a playback timing;

a caption playback unit that plays back at least two of the plurality of caption lines defined by the caption signal stored in the captioned video storage unit;

a video extraction unit that extracts a video image given with a playback timing corresponding to a playback timing given to each caption line played back by the caption playback unit from the video image defined by the video signal stored in the captioned video storage unit; and a video playback unit that plays back and displays the video image extracted by the video extraction unit.

To achieve the object, according to a third aspect of the invention, there is provided a captioned video playback apparatus comprising:

a storage unit that stores a caption signal defining a plurality of caption lines and a video signal defining a plurality of video images in association with each other in terms of a playback order;

a caption playback unit that plays back at least two of the plurality of caption lines defined by the caption signal;

a timer unit that measures a time and detects passing of a predetermined time from the beginning of the playback of the caption line which is being played back by the caption playback unit;

a caption changeover unit that controls the caption playback unit to play back a caption line having a next playback order to the caption line currently played back in place of the currently played caption line when the timer unit has detected passing of the predetermined time;

a video playback unit that plays back a video image having a playback order corresponding to a caption line currently played back by the caption playback unit from individual video images defined by the video signal; and a list display unit that generates and displays a list of the caption line currently played back by the caption playback unit, a caption line whose playback order precedes that of the currently played caption line by a predetermined order and a caption line whose playback order follows that of the currently played caption line by a predetermined order.

The captioned video playback apparatus according to the first aspect of the present invention can adequately change over the state where both (a list of) caption lines and a video image are played back and the state where a video image is played back, thus improving the visibility and operability.

The captioned video playback apparatus according to the second aspect of the present invention can play back a plurality of video images and corresponding caption lines in parallel.

The captioned video playback apparatus according to the third aspect of the present invention automatically changes a caption line and a video image every time a predetermined time elapses.

BRIEF DESCRIPTION OF THE DRAWINGS

These objects and other objects and advantages of the present invention will become more apparent upon reading of the following detailed description and the accompanying drawings in which:

FIG. 28 is a diagram showing an example of a data structure of contents list data;

FIG. 41 is a diagram showing a third example of the data structure of caption management data;

FIG. 42 is a diagram showing a fourth example of the data structure of caption management data;

DETAILED DESCRIPTION OF THE PREFERRED EMBODIMENTS

First Embodiment

A captioned video playback apparatus according to an embodiment of the present invention will be described below. The embodiment is an example of a captioned video playback apparatus adapted to a cell phone 1 having a content receiving capability. The cell phone 1 can receive contents according to an arbitrary data transform system. The cell phone 1 herein receives one-segment broadcasting.

Figure 1:
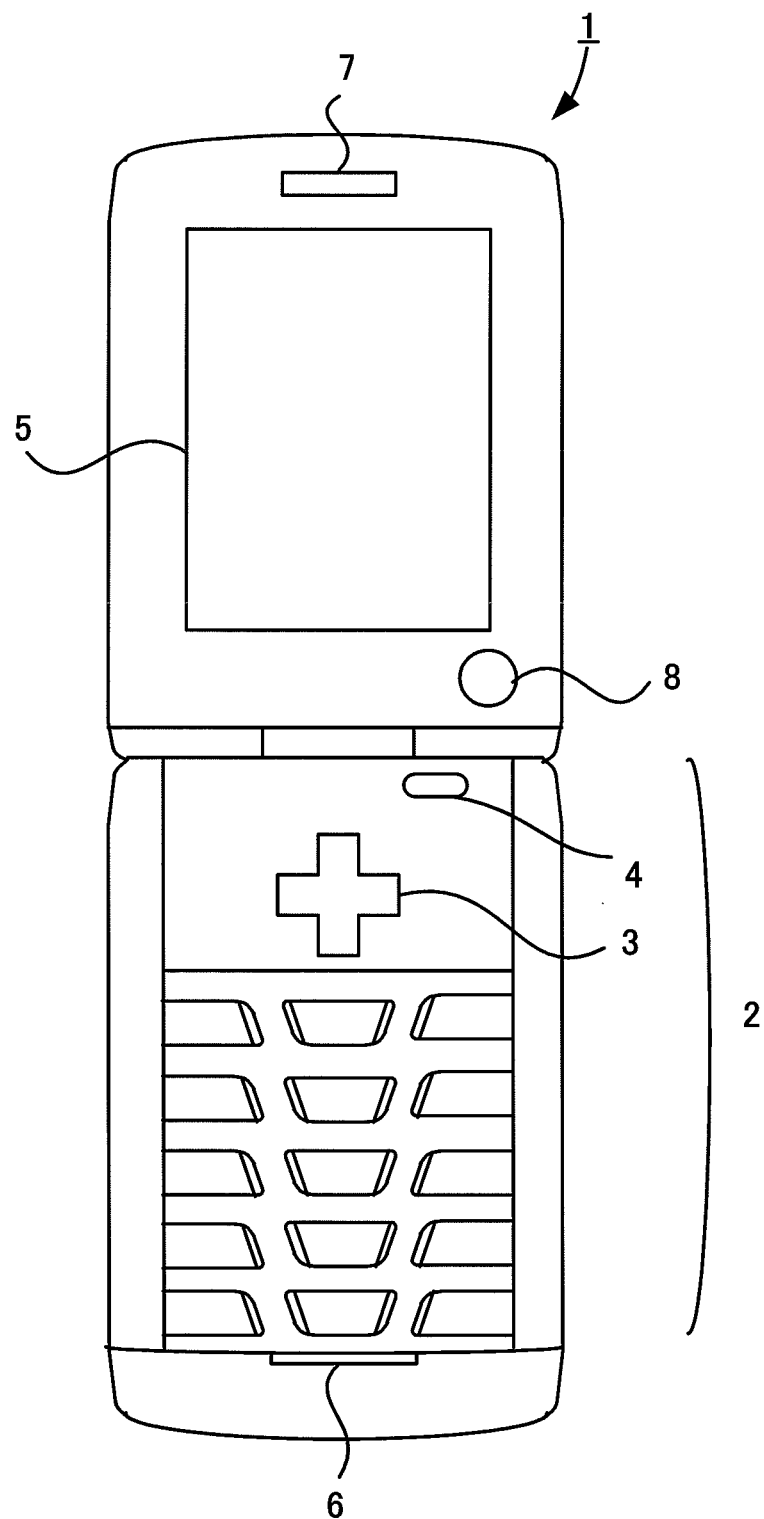
FIG. 1 is an external view showing a cell phone according to an embodiment of the invention.

The cell phone 1, which has a content recording/playback capability, is of a foldable type including a keyboard 2, a display panel 5, etc. as shown in FIG. 1.

The keyboard 2 has a cursor key 3, a display changeover button 4 and other various buttons. The keyboard 2 when operated by a user inputs various data and instructions. For example, the keyboard 2 is used to input instructions to play back and terminate a captioned video image, and enable or disable display of a list of captions or subtitles (hereinafter "caption list").

The display panel 5 is a dot matrix type LCD (Liquid Crystal Display) panel or the like, and displays data (e.g., captioned video image, caption list, etc.).

The cell phone 1 has a talk microphone 6, a talk speaker 7, a speaker 8 and so forth arranged thereon. The talk microphone 6 inputs speech sounds. The talk speaker 7 outputs received sounds. The speaker 8 outputs sounds or the like at the time of playing back contents.

Figure 2:
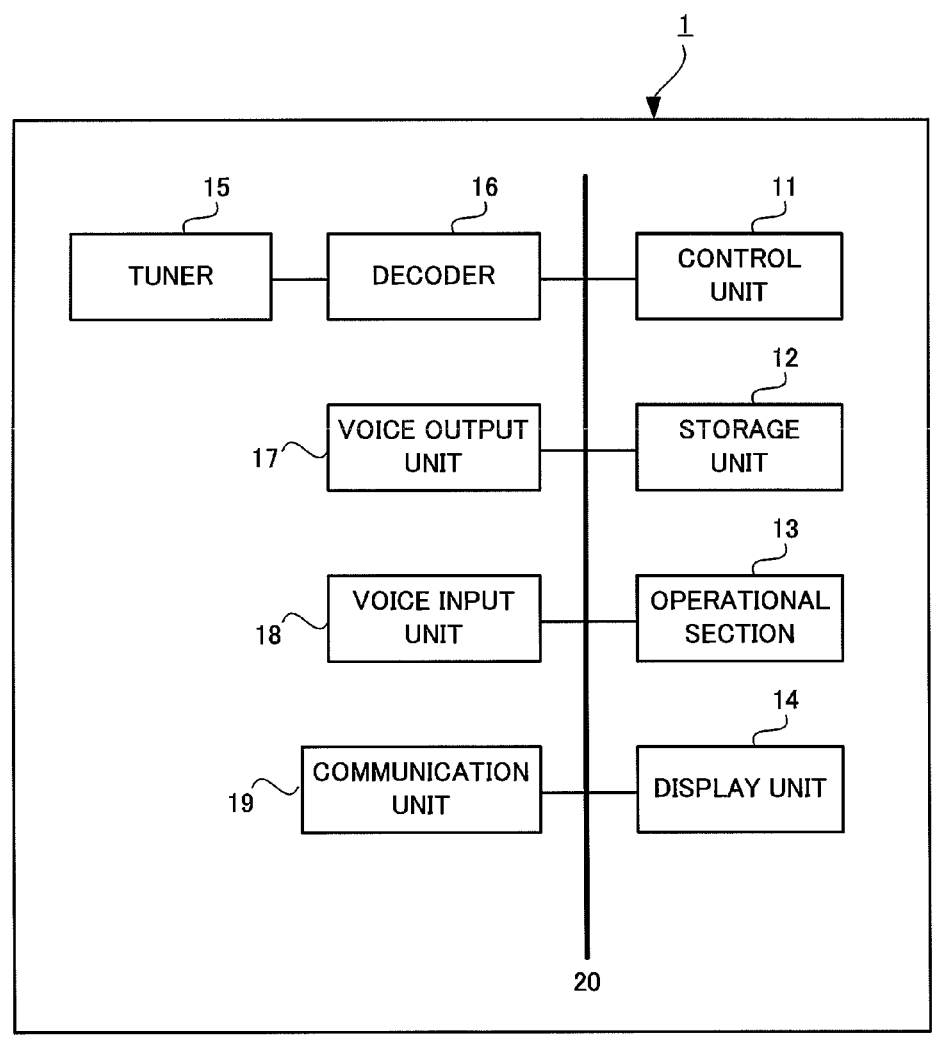
FIG. 2 is a block diagram showing the configuration of the cell phone as shown in FIG. 1.

The circuit configuration of the cell phone 1 will be described. The cell phone 1, as shown in FIG. 2, has a control unit 11, a storage unit 12, an operational section 13, a display unit 14, a tuner 15, a decoder 16, a voice output unit 17, a voice input unit 18, a communication unit 19 and a bus 20.

The control unit 11 includes a microprocessor unit or the like, and controls the general operation of the cell phone 1. For example, the control unit 11 controls the start and termination of playback of recorded contents (video images). The control unit 11 displays data (caption line, video image, caption list, etc.) on the display panel 5 via the display unit 14.

The storage unit 12 stores various kinds of data. For example, the storage unit 12 stores an operation control program for the control unit 11. The storage unit 12 includes a memory incorporated in the cell phone 1 and/or a dismountable external memory. The operational section 13 having the keyboard 2 supplies an operation signal to the control unit 11 in response to a user's operation.

The display unit 14 includes the display panel 5, a driver circuit, etc., and displays an image on the display panel 5 under the control of the control unit 11. The tuner 15 demodulates a one-segment broadcast content received through an antenna, and outputs a demodulated signal (baseband signal) to the decoder 16. The decoder 16 decodes the content output from the tuner 15, and outputs the decoded content.

The voice output unit 17 includes the talk speaker 7, the speaker 8, a DAC (Digital Analog Converter), and so forth. For example, the voice output unit 17 performs DA conversion of an audio signal of the content played back by the control unit 11, and generates the resultant signal through the speaker 8. The voice input unit 18 collects audio signals and supplies them to the communication unit 19 at the time of talking or so. The communication unit 19 transmits and receives a speech, various kinds of data and the like via a base station. The bus 20 transfers data among the individual units.

A description will now be given of information necessary for a caption list display operation which characterizes the embodiment. The storage unit 12 shown in FIG. 2 stores content-recorded data 121, caption management data 122 and seek-point management information 123 as shown in FIG. 3A.

Figure 3:
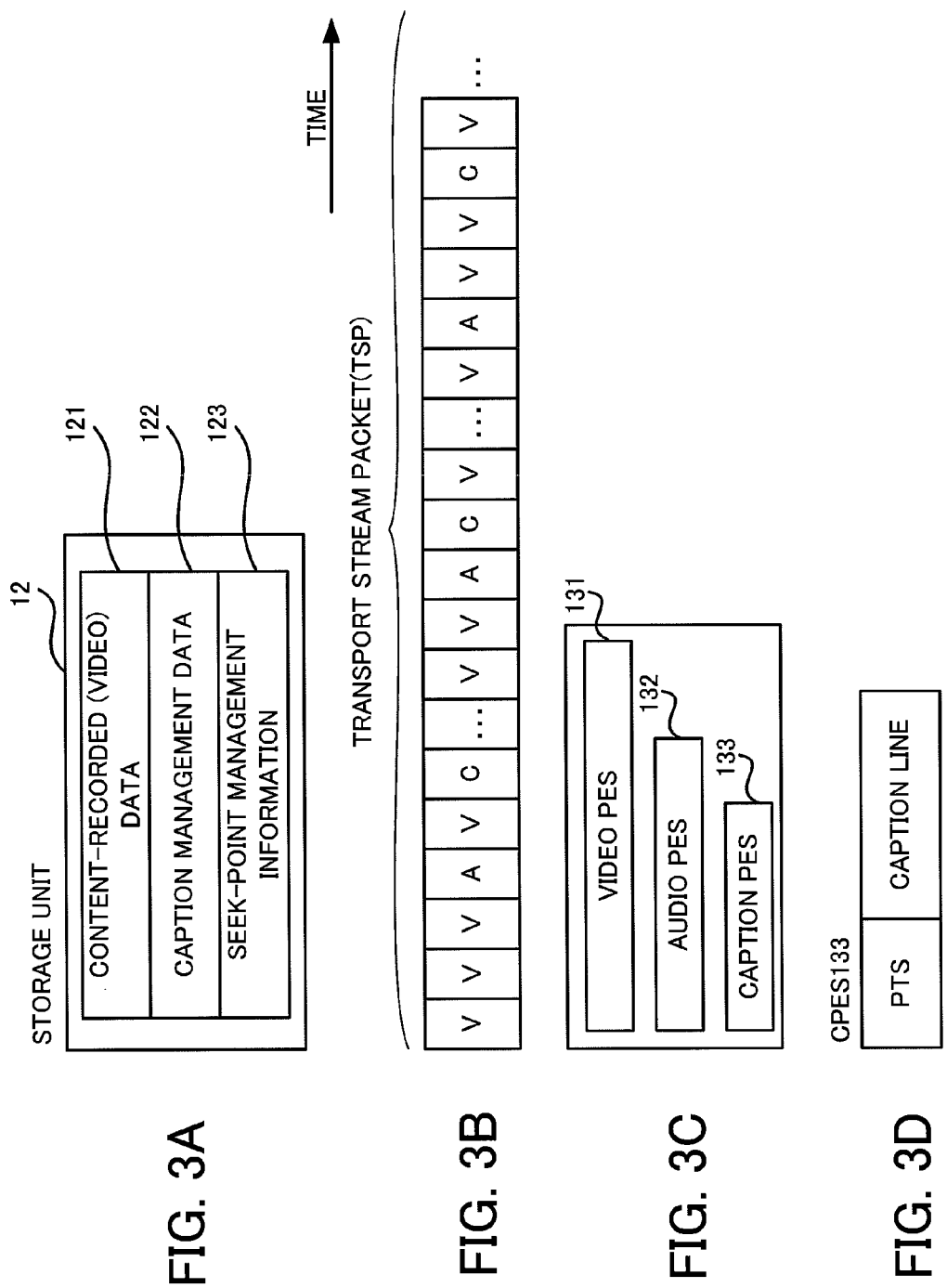
FIG. 3A is a diagram showing an example of data to be stored in a storage unit.
FIG. 3B is a diagram exemplifying the structure of a TSP (Transport Stream Packet)
FIG. 3C is a diagram exemplifying the structure of content data.
FIG. 3D is a diagram exemplifying the structure of a caption PES (Packetized Elementary Stream)

A one-segment broadcast content (TV signal) is comprised of a TSP (Transport Stream Packet) as shown in FIG. 3B. As illustrated, the TSP is constituted by a stream of a plurality of packets. A plurality of packets include a video packet V (containing VI and VP to be described later) storing video data in a payload, an audio packet Ap storing audio data in a payload, and a caption packet Cp storing caption data in a payload.

The control unit 11 classifies individual packets constituting the received TSP according to the types of data stored therein. The control unit 11 rearranges the order of the classified packets based on packet numbers given to the individual packets to generate a video PES (Packetized Elementary Stream) 131, an audio PES 132, and a caption PES 133 shown in FIG. 3C. The control unit 11 stores those PESs into the storage unit 12 as content-recorded data 121.

The video PES 131 is compressed coded data of a packetized video frame, and includes data defining each video frame (video image). Each video frame includes data indicating its playback timing.

A TSP in one-segment broadcasting is data conforming to the predictive coding system. Therefore, the video PES 131 includes an IDR (Instantaneous Decoder Refresh) frame (corresponding to an independent video packet VI) that does not refer to other video frames, and a P frame (corresponding to a reference video packet VP) that refers to an IDR frame which is played back earlier than its own playback timing.

In one-segment broadcasting, the frame rate of a video frame is 15 frames/sec.

The audio PES 132 is packetized compressed coded audio data.

The caption PES 133 is packetized compressed coded data of a caption line. The caption PES 133 includes information needed to generate the caption management data 122. For example, as shown in FIG. 3D, the caption PES 133 has information indicating caption lines Mn (n: 1 to N, N: the number of caption PESs in the content-recorded data 121), caption playback timings TMn (n: 1 to N) and control codes CSn (n: 1 to N).

The "caption line Mn" is data which indicates the content of a caption line of a captioned video image and is to be stored as the Mn of the caption management data 122. The "caption playback timing TMn" indicates the timing of playing back a caption line Mn and is presented by a PTS (Presentation Time Stamp) unit. In one-segment broadcasting, each caption line is generated once every 15 seconds.

Figure 4:
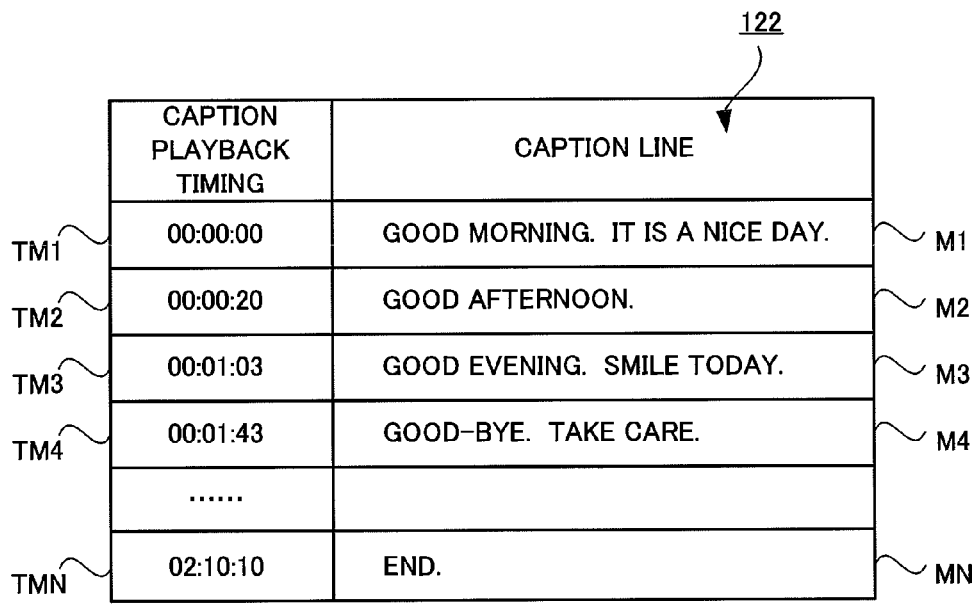
FIG. 4 is a diagram showing an example of a data structure of caption management data.

As shown in FIG. 4, the caption management data 122 associates a "caption playback timing (display time) TMn" with a "caption line Mn". The "caption playback timing TMn" indicates the time when the Mn is displayed. In the embodiment, the caption playback timing TMn is an offset time with the playback start time for the content-recorded data 121 being a reference. The "caption line Mn" indicates the content of a caption line of a captioned video image. The caption playback timing TMn may be a frame number or the like.

Figure 5:
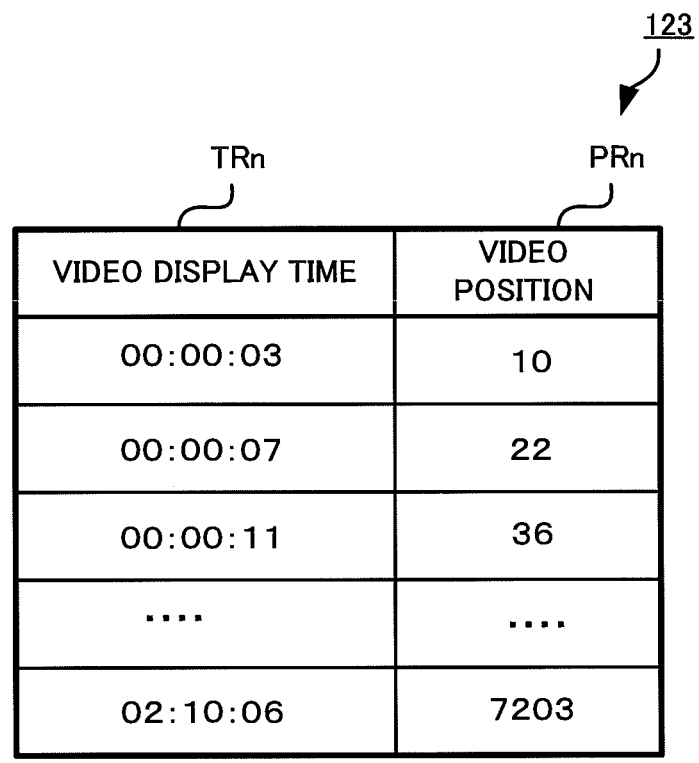
FIG. 5 is a diagram showing an example of a data structure of seek-point management information.

The seek-point management information 123, as shown in FIG. 5, associates a video playback timing TRn (n: 1 to N) of each frame with a video position PRn (n: 1 to N).

The "video playback timing TRn" indicates the time when each video frame is displayed, and is displayed by the PTS unit. The "video position PRn" is an index indicating the position of a video frame in the content-recorded data 121. In the embodiment, the "video position PRn" is represented by the number (packet number) of a TSP including the head of an IDR frame.

A description will now be given of the operation of the cell phone 1 according to the first embodiment having the foregoing configuration. The communication operation of the cell phone 1 itself is identical to that of an ordinary cell phone. The operation of the cell phone 1 to play back a captioned video image which characterizes the embodiment will be described below.

The cell phone 1 has a "normal view mode" for playing back a captioned video image without displaying a caption list, and a "caption-with-list view mode" for playing back a captioned video image while displaying a caption list and accepting selection of a caption line. In the caption-with-list view mode, a user (viewer) can select an arbitrary caption line from the caption list displayed. When a caption is selected, the selected caption line is displayed and a video image corresponding to the caption line is displayed.

Operating the display changeover button 4 or a soft-key, the user can switch the screen display state between the "caption-with-list view mode" and the "normal view mode".

When the user selects the "caption-with-list view mode", the control unit 11 displays a captioned video image and a list of captions. The caption list includes the caption line currently played back and a predetermined number of caption lines positioned before and after the currently played caption line. Caption lines to be listed are a currently played caption line and caption lines whose playback timings lie within a predetermined time range with the playback timing of the currently played caption line being a reference.

Figure 7A:
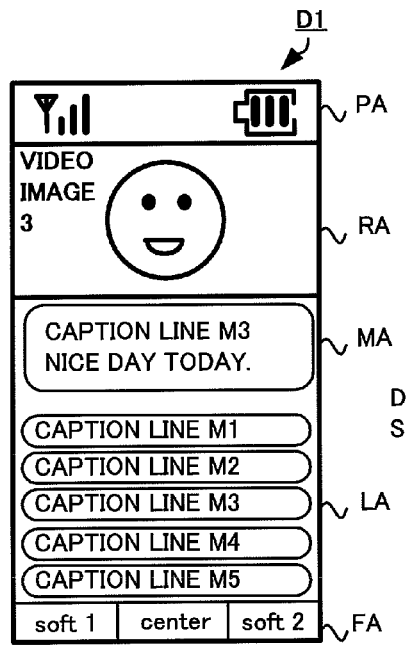
FIG. 7A is a diagram showing a first example of a screen to be displayed in a caption-with-list view mode.

The screen to be displayed on the display panel 5 in the "caption-with-list view mode" is a screen D1 shown in FIG. 7A. In the embodiment, there are five caption lines shown in the caption list.

When displaying a caption list, the control unit 11 reads caption lines Mn from the caption management data 122. In this respect, the control unit 11 extracts information from caption PESs included in the content-recorded data 121, and generates the caption management data 122 beforehand.

The following will describe the operation of the control unit 11 to generate the caption management data 122.

Figure 6:
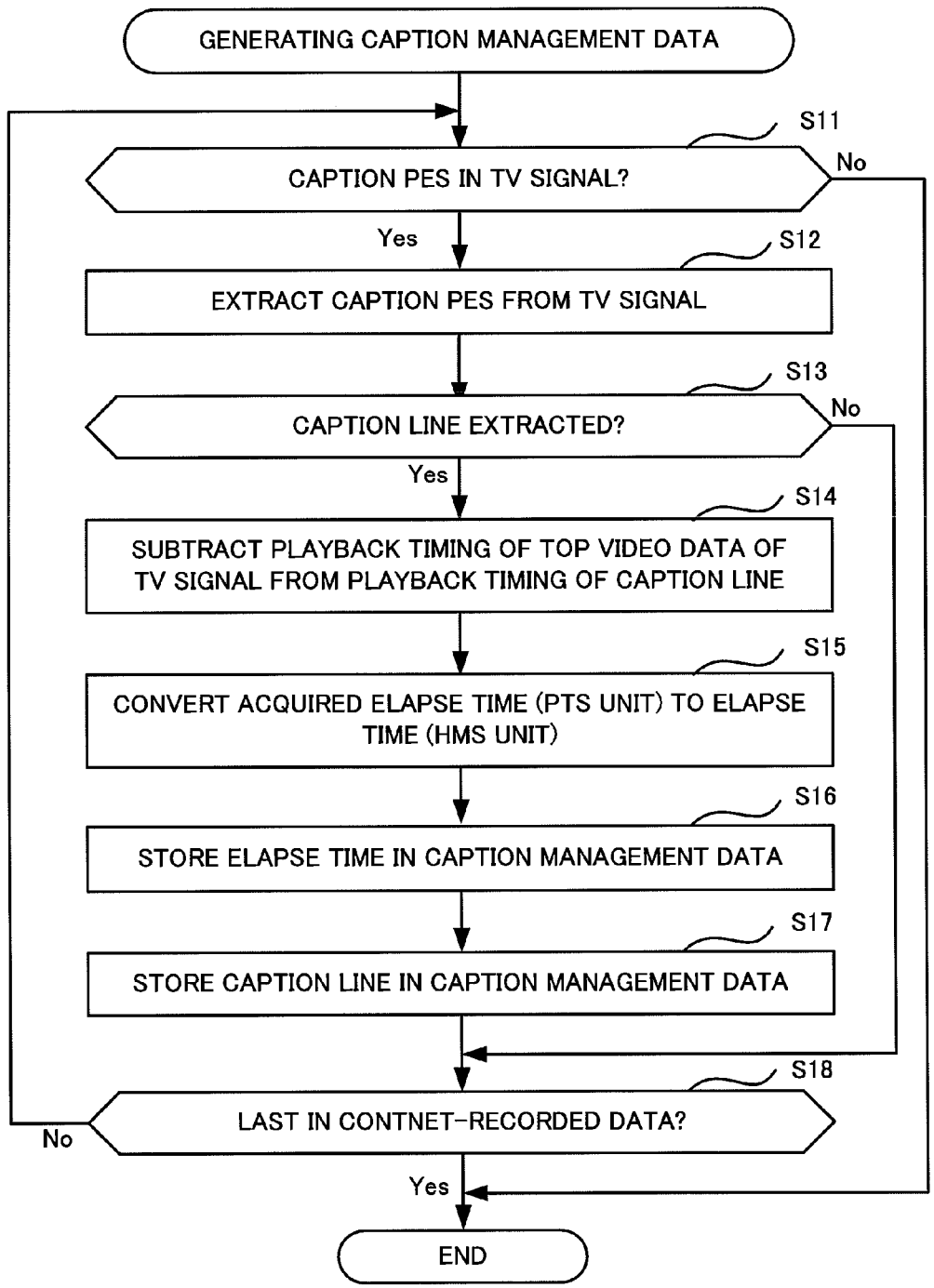
FIG. 6 is a flowchart illustrating a process of extracting information from content-recorded data and generating caption management data.

After recording a content (TV signal), the control unit 11 starts generating the caption management data 122. As shown in FIG. 6, the control unit 11 determines whether a caption PES is present in the content-recorded data 121, and terminates the process when there is no caption PES (step S11; No).

When a caption PES is present (step S11; Yes), the control unit 11 extracts the caption PES (step S12). The control unit 11 determines whether a caption line Mn could be extracted from the caption PES (step S13). When the extraction is done (step S13; Yes), the control unit 11 analyzes the caption PES and acquires a caption playback timing TMn.

Subsequently, the control unit 11 acquires an elapse time (PTS unit) from the beginning of the playback of a video image to playback of the caption line Mn by subtracting the playback timing of the top frame in the content-recorded data 121 from the caption playback timing TMn (step S14).

The control unit 11 converts the acquired elapse time (PTS unit) to the units of hour, minute and second (step S15). The control unit 11 stores the elapse time (HMS unit) in the caption management data 122 as the caption playback timing TMn (step S16).

Then, the control unit 11 extracts a caption line Mn from the caption PES 133, and stores the caption line Mn in the caption management data 122 (step S17). The control unit 11 repeats the foregoing process until data reaches the end of the content-recorded data 121 (step S18; Yes). This is the end of generation of the caption management data 122.

Figure 7B:
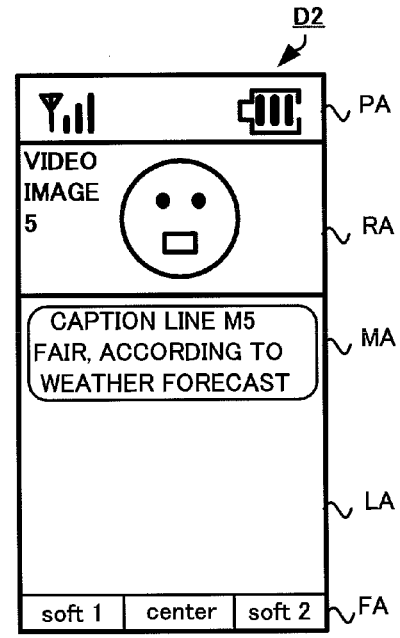
FIG. 7B is a diagram showing an example of a screen to be displayed in a normal view mode.

When the user instructs to change the mode from the "caption-with-list view mode" to the "normal view mode" by operating the display changeover button 4 or a predetermined soft key (e.g., screen "soft 1" key), the control unit 11 controls the display unit 14 in such a way that the display of a caption list is terminated and only a captioned video image is displayed. More specifically, the control unit 11 displays a screen D2 displaying a captioned video image exemplified in FIG. 7B on the display panel 5 in place of the screen D1 shown in FIG. 7A. To make good use of free space, the control unit 11 displays an image on a relatively large screen with the display size of a video image and a caption line being multiplied by a predetermined value k vertically and horizontally. Alternatively, arbitrary information (e.g., received news, message or the like) other than a caption list is displayed.

Figure 7C:
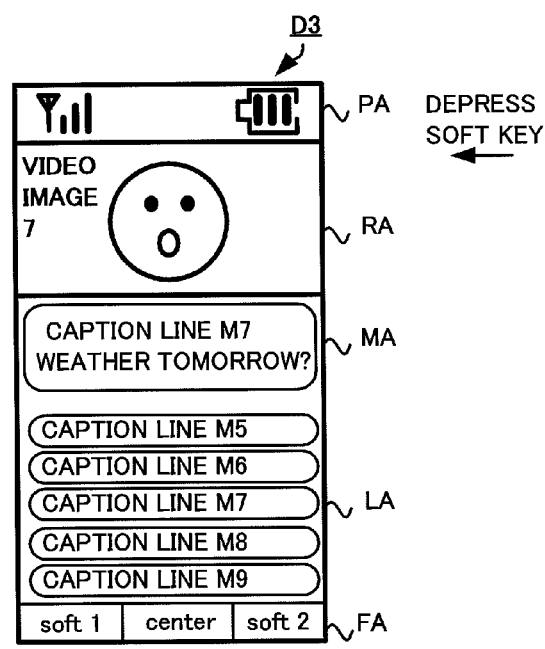
FIG. 7C is a diagram showing a second example of the screen to be displayed in the caption-with-list view mode.

In this case, when the user instructs to change the mode from the "normal view mode" to the "caption-with-list view mode" by operating the display changeover button 4 or a predetermined soft key, the control unit 11 displays a caption list while keeping the operation of playing back a captioned video image. For example, the control unit 11 displays a screen D3 shown in FIG. 7C in place of the screen D2 displaying a captioned video image exemplified in FIG. 7B.

A description will now be given of the process of the control unit 11 to change over the display mode for a captioned video image between the "normal view mode" and the "caption-with-list view mode" according to a user's operation.

Figure 8:
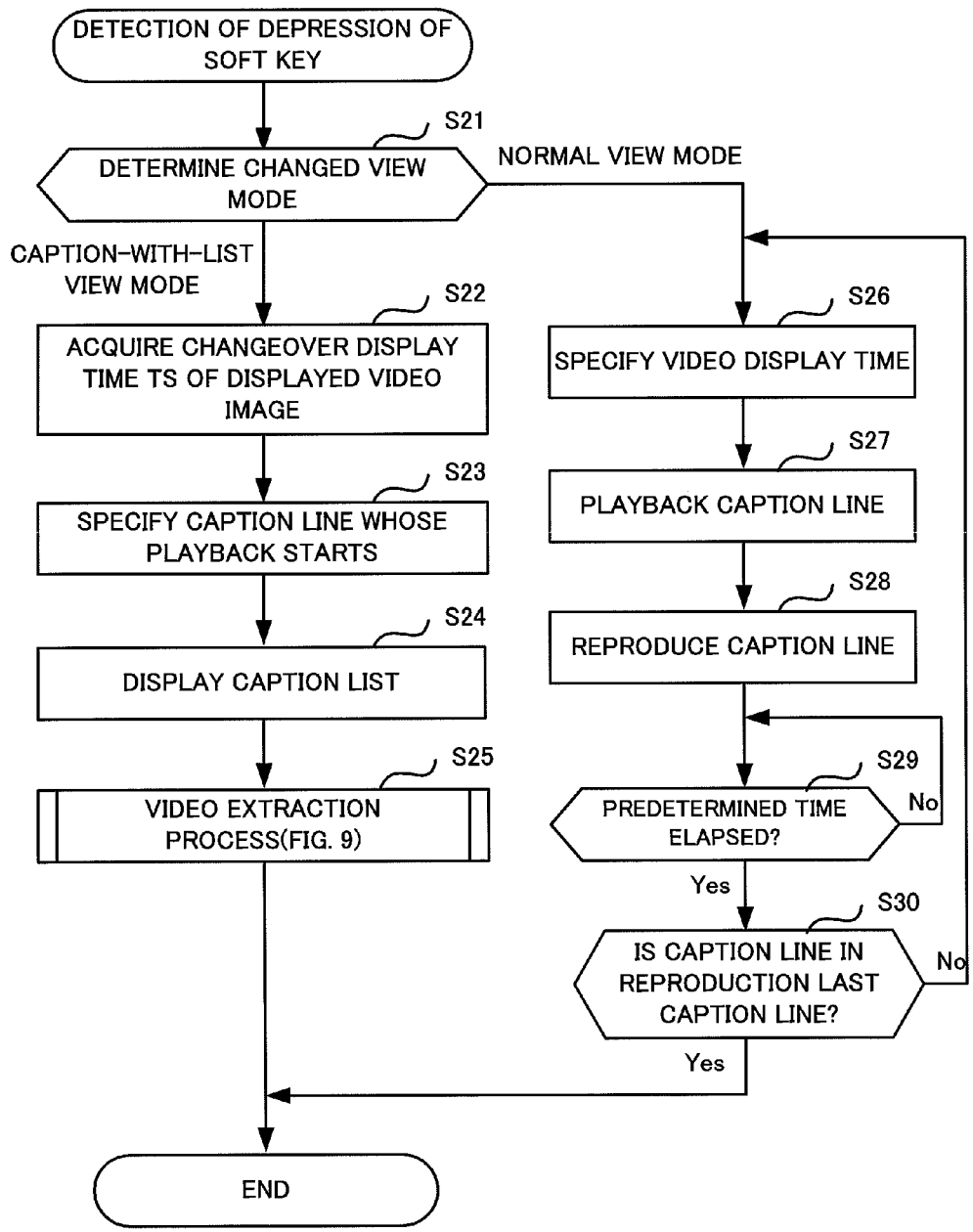
FIG. 8 is a flowchart illustrating a process of playing back a captioned video image changing over between the "caption-with-list view mode" and "normal view mode"

As shown in FIG. 8, when detecting depression of the display changeover button 4 or a predetermined soft key (e.g., "soft 1" in FIG. 7A) by the user, the control unit 11 determines which one of the "caption-with-list view mode" and the "normal view mode" is instructed as a view mode to be changed to (step S21). When the view mode at the time of detection is the "normal view mode", the control unit 11 determines that the mode change to the "caption-with-list view mode" has been instructed.

When it is the mode change to the "caption-with-list view mode" (step S21; caption-with-list view mode), the control unit 11 acquires the video playback timing for a video image which has been played back when the mode change has been instructed (hereinafter "changeover display time TS") (step S22). The changeover display time TS can be acquired from, for example, the video playback timing TRn for the currently played caption line, a reference time (STC) for managing the video playback timing or the like.

Subsequently, the control unit 11 compares the changeover display time TS with each caption playback timing TMn in the caption management data 122 to specify a caption line Mn which has the latest caption playback timing TMn later than the changeover display time TS (step S23). This is the caption line whose playback will start after the changeover.

Then, the control unit 11 specifies the specified caption line Mn and the caption lines to be played back before or after the specified caption line Mn by a predetermined timing (within a range thereof), and displays a list of the caption lines (caption list) on the display panel 5 (step S24). At this time, the control unit 11 displays the currently played caption line Mn in the center of a list area LA for displaying a caption list.

Subsequently, the control unit 11 extracts a video image having a video playback timing corresponding to the caption line Mn from the content-recorded data 121, and displays the video image in a video area RA (step S25).

Figure 9:
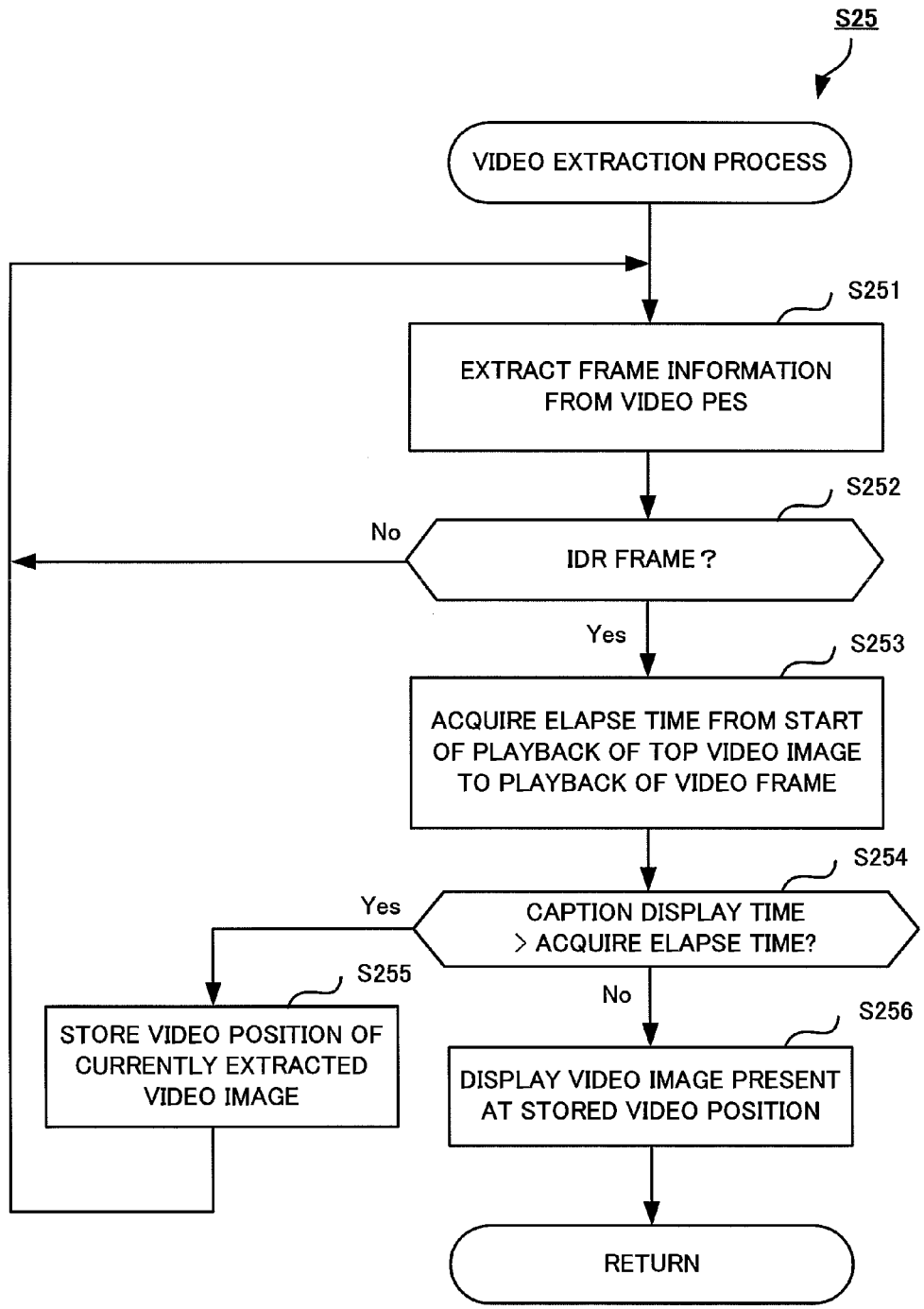
FIG. 9 is a flowchart of a video extraction process.

The details of the process at step S25 are shown in FIG. 9. As illustrated therein, the control unit 11 extracts information of a video frame from the video PES (step S251). The control unit 11 determines whether the extracted video frame is an IDR frame based on the extracted information (step S252). When the extracted video frame is not an IDR frame (step S252; No), the process returns to step S251.

When the extracted video frame is an IDR frame (step S252; Yes), on the other hand, the control unit 11 acquires an elapse time from the beginning of the playback of a top video image (frame) in the content-recorded data 121 to the playback of the IDR frame (step S253). For example, the control unit 11 acquires an elapse time by subtracting the playback timing of the top video image from the video playback timing (PTS unit) for the extracted IDR frame.

Next, the control unit 11 determines whether the IDR frame is the caption line Mn currently played back. Therefore, the control unit 11 determines whether the caption playback timing TMn of the caption line Mn is greater than the currently acquired elapse time (step S254).

When the caption playback timing is greater than the currently acquired elapse time (step S254; Yes), there is a possibility that the extracted IDR frame is to be played back before the currently displayed caption line Mn and corresponds to the caption line Mn. Thus the control section 11 stores the video position of the IDR frame (step S255). Then, the process returns to step S251.

When the caption playback timing is less than the currently acquired elapse time (step S254; No), the extracted IDR frame is played back immediately before the playback timing of the caption line Mn to correspond to the currently played caption line Mn. At this time, the control unit 11 reads the IDR frame from the video position PRn stored in step S255, and displays the IDR frame on the display panel 5 (step S256). Then, the process returns to the one in FIG. 8, and is terminated.

When determining in step S21 in FIG. 8 that the mode is to be changed to the "normal view mode", on the other hand, the control unit 11 advances the process to step S26 to perform ordinary playback of a captioned video image without displaying a caption list.

The control unit 11 compares the caption playback timing TMn the currently played caption line Mn has with each video playback timing TRn in the seek-point management information 123 to specify the video playback timing TRn immediately before the caption playback timing TMn (step S26).

Further, the video frame of a packet indicated by the video position PRn corresponding to the specified video playback timing TRn is played back (step S27). In the example of FIG. 5, the video frame starts being played back from the IDR frame indicated by the video position PRn (number of TSP) associated with the video playback timing TRn. The control unit 11 also plays back the caption line Mn corresponding to the currently played video image (step S27).

Subsequently, the control unit 11 performs the processes of steps S29 to S30 to play back the captioned video image. The control unit 11 starts measuring the elapse time with a timer (e.g., software timer in the control unit 11). When detecting elapse of a predetermined time (step S29; Yes), the control unit 11 determines whether the currently played caption line is the last caption line in the content-recorded data 121. When it is not the last caption line (step S30; No), the process returns to step S26. When it is the last caption line (step S30; Yes), the playback of the captioned video image is terminated. This is the end of the process of playing back a content while switching between the caption-with-list view mode and the normal view mode.

According to the embodiment, as described above, the user can adequately change over between the "caption-with-list view mode" and the "normal view mode" with a simple operation. In the caption-with-list view mode, it is possible to adequately select an arbitrary caption using the displayed caption list and display a video image corresponding to the selected caption.

In the normal view mode, a caption list is not displayed and various kinds of information can be displayed while using a small screen effectively. For example, a video image and a caption may be displayed using free space, or other information can be displayed. This makes it possible to keep the visibility improved well balanced by suppressing the amount of information to be displayed while keeping the operability at the time of selecting a caption.

Application Example 1-1

In the above-described embodiment, when the operation mode is switched, it may give an impression that a video image goes backward along the time axis, depending on how to select the point of starting video playback and a caption line to be played back.

This point will be described based on specific examples by referring to FIG. 10.

Figure 10:
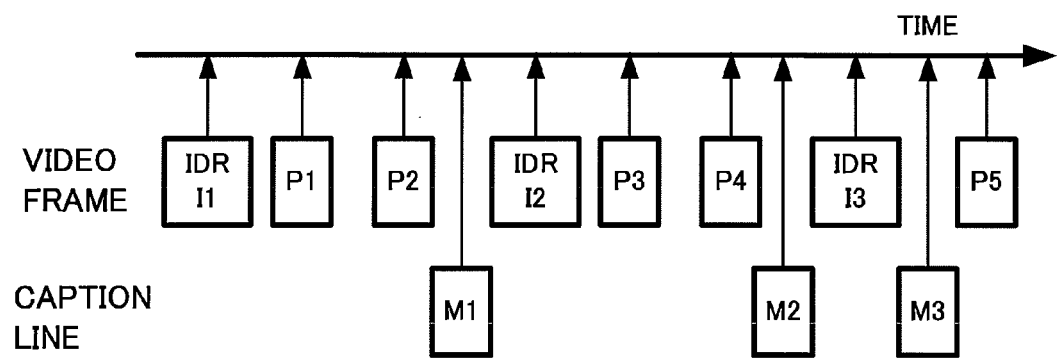
FIG. 10 is a diagram showing an example of playback timings for video frames and caption data.

FIG. 10 is a diagram exemplifying display timings for video frames (IDRn and Pm) defined by a video PES and caption PES, and a caption line (Mn).

Suppose that the user has instructed to change over the mode to the "normal view mode" during playback of a caption line M2 and an IDR frame I2 in the "caption-with-list view mode", for example. At this time, the control unit 11 starts playing back an IDR frame positioned directly before the caption line M2 which has been played back before the mode change, i.e., from the IDR frame I2.

Further suppose that the mode change to the "caption-with-list view mode" has been instructed during playback of any video frame positioned between the IDR frame I2 and a P frame P4 after the mode change to the "normal view mode". At this time, the control unit 11 plays back the caption line M1 positioned directly before the playback timing of the video image which has been played back when the instruction has been given. Then, the control unit 11 starts playing back the video image from the IDR frame I1 positioned before the caption line M1.

Accordingly, the viewer may feel that the display goes backward. This becomes noticeable when switching of the operation mode is carried out frequently.

To overcome the problem, a caption line having a playback timing later than the display time (playback timing) of the video image which has been displayed before the mode change should be displayed when the mode is changed from the "caption-with-list view mode" to the "normal view mode". That is, when the user changes the view mode from the "caption-with-list view mode" to the "normal view mode", the playback timing of the video image which has been displayed before the mode change should be specified in step S28, and a captioned video image having the latest playback timing later than the specified playback timing should be extracted in step S30 to start playback.

Likewise, when the user changes the view mode from the "normal view mode" to the "caption-with-list view mode", a caption line to be selected in step S23 should be set to a caption line having the latest playback timing later than the playback timing specified in step S22, and the start point of a video image to be played back in step S25 should be set to an independent frame whose playback timing is later than the playback timing of the caption line.

Referring to FIG. 10, for example, if a frame P3 has been displayed when the mode is switched from the "normal view mode" to the "caption-with-list view mode", the display time of the frame P3 is discriminated in step S28 in FIG. 8, playback of the video image is started from an independent video frame IDR3 directly following the frame P3 (step S29) to play back the caption line M2 directly after the frame P3 (step S30).

If the frame P3 has been displayed when the mode is switched from the "caption-with-list view mode" to the "normal view mode", the display time of the frame P3 is discriminated in step S23 in FIG. 8, the caption line M2 directly following it is selected as a playback target (step S23), and playback of the video image is started from the independent video frame IDR3 (step S25).

Accordingly, even when changeover of the view mode is repeated in a short period of time, it is possible to avoid that a caption line and video image are displayed returning along the playback timings during playback of a captioned video image.

According to the application example 1-1, as described above, when the view mode is changed over between the caption-with-list view mode and the normal view mode, a caption line having the latest playback timing later than the playback timing of the video image which has been displayed before the mode is changed. This makes it possible to avoid that through repeated changeover of the view mode, a caption line which has been displayed already is displayed again.

A video frame and a caption line which are to be selected at the time of changing the view mode are not limited to those in the above-described example, and can be adequately selected.

Application Example 1-2

A cell phone normally receives contents while changing the current position. This may bring about a case where depending on the position, the cell phone cannot receive broadcast waves well and the content-recorded data 121 is partially dropped off.

Figure 11:
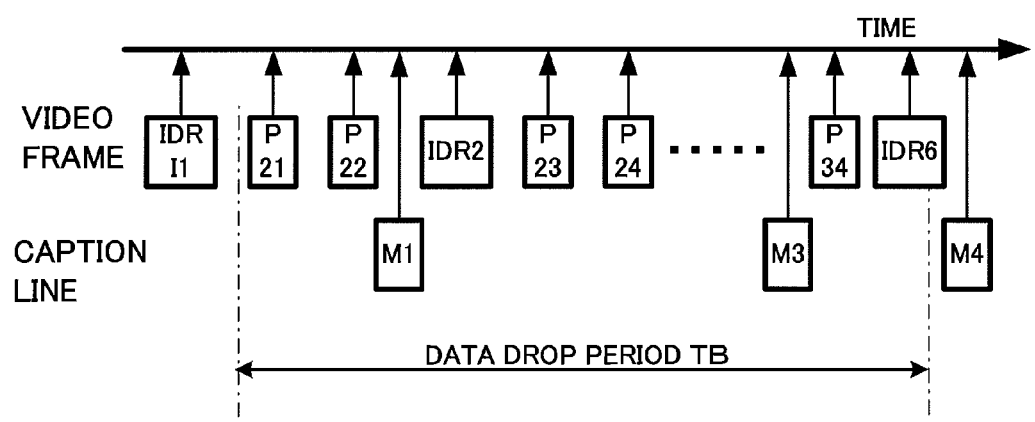
FIG. 11 is a diagram showing an example of content-recorded data in which video frames are partly dropped off.

In an example of FIG. 11, for example, data of P frames P21 to P34, data of I frames IDR2 to IDR6, and data of caption lines M1 to M3 are dropped from the content-recorded data 121 in the time zone (data drop period TB) where contents drop.

Suppose that the user has instructed to change over the mode to the "caption-with-list view mode" when the content-recorded data 121 has been played back immediately after the data drop period TB in the "normal view mode". At this time, a caption line which is in reproduction is a caption line M4.

The control unit 11 extracts an IDR frame directly before the caption line M4 as a video image to be played back first after the mode change. Because a video frame does not exist in the data drop period TB, an I frame IDR1 is extracted as the IDR frame positioned directly before the caption line M4 and played back. In this case, a video image which does not match the content of the caption line M4 in reproduction may be played back.

To overcome the problem, during reproduction of a content in the data drop period TB, a predetermined screen (e.g., screen filled with black) should be displayed in place of that video image. The following will describe the cell phone 1 according to an application example 1-2 which performs such an operation.

Figure 12:
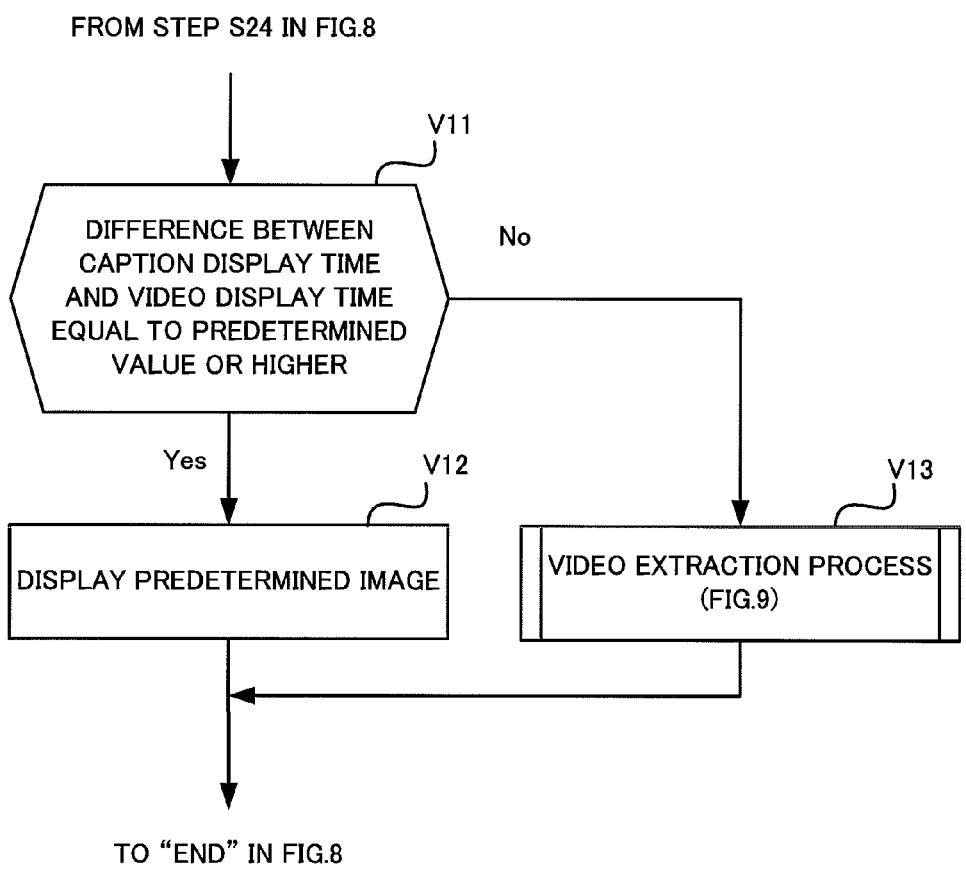
FIG. 12 is a flowchart illustrating a video extraction process according to an application example 2 of the first embodiment.

In the application example 1-2, the process of changing over between the caption-with-list view mode and normal view mode and playing back a content is basically identical to the process which has been explained referring to FIG. 8. It is to be noted however that in the application example 1-2 the control unit 11 executes processes of steps V11 to V13 shown in FIG. 12 in place of step S25 (FIG. 9) in the "caption-with-list view mode".

When executing the processes of steps S21 to S23 shown in FIG. 8 and detecting the mode change to the "caption-with-list view mode", the control unit 11 specifies a caption line to be played back. Next, the process goes to step V11 in FIG. 12. The control unit 11 specifies an IDR directly before the specified caption line, acquires the display time for the IDR referring to the seek-point management information 123, and acquires the difference between the caption display time TMn of the specified caption line and the video display time of the IDR frame directly before the caption display time (step V11).

When the difference is equal to or greater than a predetermined value (e.g., 5 seconds) (step V11; Yes), the control unit 11 displays a predetermined screen (e.g., screen filled with black, message showing that an image is dropped off) in place of the video image of the content-recorded data 121 (step V12). Accordingly, even when data in the content-recorded data 121 is partly dropped off, it is possible to avoid that a video image which does not match the caption line in reproduction is displayed.

When the difference is smaller than the predetermined value, a video frame indicated by the video position PRn is displayed (step V13). The process of step V13 is the same as the corresponding one in FIG. 9.

According to the application example 1-2, as described above, when the data drop period TB is present in the content-recorded data 121 and is greater than a predetermined time, a predetermined screen is displayed instead of the video image of the content. This can prevent a video image which does not match the caption line in reproduction from being displayed.

Modifications

Although a list of captions is displayed to facilitate selection of a caption line in the foregoing description, the scheme of enabling selection of a caption line is optional. For example, an icon or a button corresponding to a caption line may be displayed and a caption line may be selected by selecting it. A list of captions may be hierarchized. Further, selection of a caption line may be accepted directly through an input from the keyboard.

In the case where the "caption-with-list view mode" is changed to the "normal view mode" in the example in FIG. 8, if the process of step S25 has been terminated in the "caption-with-list view mode", the processes of steps S28 to S29 need not be executed. In this case, playback should be started from the video image which has been displayed before the mode change.

The caption display time TMn is not limited to the playback start time for a captioned video image, but may be expressed by an arbitrary time as a reference. The caption display time TMn and the video display time TRn are not limited to the HMS unit or PTS (Presentation Time Stamp) unit, and may be expressed by an arbitrary unit.

In the "normal view mode", a content may be played back without displaying a caption line. The cell phone 1 may be configured to have a fast forward capability as needed.

When the view mode is changed from the "normal view mode" to the "caption-with-list view mode", the process of extracting a video frame from a video PES may not be executed, and the caption display time TMn in the caption management data 122 may be compared with the video display time TRn in the seek-point management information 123 and a video image of a TSP indicated by the video position PRn directly before the caption display time TMn.

Second Embodiment

A cell phone 1 according to a second embodiment of the present invention will be described below.

A cell phone 1 according to the embodiment has the same configuration as the one shown in FIGS. 1 and 2.

The operation of the cell phone 1 for playing back the caption lines will be described with reference to FIGS. 13 to 32.

In this embodiment, the cell phone 1 can display a plurality of images and corresponding caption lines in parallel. This display mode is called "multiple-video-display mode". In this embodiment, the user selects the number of caption lines and video images to be displayed on the display panel 5 simultaneously by operating the display changeover button 4 or predetermined soft key.

The control unit 11, like the one in the first embodiment, extracts information stored in the a caption PES (Packetized Elementary Stream) included in a TV signal after recording a content to generate caption management data 122. The operation of generating the caption management data 122 is the same as the operation of creating the caption management data 122 in the first embodiment shown in FIG. 6.

The caption PES is packetized compressed coded data of a caption line and has information necessary to generate the caption management data 122. In a specific example, when a TV signal is a TV signal SG shown in FIG. 13, a caption PES has information, such as caption lines Mn (n: 1 to N, N: the number of caption PESs included in the TV signal SG), caption playback timings TMn (n: 1 to N) and control codes CSn (n: 1 to N).

The "caption line" is data indicating the content of a caption line of a captioned video image. The "caption playback timing" is the timing of playing back a "caption line" represented by the PTS (Presentation Time Stamp) unit. In the example of the TV signal SG shown in FIG. 13, a plurality of caption playback timings TM1 to TMN correspond to the timings (PTS unit) of playing back individual caption lines M1 to MN.

The control code is a code which means separation of a caption line into predetermined units. In the example of the TV signal SG shown in FIG. 13, a plurality of control codes CS1 to CSN correspond to the respective caption lines M1 to MN and mean separation of each caption line. The control unit 11 extracts caption lines equal in number to the number of the control codes CSn (n: 1 to N) included in the TV signal SG. The operation of the control unit 11 to extract information from the caption PES and generate the caption management data 122 shown in FIG. 6 will be described with reference to the example of the TV signal SG shown in FIG. 13.

As shown in FIG. 6, when starting generation of the caption management data 122, the control unit 11 first attempts to extract a caption PES from the TV signal SG and determines whether a caption PES is present in the TV signal SG (step S11). When a caption PES is not present (step S11; No), the control unit 11 terminates generation of the caption management data 122.

When a caption PES is present in the TV signal SG (step S11; Yes), the control unit 11 extracts the caption PES (step S12), then determines whether a caption line has been extracted from the information included in the caption PES (step S13). When a caption line has been extracted (step S13; Yes), the control unit 11 analyzes the caption PES and acquires information indicating the playback timing (PTS unit) of the caption line.

Subsequently, the control unit 11 subtracts a playback timing TR1 of a top video image R1 from a caption playback timing TM1 of the first extracted caption line M1 from the caption PES of the TV signal SG shown in FIG. 13 to acquire an elapse time (PTS unit) from the beginning of the playback of the top video image R1 to the playback timing of the caption line M1 (step S14). The elapse time (PTS unit) acquired is equivalent to the offset time when the playback timing of the top video image is set to a reference time 0.

Subsequently, the control unit 11 converts the elapse time (PTS unit) acquired in step S14 to the ordinary HMS unit (step S15), and stores the elapse time (HMS unit) in the caption management data 122 as a caption display time TM1 (step S16).

Figure 13:
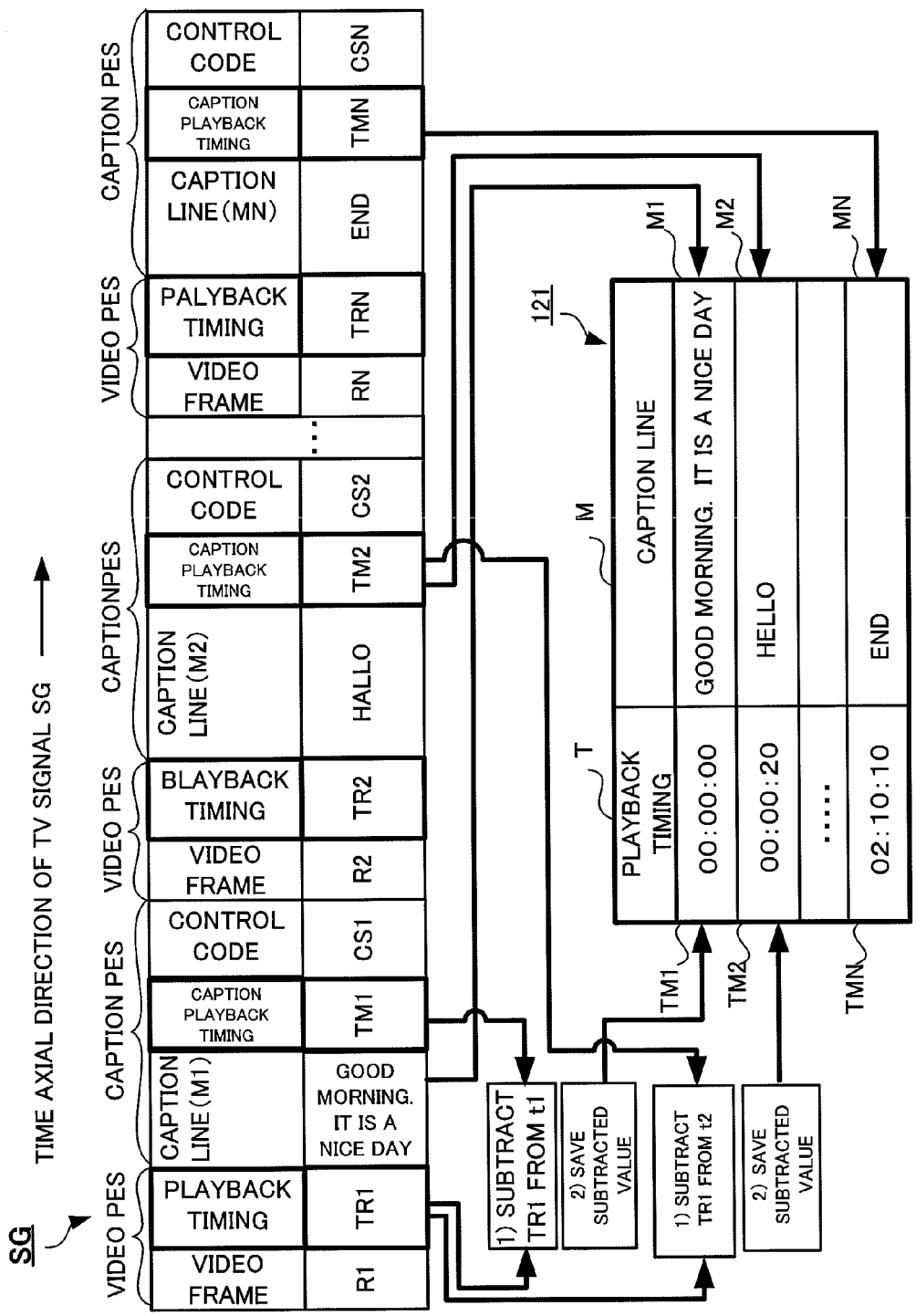
FIG. 13 is a diagram for explaining an operation of extracting information from a TV signal to generate caption management data.

As for the example shown in FIG. 13, the control unit 11 stores "00:00:00" resulting from conversion of the elapse time (PTS unit) acquired in step S14 to the ordinary HMS unit (step S15) in the caption management data 122 as the display time TM1. The display time of a caption line may be represented by the PTS unit without being converted to the HMS unit.

After storing the display time, the control unit 11 extracts a caption line to be stored in the caption management data 122 from the TV signal. Therefore, as shown in FIG. 13, the control unit 11 stores a sequence of characters ("Good morning. It is a nice day.") separated directly before the control code CS1 included in the first caption PES of the TV signal SG as the caption line M1 in the caption management data 122 (step S17). It is to be noted that when only the control code CS1 is included in the TV signal SG, the control unit 11 stores all the caption lines included in the TV signal SG in the caption management data 122 as the caption line M1.

After storing the first caption line M1, the control unit 11 determines whether the last control code CSn in the TV signal SG has been reached (step S18). When the last control code has not been reached (step S18; No), the process returns to step S11. The control unit 11 extracts a next caption PES (step S12) to acquire a caption playback timing (PTS unit) TM2 located between the control code CS1 and control code CS2 in the TV signal shown in FIG. 13. After acquiring the caption playback timing (PTS unit) TM2, the control unit 11 subtracts the playback timing TR1 of the top video image R1 from the caption playback timing (PTS unit) TM2 (step S14), then convert the obtained elapse time into the HMS unit from the PTS unit (step S15).

Then, the control unit 11 stores a resultant time "00:00:20" as a display timing TM2 in the caption management data 122 (step S16).

The control unit 11 also stores a sequence of characters included between the first control code CS1 and the next control code CS2 as a caption line M2 of the caption management data 122 (step S17). In the example of the TV signal SG shown in FIG. 13, the control unit 11 stores a sequence of characters "Hello." located between the control code CS1 and the control code CS2. The control unit 11 sorts the caption lines Mn (n: 1 to N) in an ascending order based on the display timing TMn (n: 1 to N).

The control unit 11 repeats the foregoing process until the last control code CSn in the TV signal SG is reached (step S18; Yes) to generate the caption management data 122.

When the user selects the "multiple video-display mode" by operating the display changeover button 4 or a predetermined soft key, the control unit 11 simultaneously displays and plays back a plurality of caption lines and individual video images to which playback timings corresponding to the playback timings of the respective caption lines are given, based on the generated caption management data 122. Note that the multiple video-display mode to simultaneously display K (K strips) caption lines and individual video images is called "K-strip display mode".

An operation of simultaneously playing back and displaying a plurality of caption lines and video images corresponding to the playback timings of the respective caption lines will be explained in a case of the "3-strip display mode", as an example, of simultaneously displaying three caption lines and video images corresponding to the playback timings of the respective caption lines.

When the user selects the "3-strip display mode" by operating the display changeover button 4 or a predetermined soft key, the control unit 11 performs a process of allocating areas for displaying three caption lines and video images corresponding to the respective caption lines in the entire area on the display panel 5 to display individual pieces of data. This process will be described referring to FIG. 14.

First, the control unit 11 subtracts a pict area PA for displaying a pict icon and a soft-key area FA for displaying a soft key from a virtual display area D corresponding to the entire display panel 5.

Next, the control unit 11 determines i) the size and position of a virtual area to be allocated as a caption area MA for displaying a caption line, and ii) the size and position of a virtual area to be allocated as a video area RA for displaying a video image, from the remaining area of the display area resulting from the subtraction of the pict area PA and the soft-key area FA therefrom. The caption area MA and video area RA are, for example, a caption virtual plane and video virtual plane in one-segment broadcasting.

While the scheme of acquiring the sizes of the caption area MA and video area RA is optional, the following scheme can be adopted as one example. The control unit 11 determines the size of the area needed to display a caption line based on the number of the characters contained in a caption line and the number of the vertical and horizontal pixels in font data. Alternatively, the control unit 11 determines the size of the area needed to display each video image from the number of the vertical and horizontal pixels of each video image.

After determining the sizes, the control unit 11 determines the locations to secure the caption area MA and video area RA in the display area D. While the scheme of acquiring the locations of the caption area MA and video area RA is optional, the following scheme can be adopted as one example. The control unit 11 determines the location of each area so that the caption area MA and video area RA do not overlap. When the locations of the caption area MA and video area RA are determined, the control unit 11 stores coordinate values (x, y) of the four vertexes of each of rectangles indicating the caption area MA and video area RA in the storage unit 12.

Subsequently, the control unit 11 separates each of the caption area MA and video area RA into a plurality of areas according to the numbers of caption lines and video images to be displayed ("3" each in the "3-strip display mode"). The control unit 11 acquires a y coordinate value corresponding to two segment points when the vertical (y direction) width (y2−y1) of the caption area MA is uniformly separated into three segments. The acquired y coordinate value becomes the y coordinate value of the four vertexes of the rectangle which define a caption area MA2 shown in FIG. 15.

Figure 14:
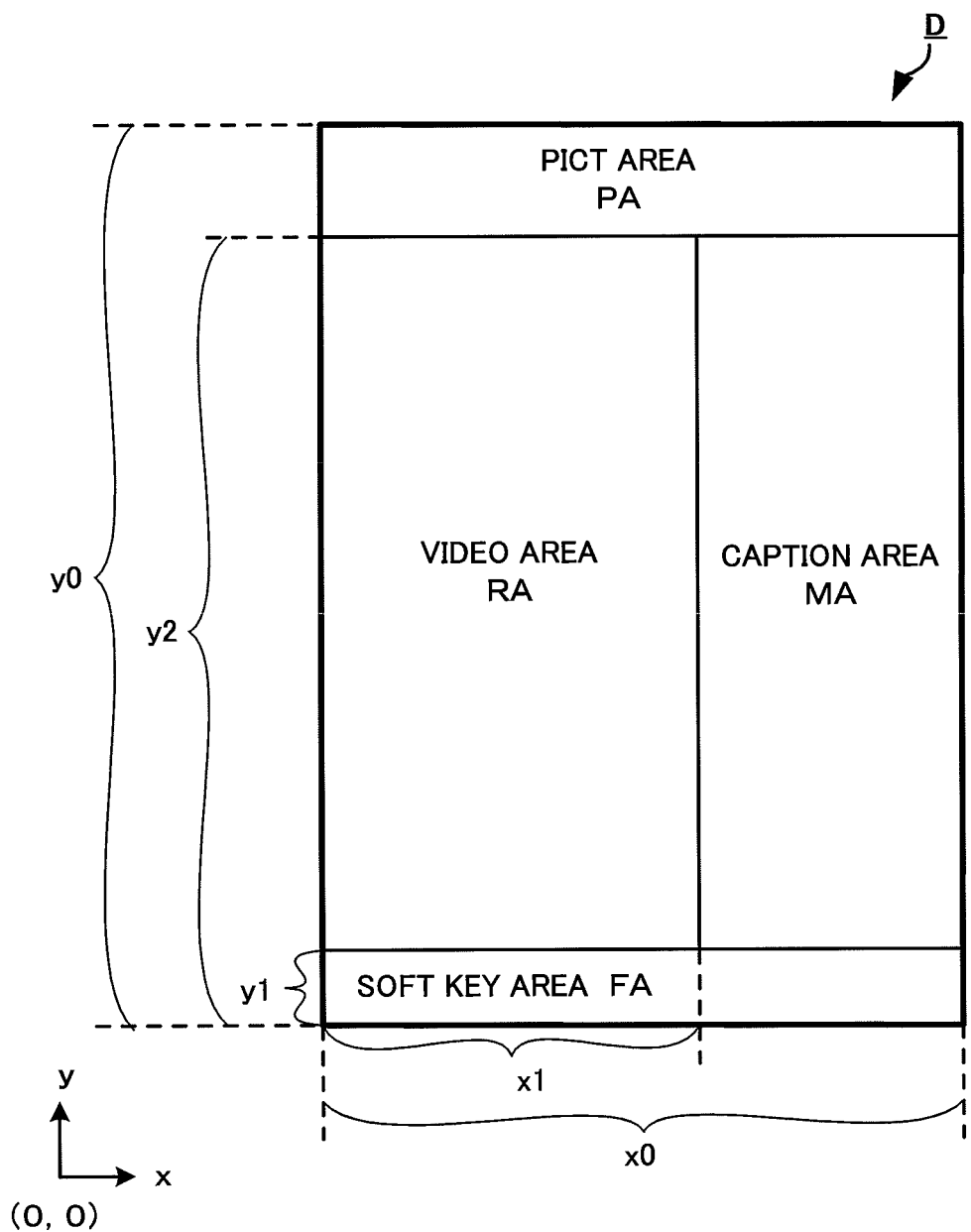
FIG. 14 is a diagram showing a layout example of the entire display area of a display panel when separated into a caption area, a video area, a soft-key area, and a pict area.
Figure 15:
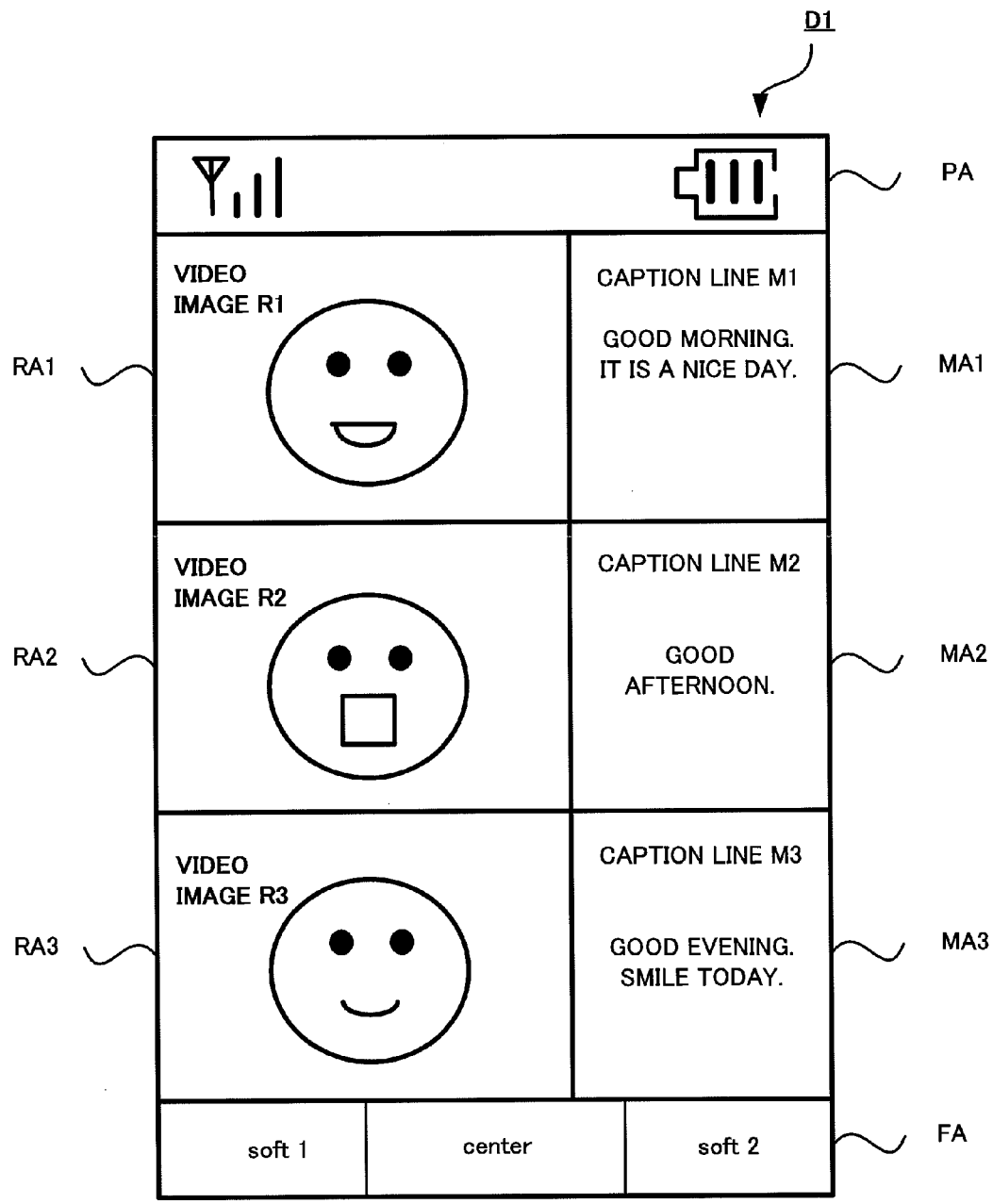
FIG. 15 is a diagram showing an example of a screen in a 3-strip display mode.

The control unit 11 combines a minimum value x1 and a maximum value x0 of the x coordinates on the caption area MA shown in FIG. 14 with the y coordinate value of the two segment points acquired previously to determine the coordinates (x, y) of the four vertexes of the caption area MA2 shown in FIG. 15. The control unit 11 sets two areas acquired by subtracting the caption area MA2 from the caption area MA to the caption areas MA1, MA3 shown in FIG. 15, respectively. At the time of separating the video area RA shown in FIG. 14 into video areas RA1 to RA3 shown in FIG. 15, substantially the same scheme as adopted in separating the caption area MA into three segments may be used as well.

The caption area after separation is the area for displaying continual caption lines Mn registered in the caption management data 122. In the example of the screen D1 in the "3-strip display mode" shown in FIG. 15, the control unit 11 displays the caption line M1 having the latest playback timing (display time TM1) in the caption management data 122 shown in FIG. 4 on the caption area MA1, and displays the caption line M2 having the next latest display time TM2 on the caption area MA2. The control unit 11 displays the caption line M3 following the caption line M2 on the caption area MA3.

The control unit 11 displays video images having playback timings corresponding to the playback timings of individual caption lines, displayed on the respective separated caption areas, on the respective separated video areas. In the example of the screen D1 shown in FIG. 15, the control unit 11 displays video images R1 to R3 indicating the faces of a person as video images corresponding to the playback timings of the caption lines M1 to M3 on the separated video areas RA1 to RA3.

To display individual video images corresponding to the caption lines current in reproduction on a plurality of video areas, the control unit 11 extracts video images (video frames) corresponding to the playback timings of the caption lines from the video signal in the TV signal SG. The following will describe the process of the control unit 11 to search content-recorded data (video data) 121 and display individual video images, displayed on the screen D1 shown in FIG. 15, on the respective video areas.

Figure 16:
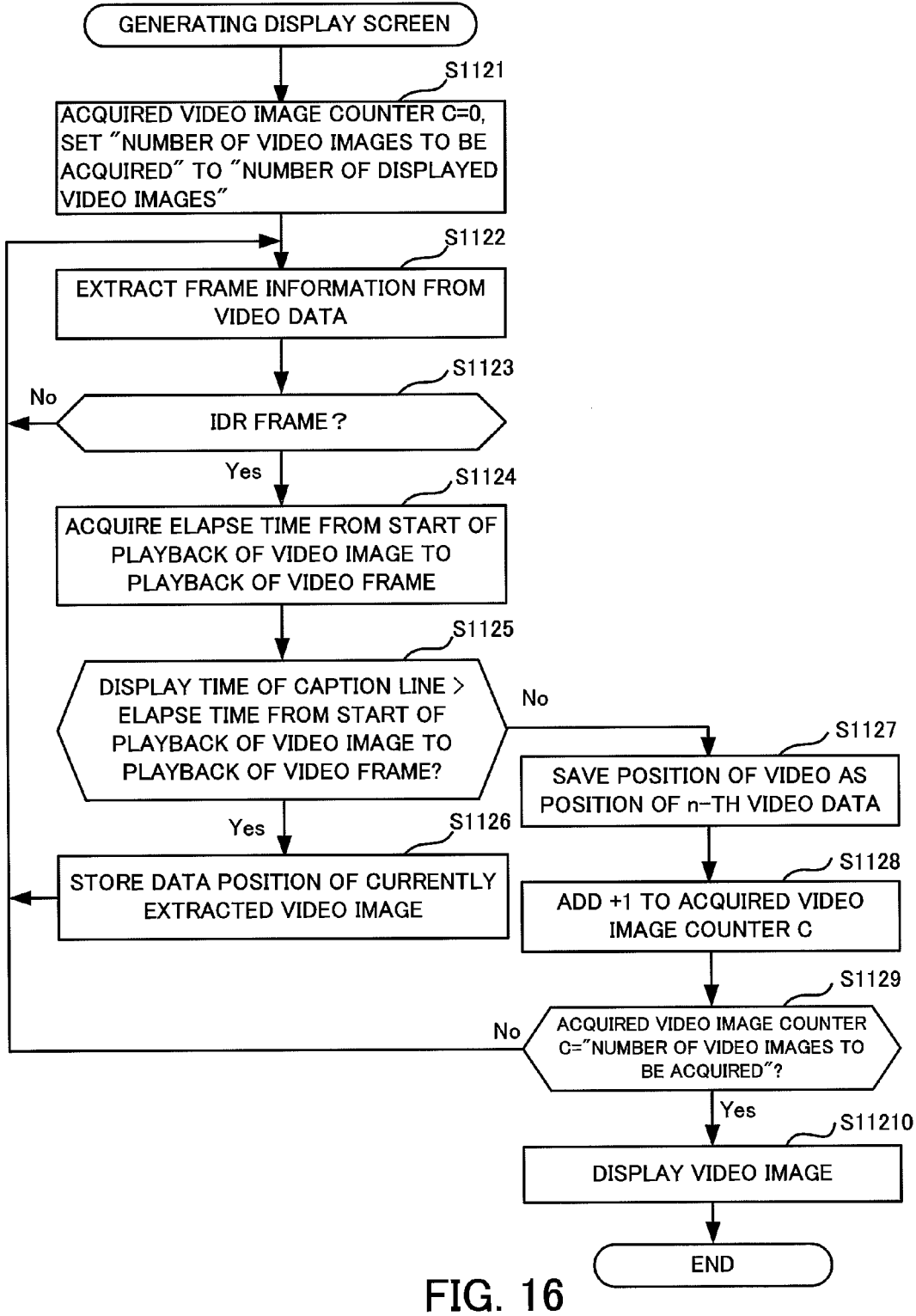
FIG. 16 is a flowchart illustrating a process of extracting a video image corresponding to a playback timing of a caption line.

When the user instructs to begin an application for viewing a captioned video image or select the "3-strip display mode" by operating the operational section 13, the control unit 11 executes the process of a flow shown in FIG. 16.

In the process of FIG. 16, the control unit 11 acquires that number of video images which are to be displayed on the respective video areas on the display panel 5 (hereinafter "number of displayed video images") from the content-recorded data 121 of the TV signal SG. The control unit 11 repeats the acquisition of video images and displays the acquired video images on the respective video areas until the number of acquired video images (hereinafter "acquired number") reaches the "number of displayed video images".

To start counting the "acquired number", the control unit 11 first clears an acquired video image counter C to 0 (step S1121). Then, the control unit 11 sets the number of video images to be acquired from the TV signal SG (hereinafter "number of video images to be acquired") matches with the "number of displayed video images" (step S1121). In the example of the screen D1 in the "3-strip display mode" shown in FIG. 15, the number of displayed video images is "3", and the control unit 11 sets the number of displayed video images to "3".

Next, the control unit 11 extracts a video PES included in the video signal of the TV signal SG to specify the playback timing (PTS unit) of a video image corresponding to the display time of each caption line based on IDR frame information contained in the video PES. Therefore, the control unit 11 extracts the video PES from the video signal of the TV signal SG and extracts information of the topmost video frame in the TV signal SG (step S1122).

The information on the video frame includes data on a video image and information indicating the playback timing at which the video image is to be played back. The information on the video frame is, for example, an IDR (Instantaneous Decoder Refresh) access unit or a non-IDR access unit in one-segment broadcasting. In a specific example, when the TV signal SG is a TV signal SG shown in FIG. 13, information on a video frame includes data on a video image (video frame) and information indicating the playback timing TR1 for playing back the top video image R1. The playback timing TR1 is expressed by the PTS unit.

The control unit 11 determines whether the extracted video frame is an IDR frame from the information extracted in step S1122 (step S1123). When the extracted video frame is not an IDR frame (step S1123; No), the process returns to step S1122, and the control unit 11 extracts information on the next video frame from the TV signal SG to extract information on the topmost IDR frame.

When the currently extracted video frame is an IDR frame (step S1123; Yes), the control unit 11 acquires an elapse time from the beginning of the playback of the top video frame to the playback of the IDR frame (step S1124). At this time, the control unit 11 acquires the elapse time by subtracting the playback timing (TS unit) TR1 of the video image R1 at the top of the TV signal SG from the playback timing (PTS unit) the IDR frame has. The elapse time acquired in step S1124 is the offset time until the time of the playback of the currently extracted video image when the playback timing of the top video image in the TV signal SG is set as a reference time 0.

The control unit 11 determines whether the caption play back timing TM1 of the caption line M1 stored first in the caption management data 122 is greater than the elapse time acquired in step S1124 (step S1125). This determination process is performed to discriminate the possibility that the currently extracted IDR frame is a frame in which the caption line M1 is referred to by the corresponding to video image R1.

When the display time of the caption line M1 is greater than the elapse time from the beginning of the playback of the top video image till the playback timing of the currently extracted IDR frame (step S1125; Yes), the currently extracted IDR frame is played back before the caption line M1 and the video frame corresponding to the caption line M1 may refer to the currently extracted IDR frame. Therefore, the control unit 11 saves the position of data of the video frame extracted in step S1124 (e.g., address stored in the storage unit 12) (step S1126). Then, the process returns to step S1122, and the control unit 11 further seeks video frames to extract information thereon.

The control unit 11 then subtracts the playback timing TR1 of the topmost video image R1 in the TV signal SG from the playback timing of the video frame extracted next, thereby acquiring the elapse time of the video frame extracted next. When the elapse time is smaller than the caption playback time TM1 of the caption line M1 too (step S1125; Yes), the video frame is played back after the IDR frame extracted directly before and is played back before the caption line M1. Therefore, the control unit 11 stores the position of the data of the currently extracted video frame instead of the position of data on the video frame extracted directly before (step S1126).

When the display time T1 of the caption line M1 is smaller than the elapse time from the beginning of the playback of the top video image till the playback timing of the currently extracted IDR frame (step S1125; No), the currently extracted IDR frame is that of IDR frames to be played back earlier than the video image R1 corresponding to the caption line M1 whose playback timing is the closest to the playback timing of the video image R1. Accordingly, the control unit 11 stores the location saved in step S1126 in the storage unit 12 as the location of the IDR frame which is referred to by the video image R1 to be displayed on the video area RA1 (step S1127).

Then, the control unit 11 adds "1" to the acquired video image counter C to show that one video frame has been acquired (step S1128). When the "acquired number" reaches the "number of video images to be acquired" set equal to the number of video images to be displayed on the video area as a result of adding 1 to the acquired video image counter C, no further extraction of a video image from the content-recorded data 121 is required thereafter. To make the determination, the control unit 11 determines whether the acquired video image counter C has reached the number of video images to be acquired (step S1129). When the value of the acquired video image counter C has not reached the number of video images to be acquired (step S1129; No), the process returns to step S1122 and the control unit 11 further seeks video frames.

When the value of the acquired video image counter C has reached the "number of video images to be acquired" (3 in the 3-strip display mode) (step S1129; Yes), the control unit 11 reads each video frame based on the positional information of the video data. The individual video frames to be read out are equivalent to the video images R1 to R3 displayed on the screen D1 shown in FIG. 15.

Subsequently, the control unit 11 displays the video image R1 read from the content-recorded data 121 on the video area RA1 on the display panel 5 via the display unit 14. The control unit 11 displays the video image R2 having the next playback timing TR2 to that of the video image R1 in the content-recorded data 121 on the video area RA2, and displays the video image R3 having the next playback timing TR3 to that of the video image R2 on the video area RA3 (step S11210). At this time, the control unit 11 performs the process of separating the video area RA to set the individual video areas RA1 to RA3 to display the video images R1 to R3 respectively by the above-described scheme.

The control unit 11 displays caption lines with playback timings TMn corresponding to the playback timings of video images to be displayed in the video areas in the caption areas MA1, MA2, MA3. In the example of the screen D1 shown in FIG. 15, the caption lines M1 to M3 are displayed on the caption areas MA1 to MA3. Through the foregoing process, it is possible to display a plurality of caption lines on the respective caption areas and video images corresponding to the individual caption lines on the video areas.

Next, a description will be given of an embodiment where each of individual caption lines and each of video images currently displayed are replaced with another caption line and another video image before being displayed on the respective caption area and video area, thus improving the usability. In the "3-strip display mode" explained above, if caption lines and video images currently displayed are fed strip by strip (one caption line) or are fed up or down strip by strip (1-strip scroll), the user can grasp the content occasionally, thus improving the usability.

In a case of scrolling the caption line and video image currently displayed on the respective caption area and video area strip by strip, a caption line Mn having the earlier or later playback timing TMn and a video image Rn corresponding to the caption line Mn should be displayed on the respective caption area and video area in place of the currently displayed caption line and video image.

Figure 17A:
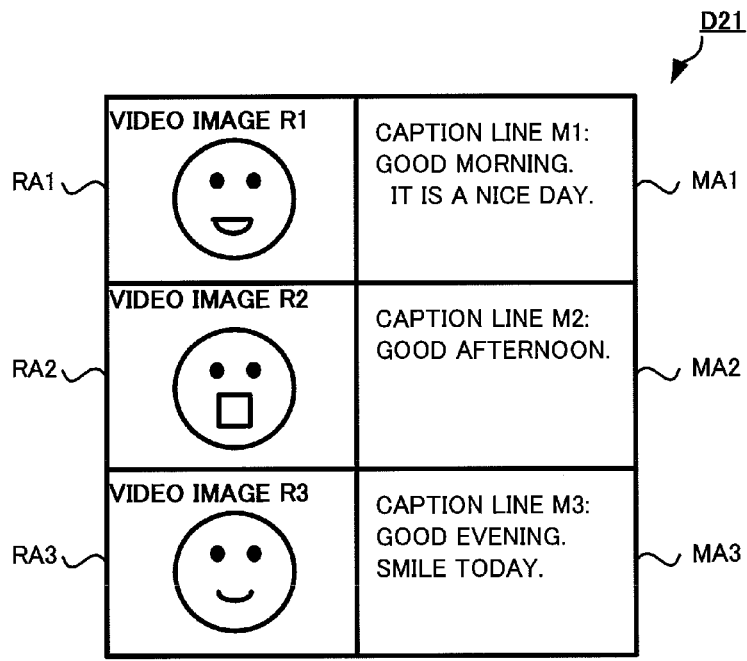
FIG. 17A is a diagram showing a screen before the screen is scrolled down by one strip in the 3-strip display mode.

As a specific example, a screen to be scrolled downward by one strip is a screen D21 shown in FIG. 17A. To display a screen D22 shown in FIG. 17B in place of the screen D21, caption lines M2 to M4 having the next playback timings should be displayed on the caption areas MA1 to MA3 on the screen D21 in place of the currently displayed caption lines M1 to M3. Further, video images R2 to R4 corresponding to the caption lines M2 to M4 should be displayed on the video areas RA1 to RA3 in place of the currently displayed video images R1 to R3.

Figure 18:
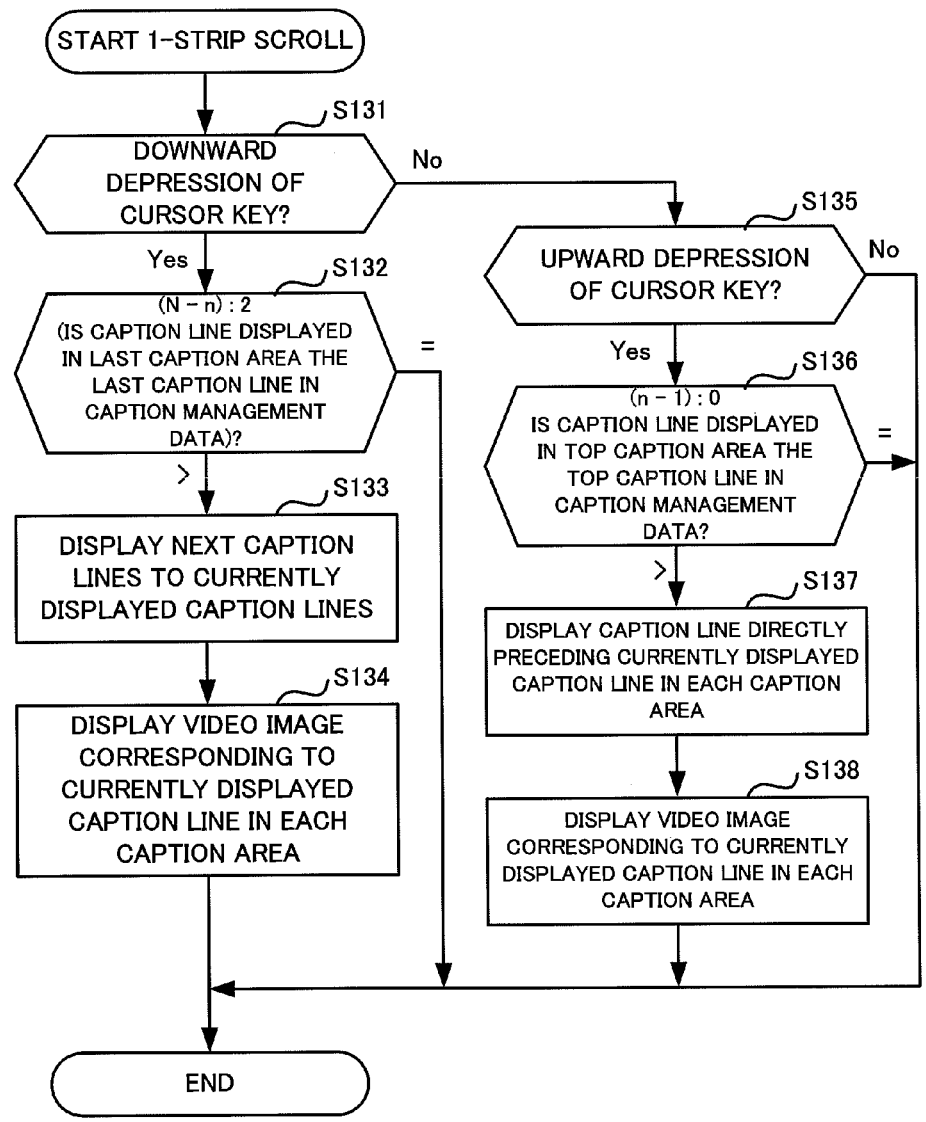
FIG. 18 is a flowchart showing a process of scrolling a screen by one strip.
Figure 19A:
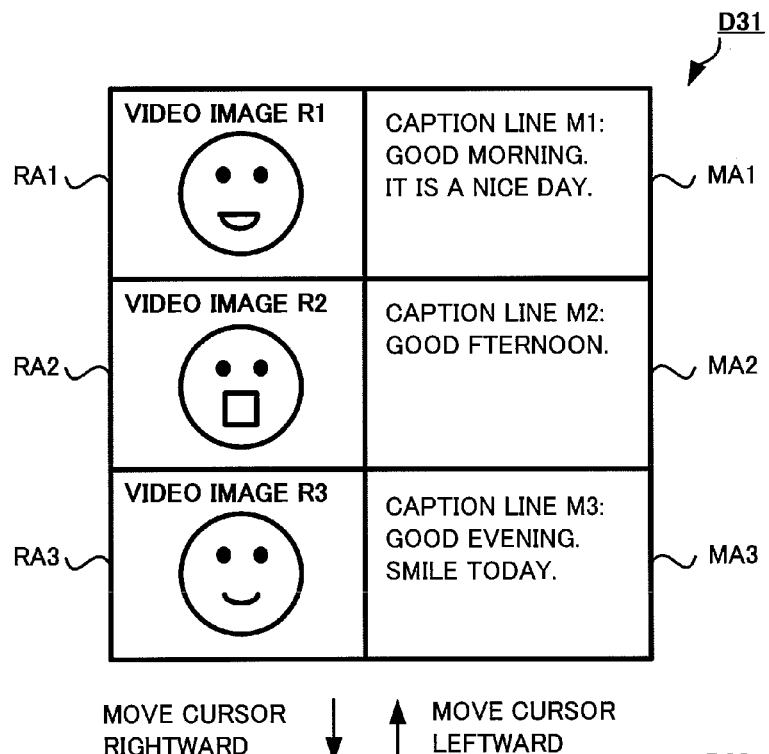
FIG. 19A is a diagram showing an example of the screen when page is fed backward in the 3-strip display mode.
Figure 19B:
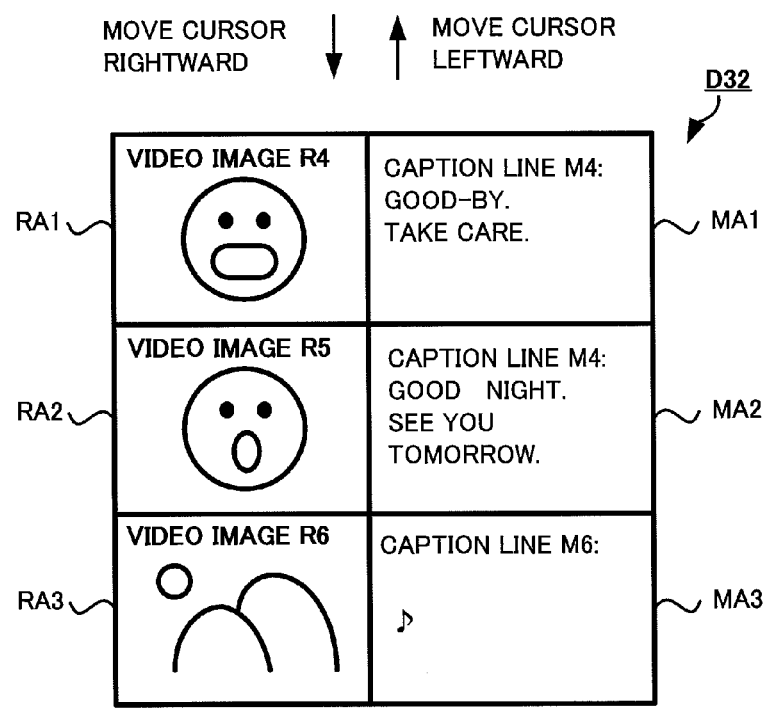
FIG. 19B is a diagram showing an example of the screen when page is fed forward in the 3-strip display mode.

Referring now to FIG. 18, the operation of scrolling caption lines displayed on the individual caption areas strip by strip will be explained. Suppose that caption lines to be displayed on the screens D21 and D22 are stored in the caption management data 122 shown in FIG. 4 (the number of caption lines being N), and video images currently displayed on the caption area MA1 are caption lines Mn (n: positive integer from 1 to N) positioned at the topmost position to the n-th position in the caption management data 122.

When the user depresses the cursor key 3 downward (step S131; Yes), the control unit 11 compares (N-n) with 2 to determines whether the caption line currently displayed on the caption area MA3 is not the caption line MN (caption line having the last playback timing) stored last in the caption management data 122 (step S132). When (N-n) is greater than 2 (step S132; >), the caption line currently displayed on the caption area MA3 is not the caption line MN (caption line having the last playback timing) stored last in the caption management data 122, the control unit 11 displays caption lines next to the currently displayed caption lines on the caption areas MA1 to MA3 in place of the currently displayed caption lines (step S133). In a specific example, the caption lines M1 to M3 displayed on the screen D21 in FIG. 17A are replaced with the caption lines M2 to M4 on the screen D22 in FIG. 17B.

The control unit 11 reads video images corresponding to respective caption lines newly displayed in step S133 from the content-recorded data 121 and displays them on the respective video areas RA1 to RA3 (step S134). In a specific example, the video images R1 to R3 displayed on the screen D21 are replaced with the video images R2 to R4 on the screen D22. This completes the process of scrolling the display downward by one screen.

When (N-n) is 2 (step S132; =), the caption line currently displayed on the caption area MA3 is the caption line stored last in the caption management data 122. In this case, the control unit 11 terminates the process, and keeps displaying the captions currently displayed on the caption areas MA1 to MA3 even when the user depresses the cursor key 3 downward.

When the user depresses the cursor key 3 upward (step S135; Yes), upward scroll display is executed to display previous captions and video images strip by strip.

At this time, the control unit 11 compares (n−1) with 0 in order to discriminate whether the caption line Mn displayed on the topmost caption area MA1 is the caption line M1 the top caption line M1 in the caption management data 122.

When (n−1) is greater than 0 (step S136; >), the caption line Mn displayed on the caption area MA1 is not the top caption line M1. At this time, the control unit 11 displays caption lines given with display times preceding by one to the currently displayed caption lines on the caption areas MA1 to MA3 (step S137). Further, the control unit 11 reads video images corresponding to the caption lines newly displayed in step S137 from the content-recorded data 121, and displays the video images on the video areas RA1 to RA3.

Figure 17B:
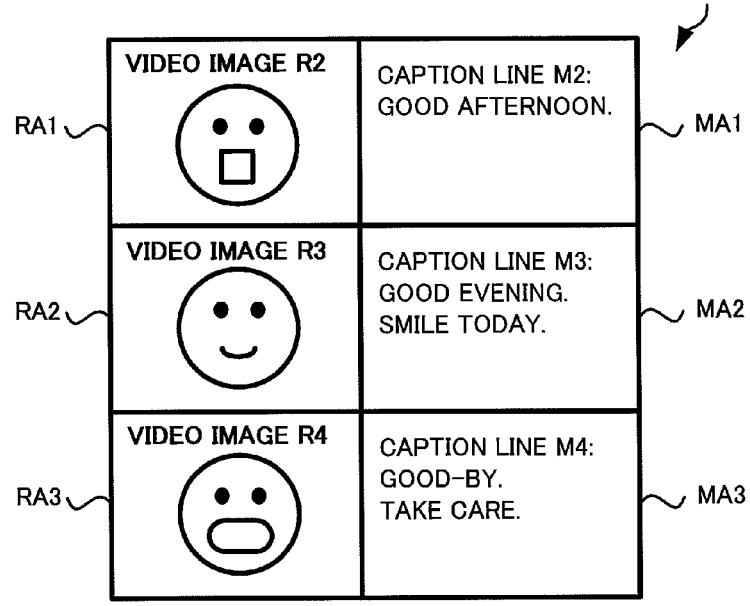
FIG. 17B is a diagram showing a screen after the screen is scrolled down by one strip in the 3-strip display mode.

Specifically, in a case where when the screen D22 shown in FIG. 17B is displayed, when the user depresses the cursor key 3 upward, the process of step S137 allows the caption lines M1 to M3 to be displayed on the caption areas MA1 to MA3 in place of the currently displayed caption lines M2 to M4. Further, the process of step S138 allows the video images R1 to R3 corresponding to the playback timings of the caption lines M1 to M3 are displayed on the video areas RA1 to RA3 in place of the currently displayed video images R2 to R4. Accordingly, the screen D21 shown in FIG. 17A is displayed.

When (n−1) is 0 in step S136 (step S136; =), the caption line currently displayed on the caption area MA1 is the top caption line M1 in the caption management data 122. At this time, the control unit 11 keeps displaying the caption lines M1 to M3 currently displayed on the caption areas MA1 to MA3 even when the user depresses the cursor key 3 upward. The foregoing operation can allow caption lines and video images corresponding to the caption lines to be scrolled by one strip when the user depresses the cursor key 3 upward or downward.

The contents of the foregoing processing of the flow of the one-strip scroll is partly changed and individual caption lines currently displayed are all replaced with caption lines located preceding or succeeding by the number of displayed video images (3 in the 3-strip display mode)" starting from each caption line. At this time, the screen can be scrolled as if pages of a book were turned (this operation will be hereinafter called "page flipping").

Hereinafter, the operation of displaying individual caption lines and video images given with playback timings later by the "number of displayed video images" in place of the currently displayed caption lines and video images is called "page feeding". The operation of displaying individual caption lines and video images given with playback timings earlier by the "number of displayed video images" in place of the currently displayed caption lines and video images is called "page back". The process in which the cell phone 1 executes "page flipping" will be described in the case of the "3-strip display mode" as an example.

Figure 20:
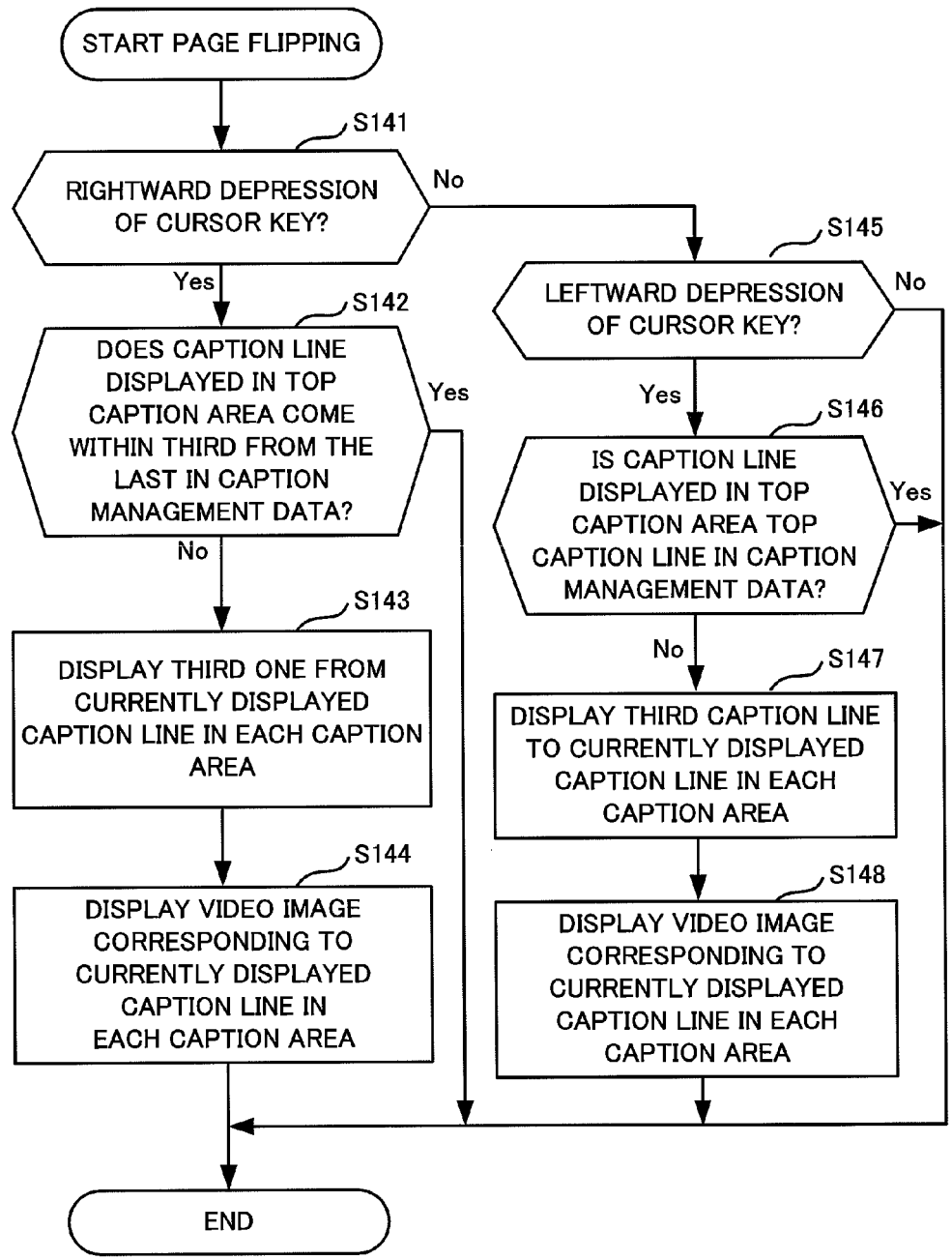
FIG. 20 is a flowchart showing a page flipping process.
Figure 21:
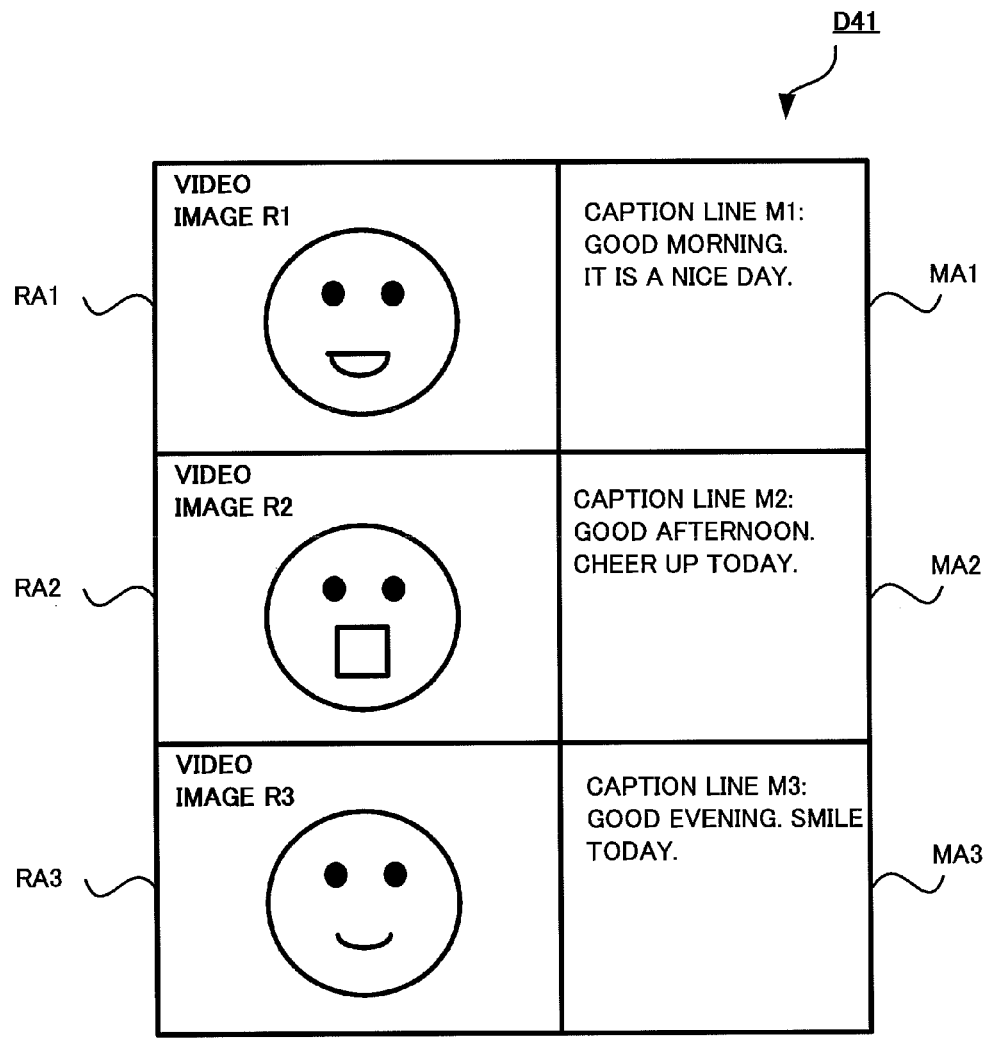
FIG. 21 is a diagram showing an example of a screen before a caption line containing a larger number of characters than the displayable character number of the caption area is fully displayed.

As shown in FIG. 20, the control unit 11 determines whether the cursor key 3 is depressed rightward to discriminate if "page feeding" has been instructed by the user (step S141). When there is such an instruction (step S141; Yes), the control unit 11 determines whether any one of the caption lines from the last one to the third one from the last is currently displayed on each of the caption areas MA1 to MA3 to discriminate "page feeding" is enabled or disabled (step S142). When such a caption line is not currently displayed (step S142; No), the control unit 11 displays caption lines given with the playback timings later by 3 than the currently displayed caption lines on the caption areas MA1 to MA3 in place of the currently displayed caption lines (step S143). The control unit 11 also displays video images corresponding to the caption lines displayed on the caption areas MA1 to MA3 on the video areas RA1 to RA3, respectively (step S144).

Transition of the screen on the display panel 5 when "page feeding" is carried out will be explained specifically. Suppose that a screen to be subjected to "page feeding" is a screen D31 shown in FIG. 19A. The video images R1, R2, R3 are displayed on the video areas RA1, RA2, RA3 while the caption lines M1, M2, M3 are displayed on the caption areas MA1, MA2, MA3.

When the user depresses the cursor key 3 rightward, the control unit 11 displays caption lines M4 to M6 given with playback timings set later than the caption lines M1 to M3 by the "number of displayed video images (3)" on the caption areas MA1 to MA3, and displays the video images R4 to R6 on the video areas RA1 to RA3. Thereafter, every time the user depresses the cursor key 3 rightward, pages for the caption lines and the video images corresponding thereto are fed.

In case of returning page, the control unit 11 determines whether the user has depressed the cursor key 3 leftward in step S145 shown in FIG. 20. When such depression has occurred (step S145; Yes), the control unit 11 determines whether the caption line Mn displayed on the topmost caption area MA1 is the caption line M1 given with the top display time in the caption management data 122 (step S146).

When the caption line Mn is not the top caption line M1 (step S146; No), page back is possible. At this time, the control unit 11 reads individual caption lines given with playback timings set earlier than the currently displayed caption lines by the "number of displayed video images (3)" from the caption management data 122, and displays the caption lines on the caption areas MA1 to MA3 (step S147). Further, the video images corresponding to the individual caption lines displayed on the caption areas MA1 to MA3 are displayed on the video areas RA1 to RA3, respectively, so that page is fed backward (step S148).

The foregoing operation enables "page flipping (page feeding or page back). The screen changeover method in "page flipping" is not limited to the rightward or leftward depression of the cursor key 3, but may be the operation of a soft key or the like displayed on the soft-key area FA by operating the operational section 13.

An embodiment for improving the user's convenience regarding "display of caption line" will be described next. When the number of characters contained in a caption line in a content is greater than the number of characters displayable on the caption area, the foregoing embodiment ranges a problem that even when the caption line is displayed on the caption area, the caption line breaks in midway and is not fully displayed.

To overcome the problem, for example, the caption area should be enlarged to make the number of the characters displayable on each caption area larger than the number of the characters than the number of the characters contained in a caption line in a content. The following will describe the operation of enlarging the caption area to display a caption line containing a greater number of characters than the number of characters displayable on each caption area (hereinafter "long caption line") when the number of characters to be displayed on each caption area is greater than the number of characters displayable on the caption area (hereinafter "number of displayable characters").

Figure 23:
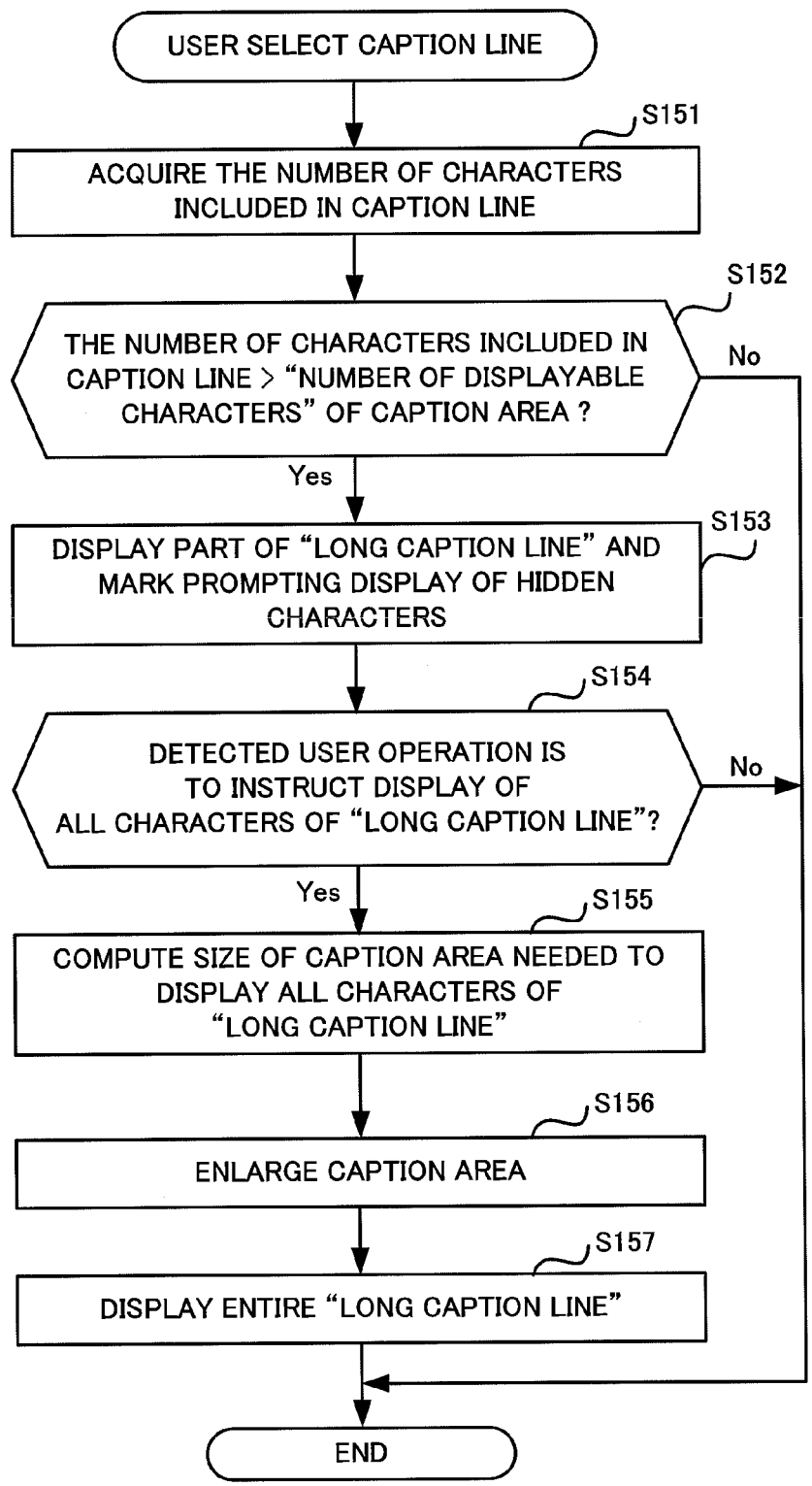
FIG. 23 is a flowchart illustrating a process of enlarging the caption area.

As shown in FIG. 23, when the user selects an arbitrary caption line with the cursor key 3, the control unit 11 acquires the number of characters in the selected caption line (step S151), and determines whether the number of characters is greater than the "number of displayable characters" (step S152). When the acquired number of characters of the caption line is equal to or less than the "number of displayable characters" and the caption line can be displayed on the currently secured caption area (step S152; No), the process is terminated.

When the acquired number of characters of the caption line is a "long caption line" and the number of characters contained therein is larger than the "number of displayable characters" (step S152; Yes), the content of the caption line cannot be fully displayed on the currently secured caption area. To show that the "long caption line" has a continuous part, the control unit 11 acquires the "number of displayable characters" from the top of the "long caption line", displays the characters on the caption area, and displays a mark prompting to display hidden characters in the "long caption line" on the caption area (step S153).

A specific example of the screen displayed at step S153 when the caption line selected by the user is a "long caption line" will be explained. If the screen displayed when the user has selected the "long caption line" is a screen D41 shown in FIG. 21, the caption line M2 displayed on the caption area MA2 is a "long caption line M2" containing a larger number of characters than the displayable number of characters, and cannot therefore be fully displayed on the current caption area MA2.

At this time, the control unit 11 displays the "number of displayable characters" from the top of the "long caption line M2" on the caption area MA2. In addition, the control unit 11 displays a mark ("←") for prompting the user to display hidden characters in the "long caption line M2".

Then, the control unit 11 stands by until the user's operation of the operational section 13 is detected. When such an operation is detected, the control unit 11 determines whether the operation instructs to display all the characters in the "long caption line" (step S154). The instruction to display all the characters may be executed as a display settle key (not shown) is depressed. When the user's operation is not an instruction to display all the characters (step S154; No), the process is terminated. When the operation instructs to display all the characters (step S154; Yes), the control unit 11 computes the size of the caption area needed to display the selected "long caption line" (step S155).

The process of step S155 will be explained specifically. Suppose that the user has operated the cursor key 3 to have selected the caption area MA2 on the screen D41 shown in FIG. 21. At this time when the user consecutively operates the operational section 13 to instruct to display all the characters of the "long caption line", the control unit 11 acquires the number of characters (20) in a caption line ("Good afternoon. Cheer up today.") stored in the caption management data 122. Further, the control unit 11 multiplies a value equal to or slightly greater than the acquired number of characters by the size of pixels of font data of each character (the number of vertical characters×the number of horizontal characters) to acquire the size of the caption area that can display the entire number of characters of the "long caption line".

Then, the control unit 11 secure the caption area for displaying a "long caption line" on the display area according to the acquired size (step S156). The control unit 11 then displays the entire "long caption line" on the caption area (step S157). This is the end of the process of enlarging and displaying the caption area.

An example of the screen which is allowed by the process of step S157 to show the entire "long caption line" on the caption area with the size tended by the process of step S156 will be described. In the example of a screen D42 shown in FIG. 22A, the control unit 11 avoids overlapping of the caption area MA2 with the caption areas MA1 and MA3, and extends only the horizontal size of the caption area MA2 while keeping the vertical size of the caption area MA2 constant to secure the required area, so that the user can see all the caption lines M1 to M3.

Figure 22A:
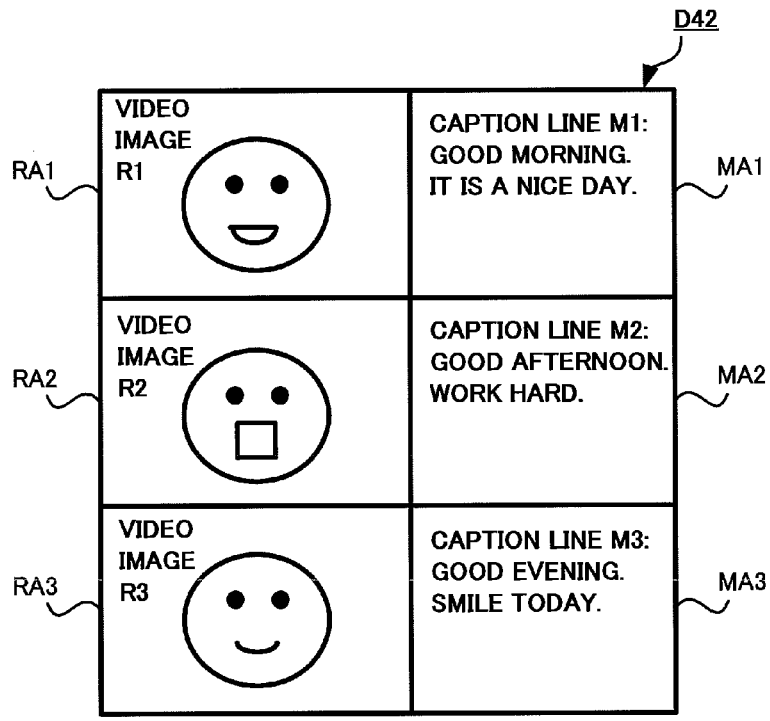
FIG. 22A is a diagram showing a first example of a screen after a caption line containing a larger number of characters than the displayable character number of the caption area is fully displayed.
Figure 22B:
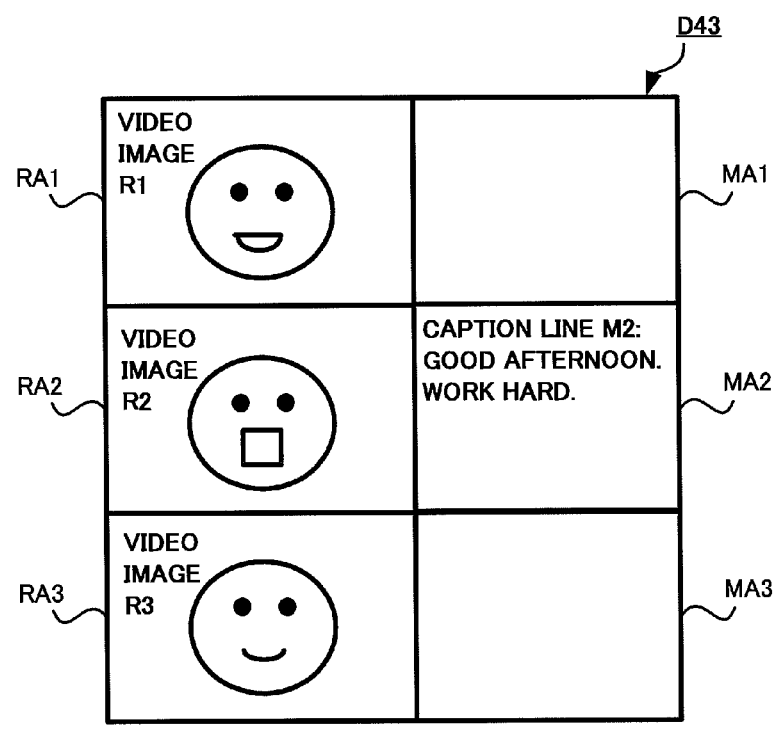
FIG. 22B is a diagram showing a second example of a screen after a caption line containing a larger number of characters than the displayable character number of the caption area is fully displayed.

In the example of a screen D43 shown in FIG. 22B, the control unit 11 avoids overlapping of the caption area MA2 with the video area R2, and extends only the vertical size of the caption area MA2 while keeping the horizontal size of the caption area MA2 constant to secure the required area, so that the user can see the entire caption line M2 and each of the video images R1 to R3. At this time, a caption line is not displayed on the caption areas MA1, MA3 other than the caption area showing the "long caption line". When the state where the screen D42 shown in FIG. 22A and screen D43 shown in FIG. 22B is returned to the state where the screen D41 before size extension shown in FIG. 21, the termination of the display of the entire "long caption line" should be instructed by depression of the settle key or the operation of the operational section 13 or the like.

Application Example 2-1

Next, an application example for improving the user's convenience regarding "display of video image" at the time of playing back a content will be described.

First, a description will be given of an embodiment which allows the user to grasp the relation between previous and succeeding contents more easily by increasing the number of video images to be simultaneously displayed on video areas with the same size.

In general, there are video images with the ratio of the horizontal size to the vertical size (aspect ratio) of 4:3 (hereinafter "normal video image") and video images with the aspect ratio of 16:9 (hereinafter "lateral video image") as the types of video images to be TV broadcast.

Figures 24A, 24B:
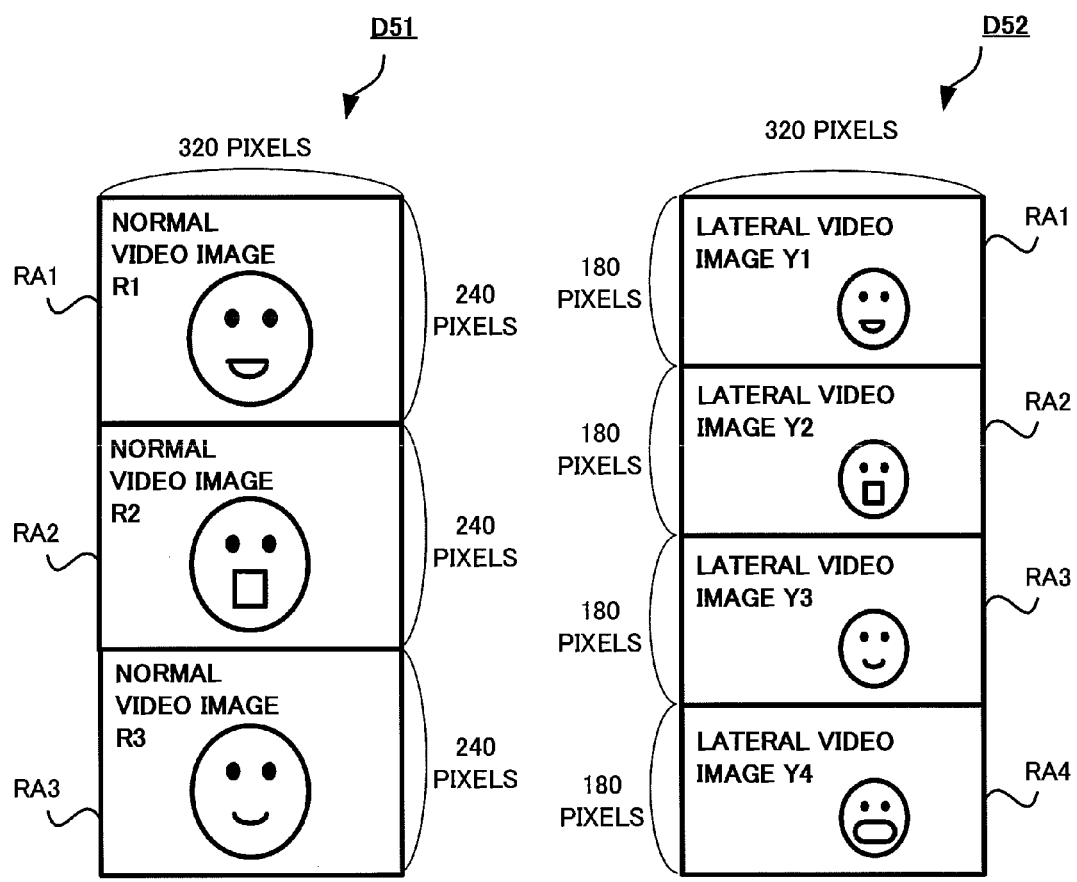
FIG. 24A is a diagram showing an example of a screen when a normal video image is displayed in the "3-strip display mode"
FIG. 24B is a diagram showing an example of a screen when a lateral video image is displayed in a "4-strip display mode"

As a specific example, normal video images are normal video images R1, R2, R3 shown in FIG. 24A, while lateral video images are lateral video images Y1, Y2, Y3, Y4 shown in FIG. 24B. The size of each of the normal video images R1 to R3 is 240 vertical pixels×320 horizontal pixels, and the size of each of the lateral video images Y1 to Y4 is 180 vertical pixels×320 horizontal pixels. Suppose that a video area having the vertical size of 720 pixels and the horizontal size set equal to the horizontal size (320 pixels) of the normal video images R1 to R3 and the lateral video images Y1 to Y4 is secured. The three normal video images R1 to R3 can be displayed in series vertically on the secured video area as seen on a screen D51 shown in FIG. 24A. Further, the four lateral video images Y1 to Y4 can be displayed in series vertically on the secured video area as seen on a screen D52 shown in FIG. 24B.

That is, when a video area having a vertical size which has both the vertical size of normal video images and the vertical size of lateral video images as common divisors is secured, a larger number of lateral video images than normal video images can be displayed simultaneously, so that the user can view a larger number of video images. The same is applied to the horizontal size of video areas.

A description will now be given of the process of displaying a screen in the "3-strip display mode" when video images read from the content-recorded data 121 are normal video images, and displaying a screen in the "4-strip display mode" when video images read from the content-recorded data 121 are lateral video images. It is premised that the control unit 11 has secured a video area having a vertical size of 720 pixels and a horizontal size of 320 pixels on the display area of the display panel 5 when the process is invoked.

Figure 25:
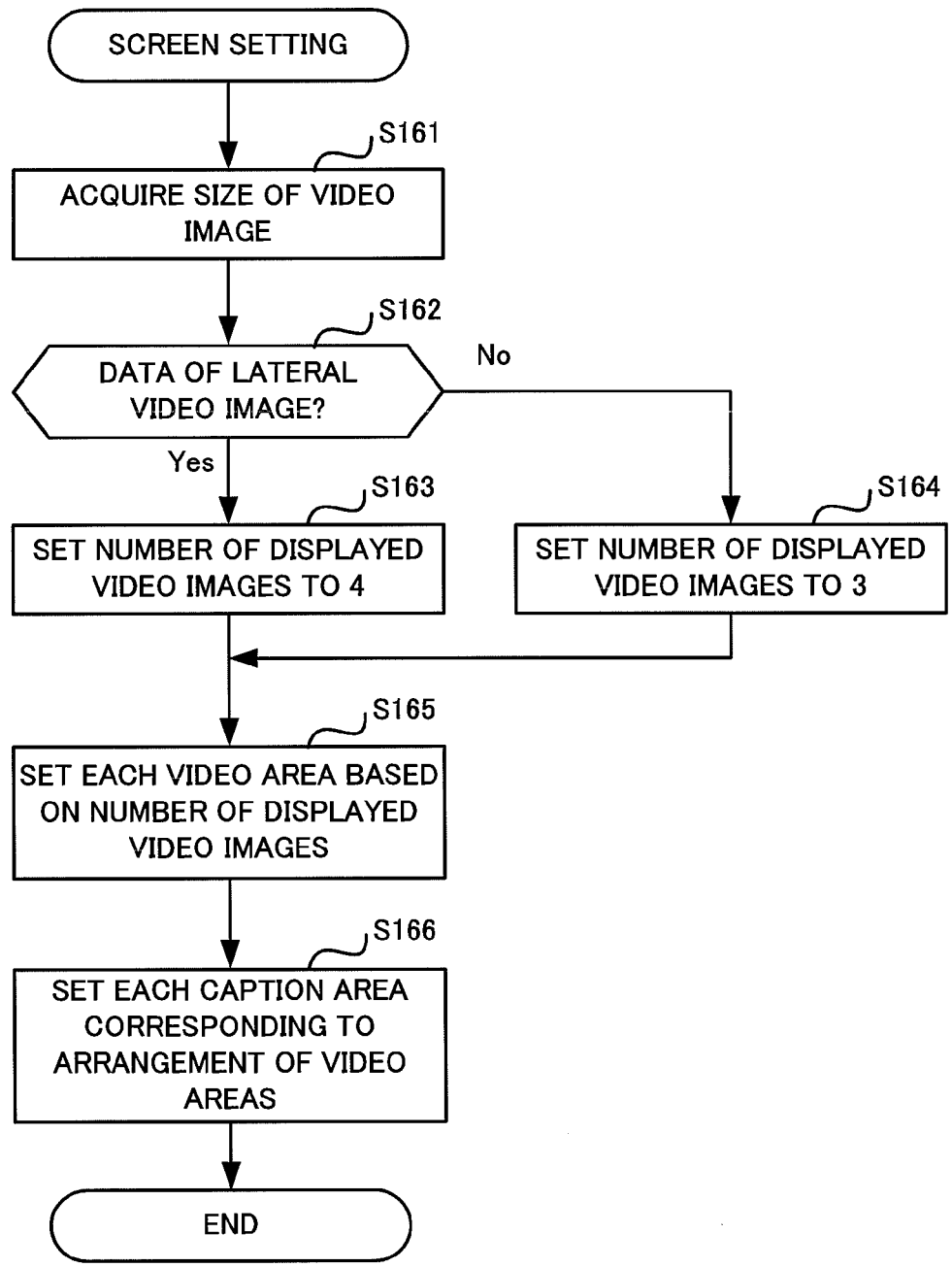
FIG. 25 is a flowchart showing a process of setting screen when a lateral video image is displayed in the "4-strip display mode" or "3-strip display mode" according to the format of video images (lateral video image or normal video image)

As shown in FIG. 25, when the user operates the operational section 13 to instruct initiation of an application for viewing a captioned video image or selection of the multiple video-display mode, the control unit 11 starts the screen setting process. After the process has started, the control unit 11 acquires the sizes of video images read from the content-recorded data 121 based on the vertical and horizontal pixels or the like (step S161).

After the acquisition, the control unit 11 acquires the aspect ratio of the sizes of the video images read from the content-recorded data 121, determines that the video images are lateral video images when the aspect ratio is 16:9 (step S162; Yes) and sets the "number of displayed video images" to 4 (step S163).

Then, the control unit 11 divides the vertical size (720 pixels) of the secured video area on the display area by the "number of displayed video images" set in step S163 to divide the secured video area into four video areas RA1 to RA4 each having 180 vertical pixels and 320 horizontal pixels aligned in series vertically (step S165).

The control unit 11 divides the caption area according to the separated video areas (step S166). The control unit 11 displays the lateral video images Y1 to Y4 on the respective video areas separated in step S165, and displays caption lines corresponding to the video areas on the respective caption areas separated in step S166. At this time, the screen D52 shown in FIG. 24B is displayed on the display panel 5.

When the aspect ratio of the sizes of the video images is 4:3, the control unit 11 determines that the video images are normal video images (step S162; No) and sets the "number of displayed video images" to 3 (step S164). Then, the control unit 11 divides the vertical size of the video area by 3 to divide the secured video area into three video areas RA1 to RA3 each having 240 vertical pixels and 320 horizontal pixels aligned in series vertically (step S165). The control unit 11 also divides the caption area according to the separated video areas (step S166). The control unit 11 displays the normal video images R1 to R3 on the respective video areas separated in step S165, and displays caption lines corresponding to the video areas on the respective caption areas separated in step S166. At this time, the screen D51 shown in FIG. 24A is displayed on the display panel 5.

Through the foregoing process, individual video images are displayed according to the type (lateral video image or normal video image) of the video images in the content, and a larger number of video images than those normal video images can be displayed when the video images are lateral video images. In this embodiment, i) 1-strip scroll, ii) page flipping, and iii) display of a longer caption line than is allowed by the number of displayable characters can be applied.

The foregoing description of the embodiment has been given of the case of the display mode of displaying a plurality of video images in series vertically. However, the cell phone 1 according to the embodiment can change the display positions of the caption areas and the video areas, and display caption lines and video images in various layouts.

The following will describe a modification of the embodiment where four caption lines and individual video images respectively corresponding to the caption lines are arranged in a lattice pattern. It is to be noted that the operational state of displaying caption lines and video images corresponding thereto both arranged in a lattice pattern is called "lateral display mode" while the operational state of displaying caption lines and video images corresponding thereto both aligned in series vertically a lattice pattern is called "longitudinal display mode".

Figure 26:
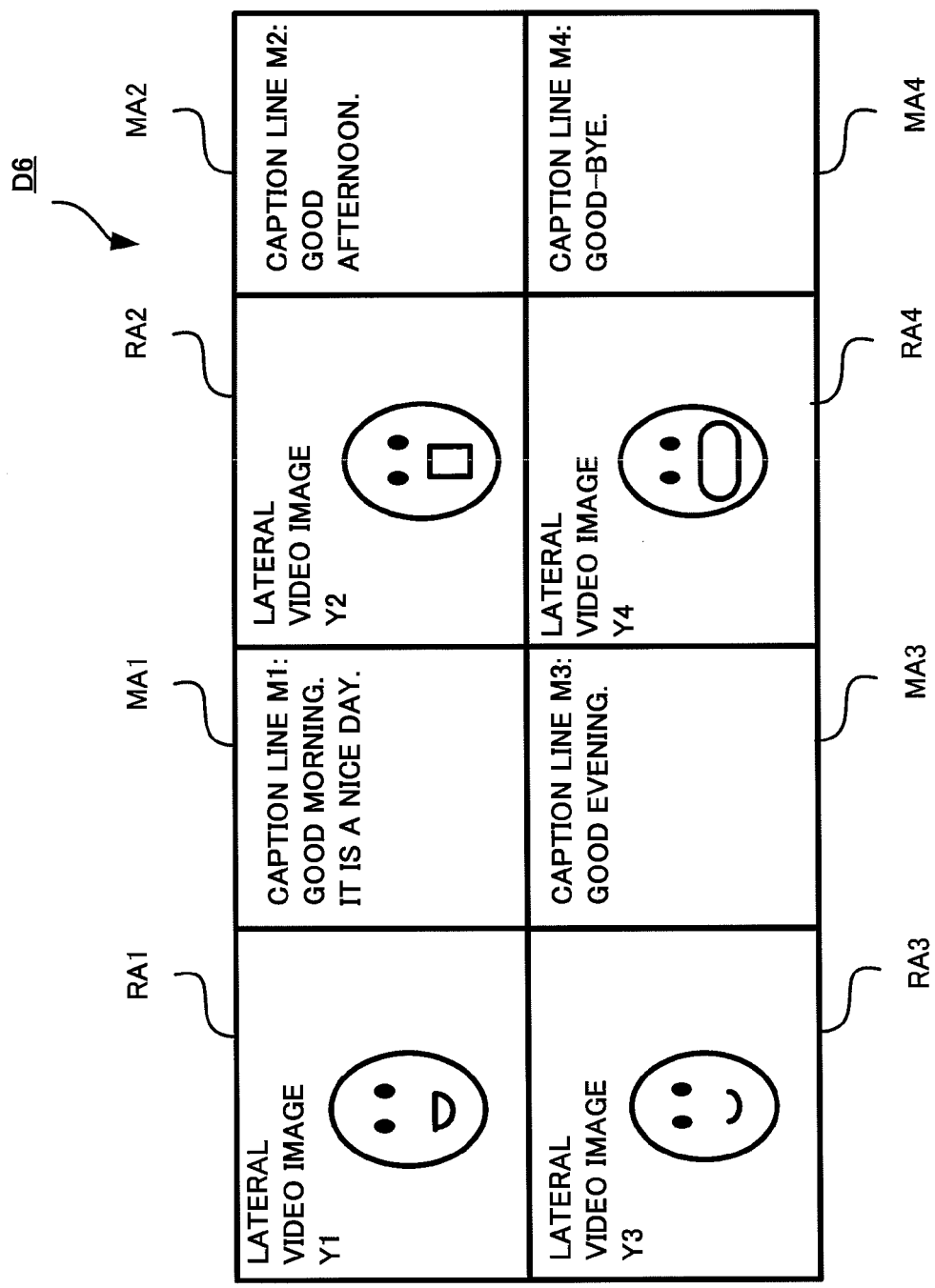
FIG. 26 is a diagram showing an example of the screen structure in a "lateral display mode"

Like a display screen D6 shown in FIG. 26, the screen that is displayed in the "lateral display mode" has individual lateral video images Y1 to Y4 arranged in a lattice pattern on the display area of the display panel 5 with the lengthwise direction of the display area matching with the lengthwise direction of each of the lateral video images Y1 to Y4. The screen that is displayed in the "longitudinal display mode" is the screen D1 shown in FIG. 15. The user can change over the view mode between the "longitudinal display mode" and the "lateral display mode" by operating the operational section 13.

Figure 27:
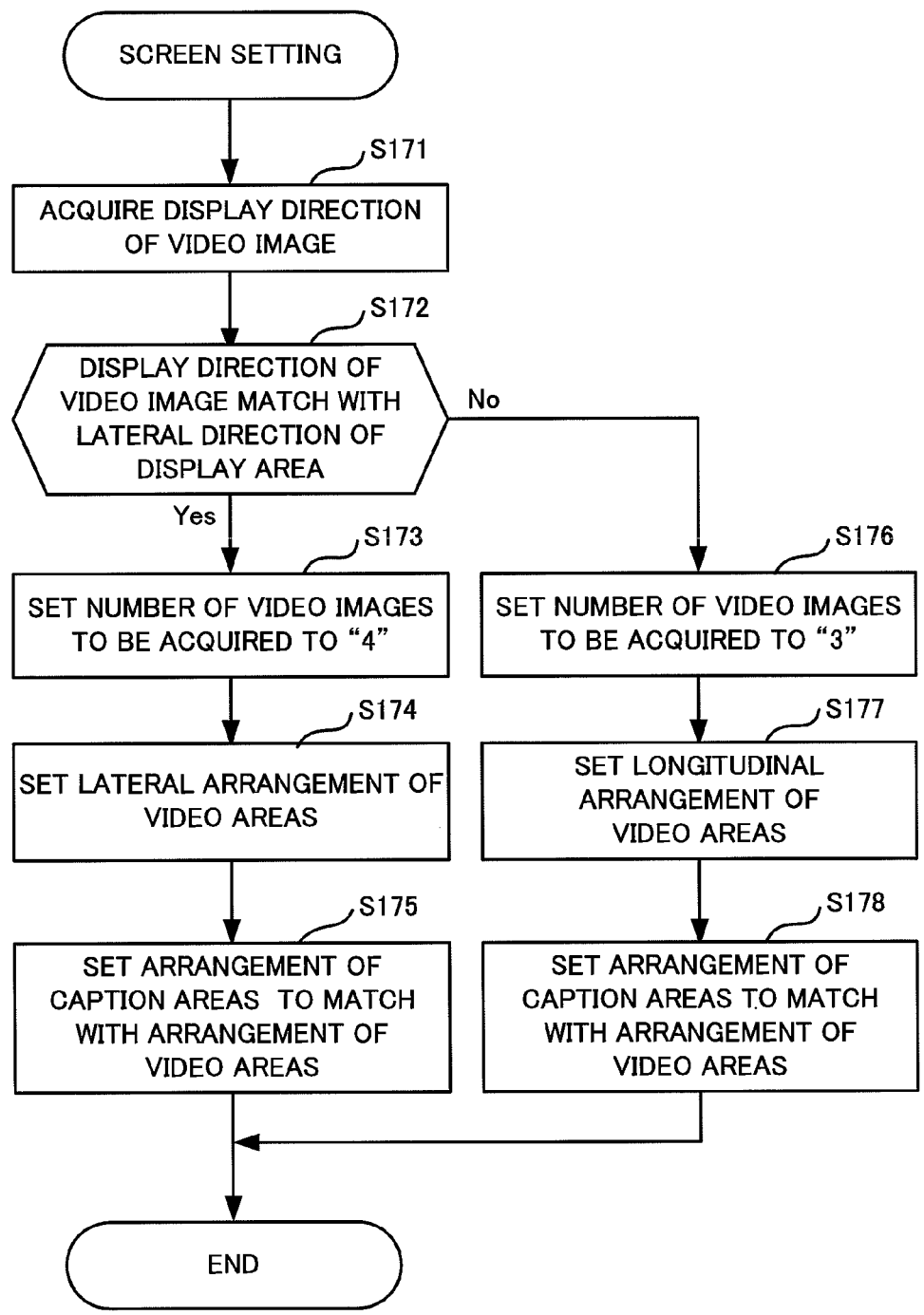
FIG. 27 is a flowchart showing an example of a process of setting the screen in the "lateral display mode"

The following will describe the process of setting the screens that are compatible with the "longitudinal display mode" and the "lateral display mode". As shown in FIG. 27, the control unit 11 acquires the display direction of a video image in a content with respect to the lengthwise direction of the display area (hereinafter called "lateral direction") (step S171). At this time, the control unit 11 acquires the display direction of a video image based on information on the resolution included in the video signal of the TV signal SG. The information on the resolution is, for example, "320 pixels× 180 pixels×16 bits" in case of the video virtual plane of a lateral video image in one-segment broadcasting.

Subsequently, the control unit 11 determines whether the acquired display direction of a video image matches with the lateral direction of the display area (step S172). When the display direction of a video image matches with the lateral direction of the display area (step S172; Yes), the control unit 11 sets the number of video images to be acquired (number of video images to be acquired) from the content-recorded data 121 to 4 (step S173). After the setting, the control unit 11 executes the process of setting the display screen in the "lateral display mode".

The control unit 11 secures an area to be allocated as a caption area and a video area onto the display area to ensure the lattice arrangement of the individual video areas and caption areas in setting the lateral arrangement of the video areas (step S174) and setting the arrangement of the caption areas to match with the arrangement of the video areas (step S175). After securing the display area, the control unit 11 separates the display area at the longitudinal center position and the lateral center position into four areas arranged in a lattice pattern.

The present invention arranges the individual video images in each separated area in the display direction determined in step S171, and sets each arranged area to a video area (step S174). Specifically, for example, the video areas after the setting are the four video areas RA1 to RA4 on the screen D6 shown in FIG. 26.

The control unit 11 sets the remaining areas after subtracting the individual video areas set in step S175 from the separated areas to the individual caption areas (step S175). Specifically, for example, the caption areas after the setting are the four caption areas MA1 to MA4 on the screen D6 shown in FIG. 26. Then, the control unit 11 displays, on the respectively caption areas, individual caption lines corresponding to the playback timings of individual video images displayed on the respective video areas.

When the display direction of a video image matches with the longitudinal direction of the display area (step S172; No), the control unit 11 sets the "number of video images to be acquired" to 3 (step S176), and executes the process of setting the screen for the "longitudinal display mode". At this time, the control unit 11 uniformly separates the longitudinal directional size of the screen D6 into three so that individual video areas and individual caption areas are arranged in series vertically on the display panel 5. The contents of the processes of subsequent steps S177 and S178 are substantially identical to those of steps S174 and S175.

Through the foregoing processes, the screens that are compatible with the "longitudinal display mode" and the "lateral display mode" can be set. The screen setting process can automatically set the screens in "longitudinal display mode" and "lateral display mode" according to the display direction of video images of a content, when activated before the flow shown in FIG. 16 as the user operates the operational section 13 to instruct initiation of an application for viewing a captioned video image or selection of the multiple video-display mode. In this embodiment, 1-screen scroll, page flipping, and enlargement of caption areas in the "long caption line" display mode can be applied.

A description will now be given of an embodiment of improving the user's convenience when "video images of different contents" are displayed on the display panel 5. When video images of a plurality of contents are displayed on the display panel 5 at the same time, the user has a difficulty in determining whether individual video images are contained in the same content or different contents.

To determine whether individual video images are contained in the same content or contained in different contents when a plurality of video images are displayed on the display panel 5, titles should be given to the individual contents to discriminate whether a plurality of video images are contained in the same content or not.

The fundamental configuration of the cell phone 1 for achieving the operation in a titled display mode is the same as the configuration shown in FIG. 2, except that the storage unit 12 shown in FIG. 2 stores caption management data 122 and content-recorded data 121 each of which corresponds to a plurality of contents.

The storage unit 12 stores contents list data 124. The contents list data 124 includes items, such as "title TL", "recording date TT", and "genre TJ" as exemplified in FIG. 28, which are associated with the each content.

The "title TL" is an item indicating a title given to each content. The "recording date TT" is an item indicating a period from the date and time on which recording of each content has started and the date and time on which the recording has ended. The "genre TJ" is an item indicating a field in which each content is categorized according to the content, such as news, sports or drama. Information to be stored in the genre TJ can be acquired from, for example, EIT (Event Information Table) or the like in one-segment broadcasting.

The user can select a content given with a "title TL" by operating the operational section 13. The control unit 11 reads the title TL of the content selected by the user from the contents list data 124, and displays the title TL on the display panel 5 via the display unit 14. A specific example of the screen on which the title TL read from the contents list data 124 is displayed (hereinafter "titled screen") on a screen D71 shown in FIG. 29A.

In case of displaying a titled screen D71, a title area TA for displaying a title TL1 of a content selected from the contents list data 124 and currently played back is provided at the lower left portion of the display area on the display panel 5, and the title TL1 ("story of moon") is displayed in the title area TA. The content with the title TL1 has the latest recording date TT in the contents list data 124 shown in FIG. 28.

The video areas RA1 to RA3 arranged in series in the vertical direction are provided in the center portion of the display area, and video images R11 to R13 corresponding to the title TL1 currently displayed in the title area TA are displayed. Further, caption lines M11 to M13 having playback timings corresponding to the video images R11 to R13 are displayed on the caption areas MA1 to MA3.

When a video image is displayed in a predetermined area defined by a rectangle, it is likely that displaying the video image near the center portion of the predetermined area provides a better visibility for a user. In this respect, the control unit 11 sets the video areas RA1 to RA3 where a plurality of video images of the content currently played back are displayed in such a way that the video areas RA1 to RA3 are vertically arranged in series in the vicinity of the lateral center position of the display area.

A video area RA4 for displaying a video image in a content with the latest recording date TT in the contents list data 124 shown in FIG. 28 is provided in the left center of the display area. It is to be noted that because the latest content (content with the title TL1) is currently played back in the example of FIG. 29A, a video image R22 of a content (title TL2 ("bird walk")) with the next latest recording date TT is displayed in the video area RA4.

A video area RA5 for displaying a content with the oldest recording date TT in the contents list data 124 is provided in the right center of the display area, and a video image R32 of a content with a title TL ("drive in car") is displayed in the video area RA5. A video image to be displayed in the video area RA4, RA5 is optional, and may be the first IDR frame of the content, a video image corresponding to a top caption line in the caption management data 122, or the like.

With the screen D71 displayed on the display area, the user can select another content instead of the currently displayed content by depressing the cursor key 3 leftward or rightward. At this time, the control unit 11 displays a video image in the content selected by the user and displays the title TL given to the content in the title area TA. A description will now be given of the process of switching the display of the title TL in the case as an example where the control unit 11 changes over the screen to be displayed on the display panel 5 from the screen D71 shown in FIG. 29A to a screen D72 shown in FIG. 29B in response to the user's depression of the cursor key 3.

Figure 30:
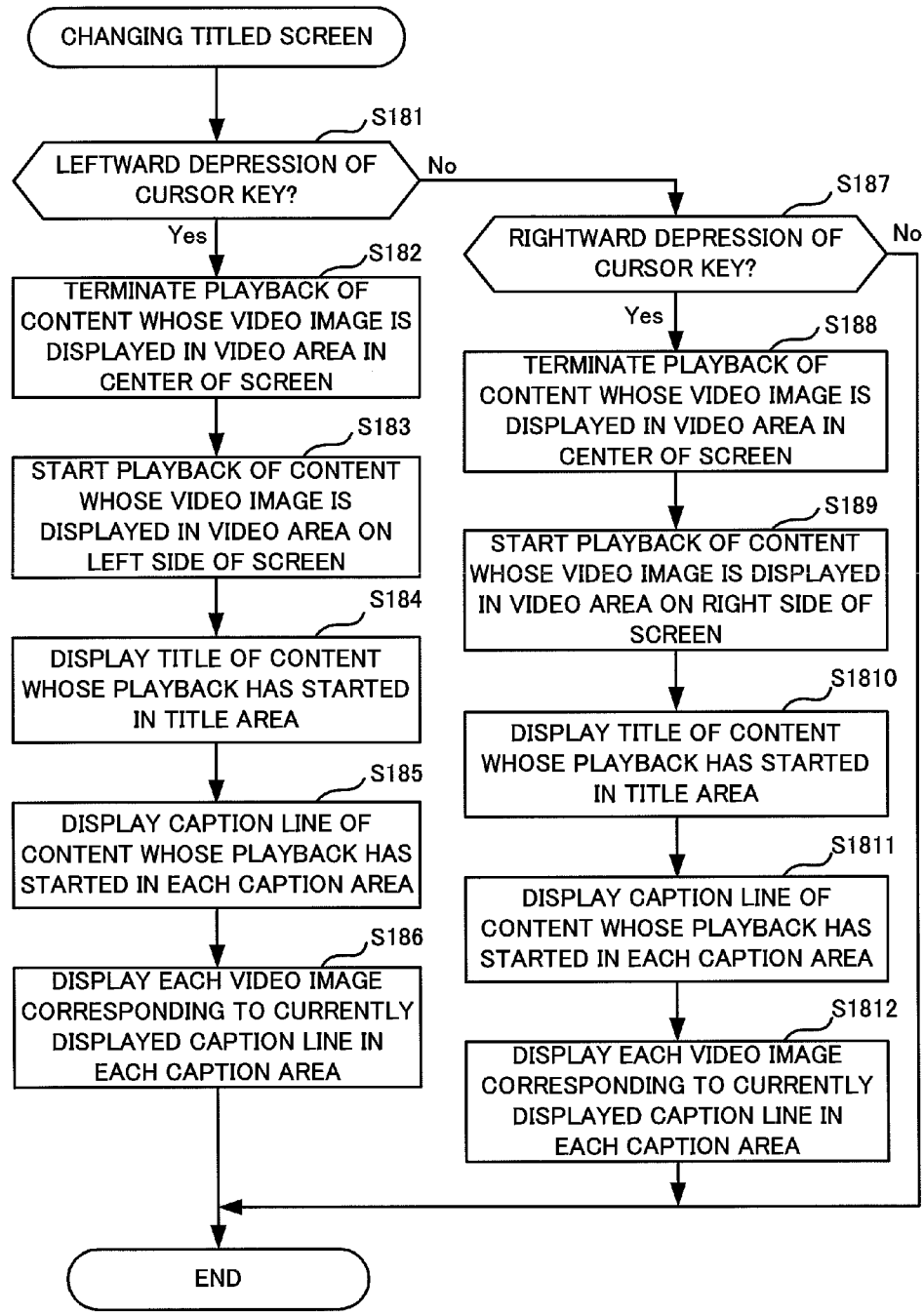
FIG. 30 is a flowchart showing a process of changing the title in a "titled display mode" as a captioned video image to be played back is changed.

As shown in FIG. 30, the control unit 11 stops playing back the content in the contents list data 124 whose title TL is currently displayed in the title area TA in response to the user's leftward depression of the cursor key (step S181; Yes). Accordingly, the display of the individual video images in the respective video areas RA1 to RA3 provided vertically in series in the center portion of the display area is terminated (step S182). Subsequently, the control unit 11 starts playing back a content containing the video image R42 currently displayed in the video area RA4 provided in the left center of the display area (step S183).

As playback of a content starts, the control unit 11 reads the title TL2 of the content whose playback has started from the contents list data 124, and displays the title TL2 in the title area TA (step S184).

The control unit 11 displays caption lines M21 to M23 of the content with the title TL2 whose playback has started in the respective caption areas MA1 to MA3 (step S185), and displays the video images R21 to R23 corresponding to the playback timings of the caption lines M21 to M23 in the respective video areas RA1 to RA3 located in the center of the display panel 5 (step S186). As a result, the titled screen D72 shown in FIG. 29B is displayed.

With the titled screen D72 displayed on the display panel 5, when the user depresses the cursor key 3 rightward (step S187; Yes), the control unit 11 terminates the playback of the content currently played back with the title TL2 or the playback of the content currently displayed in the video areas RA1 to RA3 (step S188). Then, the control unit 11 starts playing back the content whose video image R32 is displayed on the video area RA5 provided in the right center of the display area (step S189), and executes substantially the same processes as the processes of steps S184 to S186 explained above (step S1810 to S1812) to display the titled screen D71 shown in FIG. 29A. This is the end of the process of displaying a titled screen.

An embodiment for improving the user's convenience regarding "display of video image" will be described next. In the foregoing embodiment, areas of the same sizes are allocated as video areas to display respective video images at a time.

With video areas of the same sizes being secured to display a plurality of video images, even if the video images include a video image to which the user directs his/her attention (e.g., video image of a scene which is currently played back), this video image is displayed in the same size as the other video images. To overcome the shortcoming, the video area, where the video image to which the user pays his/her attention is displayed, may be enlarged to magnify the video image to be displayed.

The following will be described the operation of the control unit 11 to enlarge and display a video image in a content selected by the user's operation and currently displayed. The operational state where a video image currently played back is enlarged and displayed is called "video zoom-up display mode".

Figure 29A:
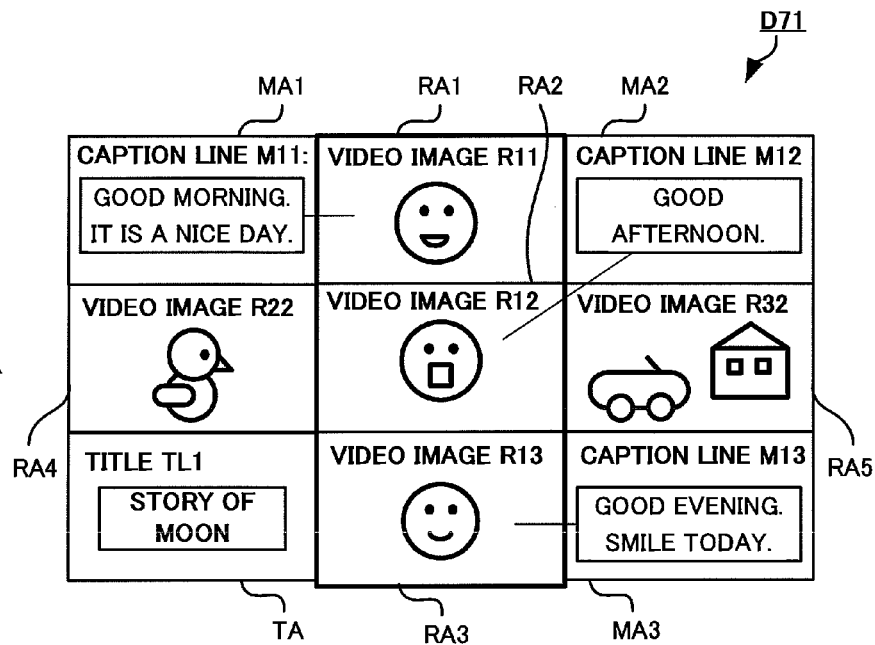
FIG. 29A is a diagram showing a first example of a titled screen when video images of a plurality of contents are displayed at the same time.
Figure 29B:
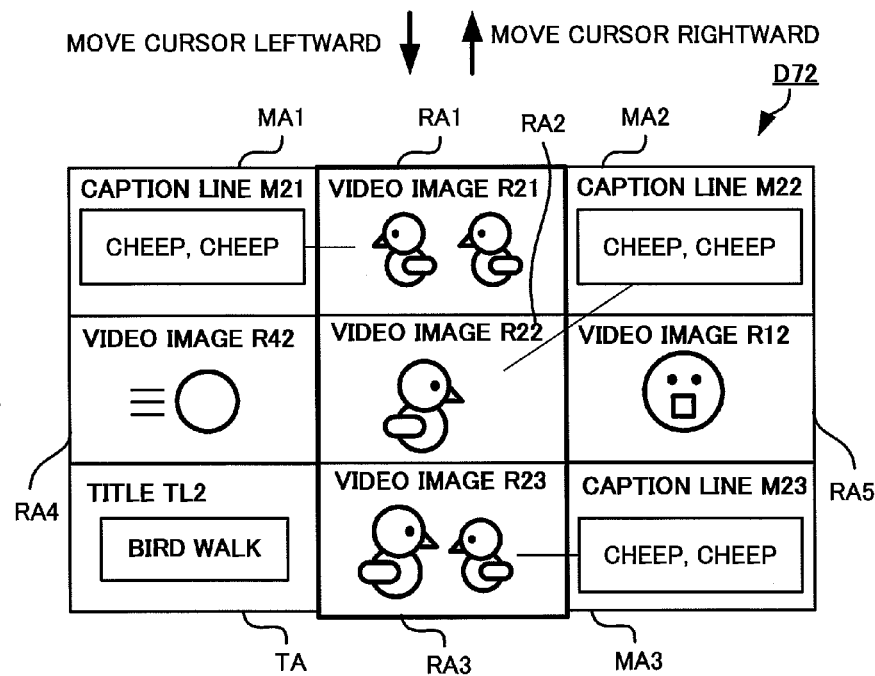
FIG. 29B is a diagram showing a titled screen when a content to be played back is changed during display of the titled screen in FIG. 29A.
Figure 31:
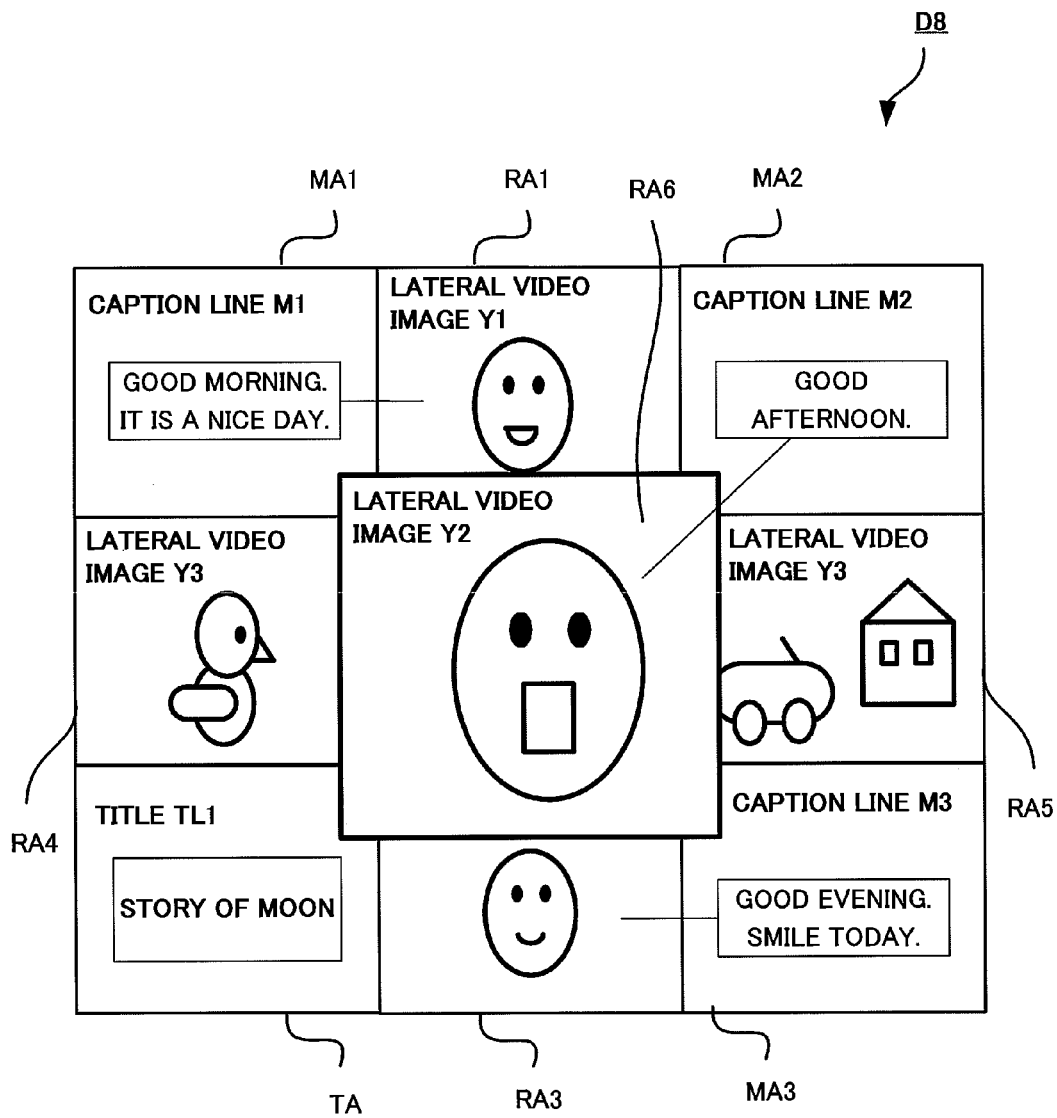
FIG. 31 is a diagram showing an example of a screen in a "video zoom-up display mode"
Figure 32:
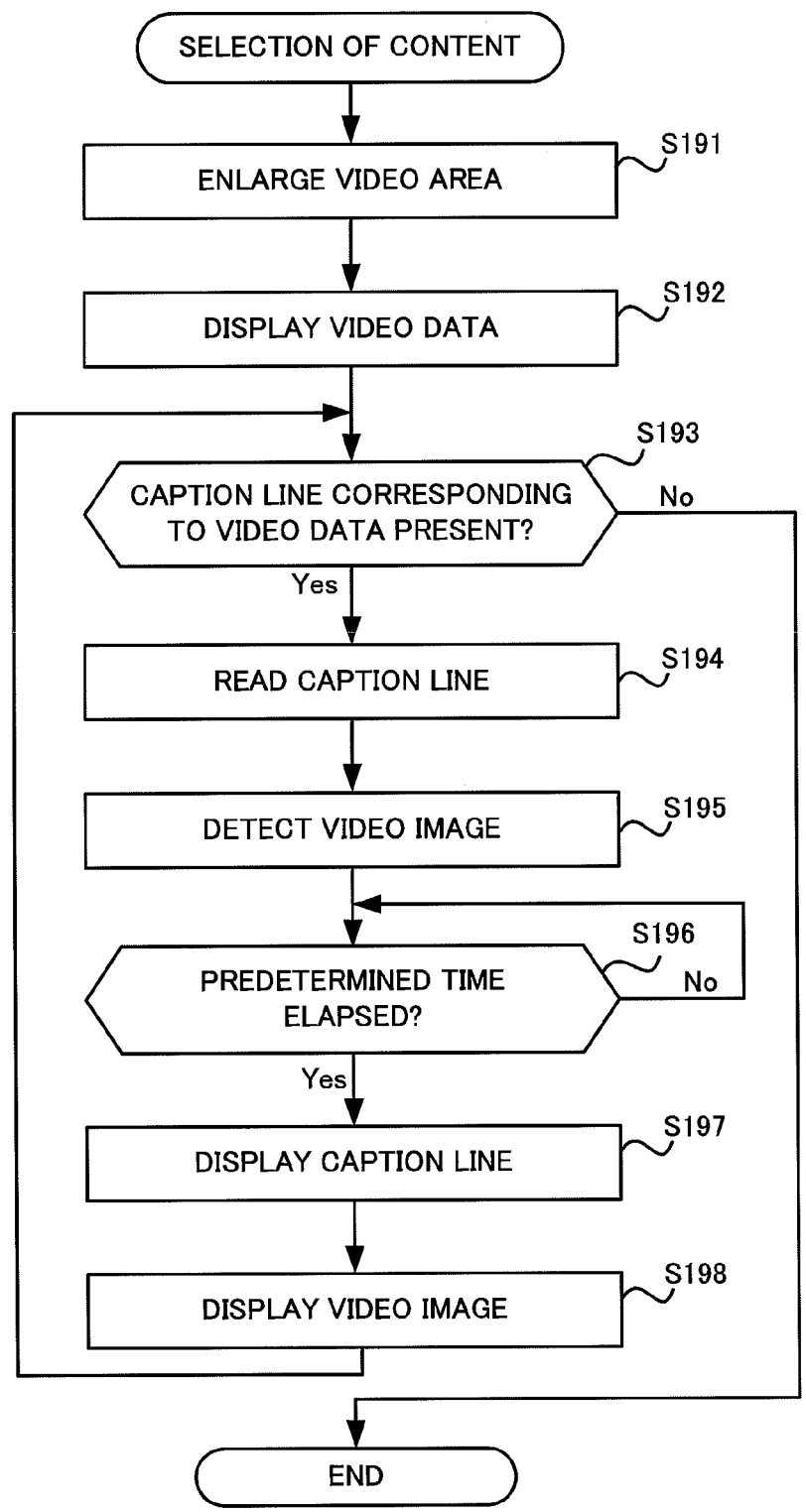
FIG. 32 is a flowchart illustrating an operation in the "video zoom-up display mode"

In the video zoom-up display mode, as shown in FIG. 32, when the user selects a video image displayed in the center of the screen D71 shown in FIG. 29A by operating the operational section 13, the control unit 11 enlarges the video area RA2 to newly secure a large video area RA6 as seen from a screen D8 shown in FIG. 31 and arranges the video area RA6 in the center portion of the display area (step S191). The reason why the enlarged video area RA6 is arranged in the center position of the screen D8 in the video zoom-up display mode is that the location near the center portion improves the visibility for the user on the display area defined by a rectangle. Subsequently, the control unit 11 enlarges the video image of the scene of the content selected by the user and currently played back, and displays the video image on the display panel 5 via the display unit 14 (step S192).

Next, the control unit 11 determines whether there is any caption line in the caption lines displayed on the caption areas MA1 to MA3 to which the next display time is given (step S193). When there is no such caption line (step S193; No), the control unit 11 terminates the video zoom-up display process. When there is such a caption line (step S193; Yes), on the other hand, the control unit 11 reads each caption line to which the next display time is given (step S194), and detects a video image corresponding to the display time of each caption line (step S195). The scheme of detecting such a video image is substantially the same as the foregoing scheme described referring to FIG. 16.

When reading caption lines and detection of a video image are completed, the control unit 11 starts the timer (not shown) to measure the time, and detects that a predetermined time has elapsed (step S196). The time is measured by the timer to detect that the playback timing TMn of the caption line Mn stored in the caption management data 122 is reached.

When detecting elapse of the predetermined time (step S196; Yes), the control unit 11 displays caption lines in the caption areas MA1 to MA3 (step S197), and displays individual video images corresponding to the playback timing TMn of the respective caption lines displayed in step S197 in the enlarged video area RA6 (step S198). That is, video images in the content with the title TL1 are sequentially displayed on the video area RA6 according to the playback timings of the caption lines.

Thereafter, the control unit 11 repeats executing the foregoing process until the last caption line MN relating to the content in the caption management data 122 is reached (step S193; No). This completes the process of playing back and displaying caption lines included in the content while playing back and displaying video images in the content on the enlarged video area.

According to the embodiment, as described above, a plurality of caption lines with display times can be played back and displayed on the display panel 5, and video images associated with the display times given to the individual caption lines can be played back and displayed. Accordingly, the user can view a caption line of the present playback scene of a captioned video image and caption lines and video images which are to be played back before and after the captioned video image, thus making it easier for the user to grasp the contents of the captioned video image.

According to the operation of the user, the cell phone 1 of the embodiment changes the display of caption lines currently displayed on the display panel 5 and video images corresponding to the respective caption lines with the display of those caption lines and video images corresponding thereto which precede or follow the currently displayed caption lines and video images by one, thereby achieving "1-strip scroll" of captioned video images. This can allow the user to view a video image ahead of the playback timing given to a currently displayed video image or view a video image which is to be played back after the currently displayed video image.

According to the embodiment, according to the user's operation, a currently displayed caption line and a video image corresponding to each caption line are changed over with a caption line and a video image corresponding thereto which are to be played back before or after by a predetermined timing in the caption management data 122, and displayed accordingly, thus achieving "page flipping" of captioned video images. This can allow the user to check the contents of multiple video images at the same time and find caption lines or video images of captioned video images or video images quicker than is achieved by the "1-strip scroll".

According to the embodiment, when a caption line containing more characters than are displayable in the caption area is assigned to the caption area, the control unit 11 increases the size of the caption area and displays all the characters contained in the caption line in response to the user's operation. This permits the user to read the entire caption line even if the caption line contains a larger number of characters than are displayable in the currently secured caption area, thus improving the user's convenience.

According to the embodiment, when the size of a caption area is increased, the size-increased caption area is arranged so that it does not overlie other caption areas or video areas. Accordingly, the user can read the entire caption line whose characters could not be fully displayed before the enlargement, without missing the display of a caption line preceding or following the caption line which contains a larger number of characters than are displayable in the caption area, and a video image corresponding to each caption line.

According to the embodiment, the number of video images to be displayed on a video area to show individual video images is changed according to the type of video images in a content ("lateral video image" or "normal video image"). Particularly, when video images to be displayed are "lateral video images", a larger number of video images can be displayed than the number of "normal video images" that are displayed on the screen at the same time. This can allow the user to obtain a greater amount of information when video images in a content to be viewed is "lateral video images" as compared with the case of viewing a content containing "normal video images".

According to the invention, even when video images of different contents are displayed simultaneously, the title of a content whose video image is currently selected by the user is displayed in the title area TA. This allows the user to distinguish video images in the currently selected content from those of other contents and check video images of other contents.

According to the embodiment, a content, selected by the user from video images currently displayed on the display panel 5 simultaneously, is played back and displayed as a captioned video image. Accordingly, the user can easily grasp what is inside the content containing the selected video image with the help of captioned display, and distinguish the currently played content from other contents.

According to the embodiment, the video image of the current playback scene of the content currently in reproduction is displayed in the video area located in the center portion of the display area. Because the visibility of video images is improved at this time, the video area where the video image of the currently played scene is displayed is set larger than other video areas. This improves the visibility of video images and makes it easier for the user to recognize that a content containing the enlarged video image is selected.

Modifications of the embodiment will be described below. In case of displaying a "long caption line" entirely, caption lines are not displayed on the caption areas MA1 and MA3 other than the caption area displaying the "long caption line" in the example of the screen D43 shown in FIG. 22B, which is not restrictive, and caption lines may be displayed on the caption areas MA1, MA2.

In the case where "video images of multiple contents" are simultaneously displayed, only the title of the content currently in reproduction is displayed in the title area TA on the titled screen D71 shown in FIG. 29A, which is not restrictive, and the titles of other contents currently displayed may also be displayed in the title area TA.

Not only the title of a content currently in reproduction but also a list indicating a title TL of a content stored in the contents list data 124 preceding or succeeding the currently played content by a predetermined number may be displayed in the title area TA on the titled screen D71.

A predetermined time which is measured by the timer may be set arbitrarily by the user or may be set larger by the control unit 11 as the number of characters contained in a caption line to be displayed becomes greater.

In the "video zoom-up display mode", the user may be allowed to terminate the zoom-up display currently selected on the screen D8 in FIG. 31 and return to the display of the screen D71 in FIG. 29A.

Third Embodiment

The operation of a cell phone 1 according to a third embodiment of the invention will be described below.

During reproduction of a captioned video image, the cell phone 1 of the embodiment simultaneously displays the captioned video image and a caption list showing a plurality of caption lines. Further, when the elapse of a prescribed "caption changeover time" is detected by a timer, a caption line to be played and displayed is replaced with a caption line to be displayed in the caption list.

The replacement of the caption line is automatically executed without involving the operation by the user, and the caption line that has been displayed in the caption list before replacement is scrolled (hereinafter "auto scroll"). The user can instruct the initiation and termination of the auto scroll by operating the operational section 13.

During execution of the auto scroll, a caption line currently in reproduction is displayed in the center of the caption list. In the example of the screen D1 shown in FIG. 33, a currently reproduced caption line (caption line "Good morning" displayed in the caption area MA) is arranged in the center of the list area LA for displaying the caption list. The reason why the currently reproduced caption line is arranged in the center of the list area LA is that better visibility is provided near the center of the list area LA.

During playback of a content, according to a caption playback timing TMn stored in the caption management data 122, the cell phone 1 plays back the caption line corresponding to the caption playback timing TMn. The caption management data 122 is generated by the process in FIG. 6.

Figure 33:
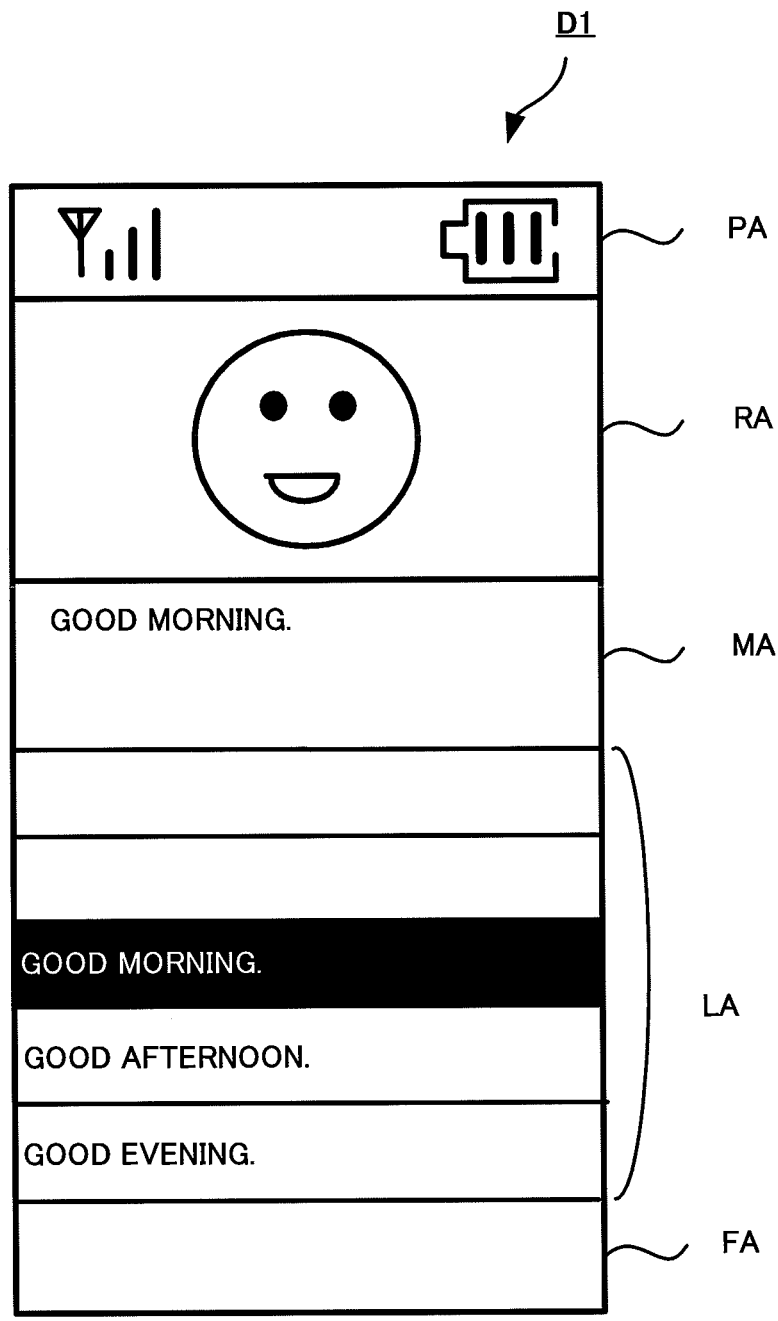
FIG. 33 is a diagram showing a screen displaying a caption list together with captioned video image in an application example 2-2.

Next, the operation of the auto scroll which is one feature of the embodiment will be described. When the user instructs the initiation of the auto scroll, the control unit 11 initiates the process shown in FIG. 34, and sets "ON" an auto scroll flag indicating whether or not to execute auto scroll (step S221). Further, the control unit 11 causes the display unit 14 to display the caption list on the display panel 5. In the example of FIG. 33, the screen D1 where the caption list is shown in the list area LA is displayed.

In this state, the user can select a caption line to start being played from caption lines in the caption list. When the user selects a caption line, the process goes to step S222 to extract a video image having the playback timing (PTS unit) corresponding to the caption playback timing TMn.

The control unit 11 extracts information on a video frame from a video PES (step S222), and returns the process to step S222 when the video frame is not an IDR frame (step S223; No).

When the video frame is an IDR frame (step S223; Yes), on the other hand, the control unit 11 acquires an elapse time from the beginning of the playback of the top video frame to the playback of the IDR frame (step S224). The elapse time is a difference obtained by subtracting the playback timing (PTS unit) of the top video image in the content-recorded data 121 from the playback timing (PTS unit) of the IDR frame.

Subsequently, the control unit 11 determines whether the extracted IDR frame may correspond to the caption line Mn currently in reproduction. For this purpose, the control unit 11 determines whether the caption playback timing TMn of the caption line Mn is greater than the currently acquired elapse time (step S225).

When the caption playback timing TMn is greater than the currently acquired elapse time (step S225; Yes), the extracted IDR frame is played back before the caption line Mn and can correspond to the caption line Mn. At this time, the control unit 11 saves the position of the data of the IDR frame (step S226), and returns the process to step S222. The position of data to be saved in step S226 is, for example, the display time of the IDR frame, the number of the video PES to store the IDR frame, an address in the storage unit 12 where the IDR frame is stored, or the like.

When the caption playback timing TMn is smaller than the currently acquired elapse time (step S225; No), the previously extracted IDR frame is played back directly before the currently played caption line Mn. The control unit 11 therefore reads a video frame from the video position stored in step S226 and displays the video frame on the display panel 5 (step S227).

The control unit 11 displays a caption line corresponding to the displayed video image in the caption area MA (step S228). Further, the control unit 11 displays the caption list in the list area (step S229). At this time, the caption line currently played is arranged near the center of the list area LA.

The control unit 11 determines whether there is an instruction from the user to terminate the auto scroll. Accordingly, the control unit 11 determines whether the auto scroll flag is "ON", and terminates the process when the flag is "OFF" (step S2210; No).

When the auto scroll flag is "ON" (step S2210; Yes), on the other hand, the control unit 11 activates the timer (not shown) to detect the elapsing of a "caption changeover time" stored in the storage unit 12.

Upon detection of the elapsing of the "caption changeover time" (step S2211; Yes), to play back a caption line to be played next, the control unit 11 acquires the caption line and a caption display time associated therewith (step S2212). Then, the process returns to step S222. This is the end of the process of automatically scrolling each caption line every time a predetermined "caption changeover time" elapses.

Application Example 3-1

In the third embodiment, each caption line displayed in the caption list is changed every time the caption changeover time, which is set to the same value regardless of the number of characters in the caption line, elapses. When a caption line contains a large number of characters, therefore, it is likely that before the user finishes reading the caption line, a next caption line is displayed. When the number of characters is small, there is a standby time to the display of a next caption line after the user finishes reading the caption line.

To avoid this problem, the "caption changeover time" should be changed according to the number of characters in a caption line. The following will describe a cell phone 1 according to an application example 3-1 which executes such an auto scroll.

The fundamental configuration of the cell phone 1 according to the application example 3-1 is the same as the configuration shown in FIG. 2, except that the storage unit 12 stores caption management data 122*a* in place of the caption management data 122 shown in FIG. 4. The caption management data 122*a* associates the caption playback timing TMn, the caption line Mn and the number of characters KZn in the caption line with one another.

Figure 36A:
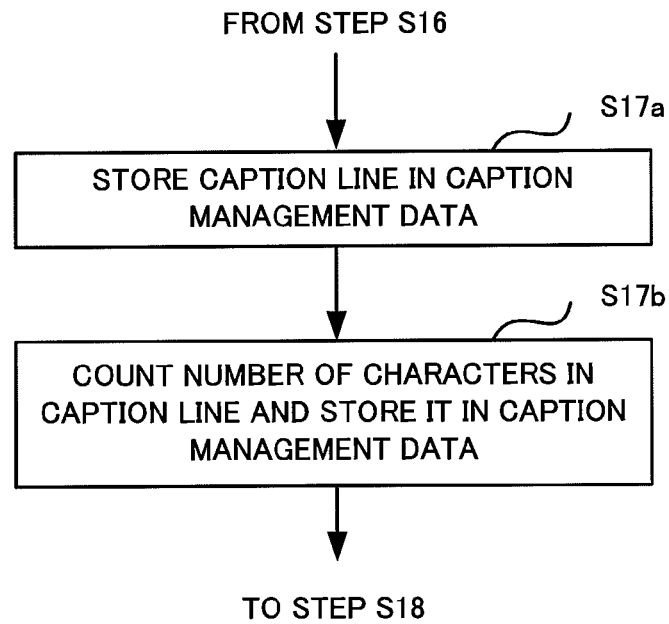
FIG. 36A is a flowchart illustrating a process of generating caption management data in an application example 3-1.

The process of generating the caption management data 122*a* is basically the same as the one exemplified in FIG. 6. In the application example 3-1, as shown in FIG. 36A, the control unit 11 executes substantially the same process as that of step S17 shown in FIG. 6 (step S17*a*), then counts the number of characters contained in the caption line (step S17*b*), and stores the number in the caption management data 122*a*.

Figure 34:
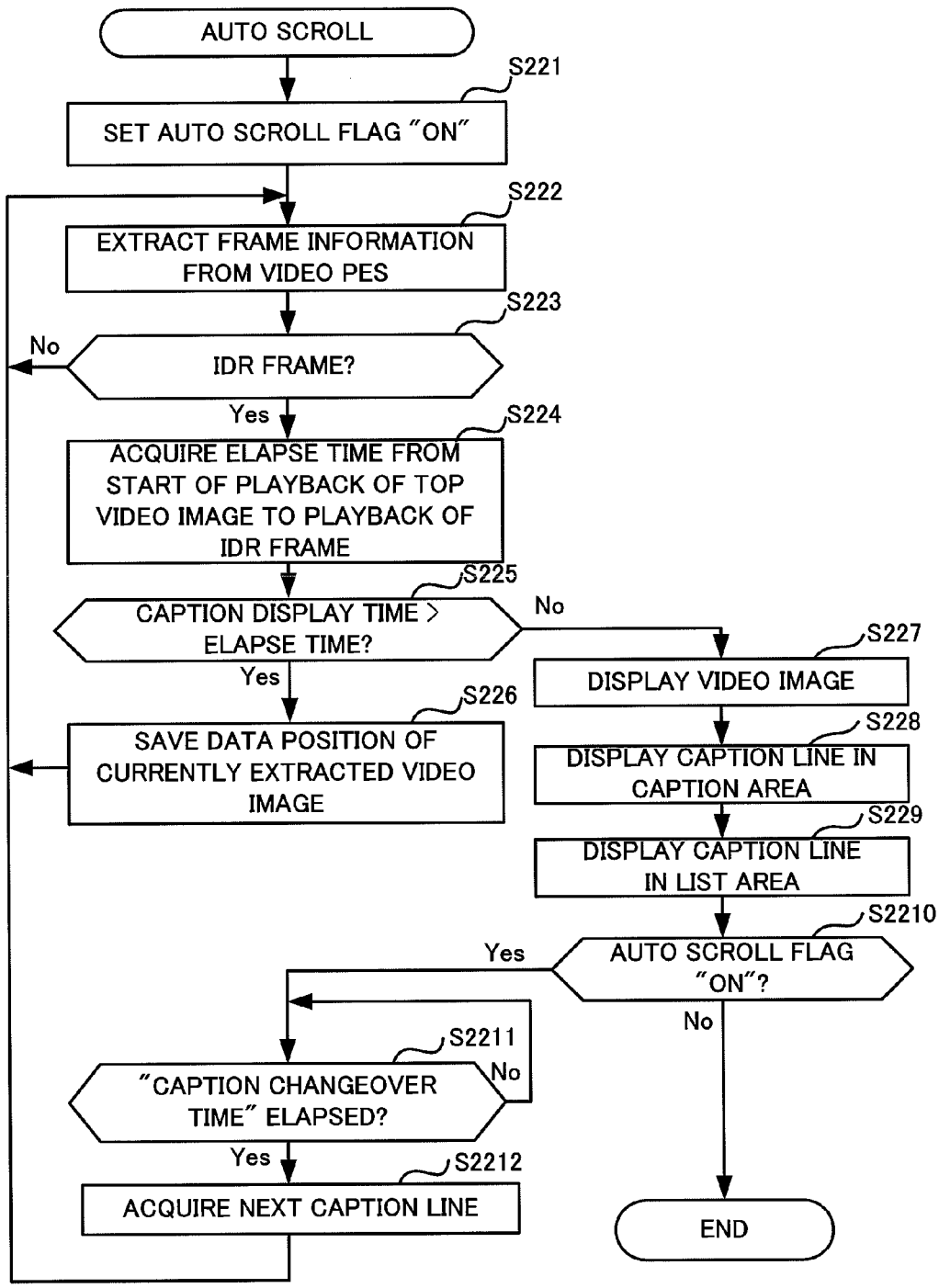
FIG. 34 is a flowchart illustrating an automatic scroll process according to a third embodiment.
Figure 36B:
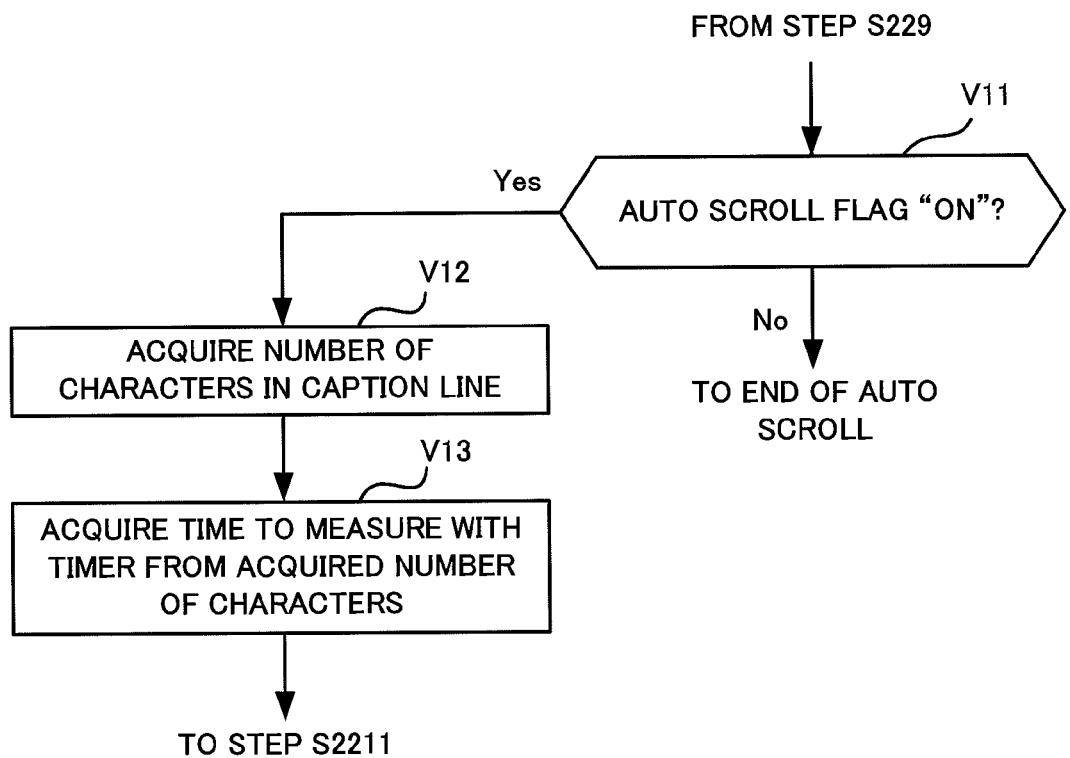
FIG. 36B is a flowchart illustrating an automatic scroll process in the application example 3-1.

The auto scroll process in the application example 3-1 is basically the same as the one exemplified in FIG. 34, except that the control unit 11 executes a process illustrated in FIG. 36B instead of the process of step S2210 shown in FIG. 34. That is, when determining that the auto scroll flag is "ON" (step V11; Yes), the control unit 11 acquires the number of characters KZn in the caption line Mn currently in reproduction from the caption management data 122*a* (step V12).

Subsequently, based on the acquired number of characters KZn, the control unit 11 acquires the "caption changeover time" according to the number of characters KZn (step V13). For example, the control unit 11 acquires the "caption changeover time" by multiplying the number of characters KZn by a prescribed display time t per character. When the display time t is 0.2 second, for example, the "caption changeover time" corresponding to a caption line containing 10 characters is 2 seconds and the "caption changeover time" for a caption line containing 20 characters is 4 seconds.

Then, the process returns to the process in FIG. 34, and upon detection of the elapse of the "caption changeover time" with the timer (step S2211; Yes), the control unit 11 acquires a next caption line (step S2212), and displays the caption line by the scroll process.

Application Example 3-2

In the third embodiment, when the number of characters KZn in the caption line Mn is small, the user may not read the caption line depending on the value of the display time t per character. When the display time t is 0.2 second, for example, a next caption line is displayed after the "caption changeover time" (0.2 second) elapses after the display of a caption line whose character number KZn is "1".

To overcome the problem, even in a case of displaying a caption line with fewer characters, the caption changeover time corresponding to the caption line should be set longer.

Accordingly, caption lines are grouped according to the number of characters in each caption line, and a "caption changeover time" suitable for reach a caption line corresponding to each group should be set group by group. For example, when the number of characters KZn is 1 to 10, the caption changeover time is set to 2 seconds, and when the number of characters KZn is 11 to 20, the caption changeover time is set to 3 seconds. The following will describe a cell phone 1 according to the application example 3-2 which executes such an auto scroll.

Figures 37A, 37B:
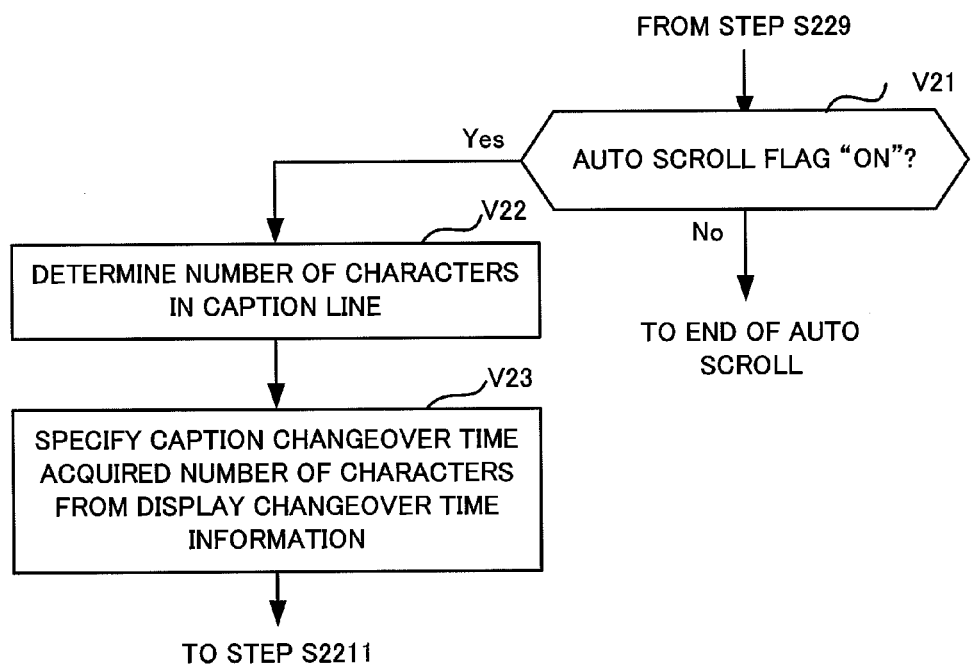
FIG. 37A is a diagram showing an example of a data structure of display changeover time information.
FIG. 37B is a flowchart illustrating an automatic scroll process in an application example 3-2.

The fundamental configuration of the cell phone 1 according to the application example 3-2 is the same as the configuration shown in FIG. 2, except that the storage unit 12 shown in FIG. 2 prestores display changeover time information 123 which associates a category KB provided according to the number of characters in a caption line, and a "caption changeover time TS" corresponding to the category KB with each other, as shown in FIG. 37A.

The auto scroll process in the application example 3-2 is basically the same as the one exemplified in FIG. 34, except that the control unit 11 in the application example 3-2 executes processes of steps V21 to V23 shown in FIG. 37B in place of step S2210 shown in FIG. 34.

That is, in the application example 3-2, substantially the same process as steps S221 to S229 shown in FIG. 34 is executed to display a captioned video image and a caption list.

Subsequently, when determining that the auto scroll flag is "ON" (step V21; Yes), the control unit 11 acquires the number of characters in the caption line (step V22). Further, referring to the display changeover time information 123, the control unit 11 reads the "caption changeover time TS" associated with the group to which the number of characters belongs (step V23).

Then, the process returns to the process in FIG. 34, and the control unit 11 acquires a next caption line (step S2212) after the "caption changeover time" elapses (step S2211; Yes), then performs the auto scroll. This is the end of the process of automatically scrolling caption lines according to the "caption changeover time" corresponding to each group provided according to the number of characters in a caption line.

In general, the time to read a caption line differs user by user. From the viewpoint of improving the user's convenience, it is desirable that each user can edit the "caption changeover time" set in each of the foregoing third embodiment and the application examples 3-1 and 3-2. An editing function of the cell phone 1 will be described below.

Figure 38A:
FIG. 38A is a diagram showing an example of a screen before displaying a sub menu.
Figure 38B:
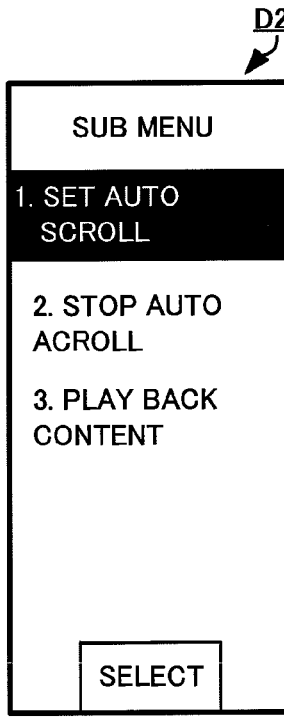
FIG. 38B is a diagram showing an example of a screen after displaying the sub menu.

According to the third embodiment and the application examples 3-1 and 3-2, during auto scroll, a screen D21 showing a captioned video image together with a caption list is displayed as exemplified in FIG. 38A. In this state, when the user depresses a soft key E1 ("sub menu") using the operational section 13, the control unit 11 displays a sub menu screen. In the example of FIG. 38B, a sub menu screen is the screen D22.

When the user selects "1. set auto scroll time" in available selections in the sub menu and presses a "Select" key, a screen for setting the time for auto scroll corresponding to the third embodiment and the application examples 3-1 and 3-2 is displayed. The following will describe the operation of setting the "caption changeover time" in the third embodiment and the application examples 3-1 and 3-2 using each time setting screen.

Figure 38C:
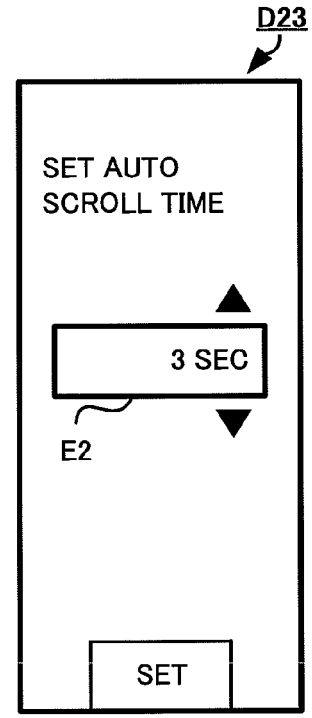
FIG. 38C is a diagram showing an example of a screen for setting a caption changeover time according to the third embodiment.

In the setting of the "caption changeover time" according to the third embodiment, the user directly changes the value of the "caption changeover time" to a value desired by the user. In the example of FIG. 38C, the user changes the value to be set for the "caption changeover time" (value shown in text box E2) using the cursor key 3 or the like to select the desired value (e.g., 3 seconds).

When the user depresses a "Set" key while the desired value is displayed, the control unit 11 stores the value as the "caption changeover time" in the storage unit 12. The value to be set for the "caption changeover time" may be directly input by the user.

In the setting of the "caption changeover time" according to the application example 3-1, the "caption changeover time" of each caption line is acquired from the product of the display time t per character and the number of characters KZn in each caption line. The display time t per character is the only parameter the user can edit to change the "caption changeover time".

Figure 38D:
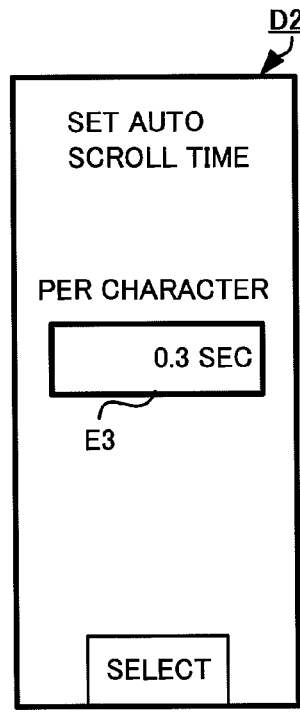
FIG. 38D is a diagram showing a first example of a screen for setting a caption changeover time according to the application example 3-1.

For this purpose, a screen D24 which allows the value to be set for the display time t (value in text box E3) to be edited is displayed as exemplified in FIG. 38D. The value to be set for the display time t may be directly input by the user or may be selected by the user changing a preset value with the cursor key 3.

Figure 38E:
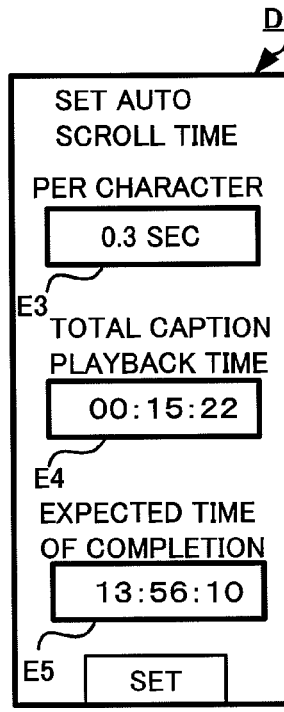
FIG. 38E is a diagram showing a second example of a screen for setting a caption changeover time according to the application example 3-2.

As shown in FIG. 38E, a total caption playback time needed to play back all the caption lines in a content (shown in a text box E4), an expected time of completion to view the content to the end (shown in a text box E5), etc. may be displayed at the same time. This provides some guide point to decide the display time per character, thus improving the convenience.

Figure 35:
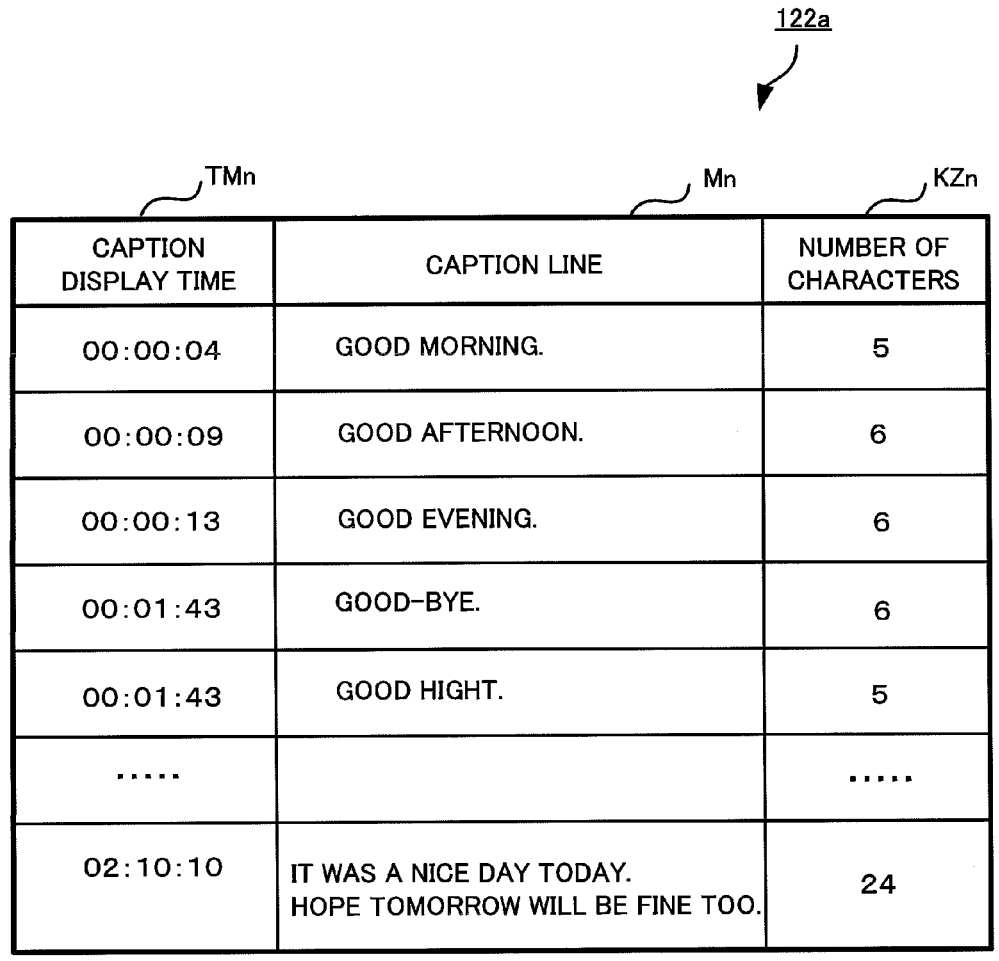
FIG. 35 is a diagram showing an example of caption management data.

To achieve the purpose, the total number of characters in the entire caption lines included in a captioned video image (hereinafter "number of entire-captions characters KZt") is acquired beforehand. The control unit 11 adds up the numbers of characters KZ1 to KZN in the caption management data 122a shown in FIG. 35, and stores the resultant number of entire-captions characters KZt in the storage unit 12.

In the example shown in FIG. 38E, when the user input "0.3 second" as the value for the display time t per character, the display time t (0.3 second)×the number of entire-captions characters KZt is displayed in the text box E4. Further, the expected time of completion obtained by adding the time shown in the text box E4 to the present time is displayed in the text box E5.

The total caption playback time (value in the text box E4) may be set editable by the user. In that case, the display time per character when auto scroll is carried out according to the value edited by the user is displayed in the text box E3. The display time is acquired by dividing the total caption playback time, edited by the user, by the number of entire-captions characters KZt. The text box E5 shows a time obtained by adding the total caption playback time edited by the user to the present time.

The expected time of completion may be set editable by the user. In that case, the total caption playback time obtained from the difference between the value (expected time of completion) edited by the user and the present time is displayed in the text box E4, and the display time t per character then is displayed in the text box E3.

In the setting of the "caption changeover time" according to the application example 3-2, the "caption changeover time TS" corresponding to each group provided according to the number of characters in a caption line is editable. The value to be set for the "caption changeover time TS" may be directly input by the user or selected from present values.

Figure 38F:
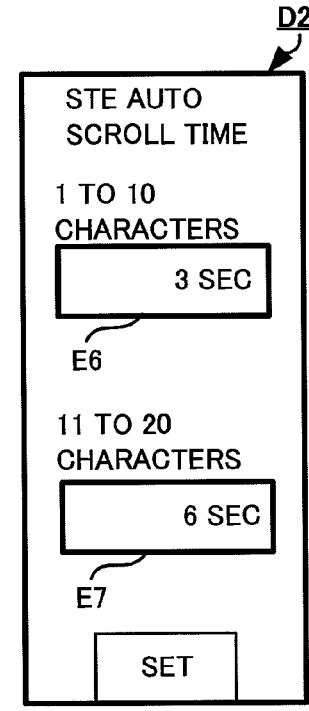
FIG. 38F is a diagram showing an example of a screen for setting a caption changeover time according to a application example 3-3.

In the example of FIG. 38F, when the user depresses the "Set" key during display of a desired value, the value is set as the "caption changeover time" in the display changeover time information 123 shown in FIG. 37A. At this time, the "caption changeover time" corresponding to a caption line which contains 1 to 10 characters is set to 3 seconds, and the "caption changeover time" corresponding to a caption line which contains 11 to 20 characters is set to 6 seconds.

Application Example 3-3

In the third embodiment and the application examples 3-1 and 3-2, the user cannot grasp when the display of the caption line the user is currently reading is changed to the display of a next caption line. In this case, it is difficult for the user to adjust the speed of reading a caption line according to the timing of switching the display of the caption line.

To avoid the problem, the time remaining to the switching of the display of a caption line from the current point of time should be displayed. The following will describe a cell phone 1 according to an application example 3-3 which displays such a remaining time.

In the application example 3-3, the time remaining until a current caption line is changed to a next caption line is acquired. For example, the remaining time is the difference between the "caption changeover time" and the time measured by the timer. During execution of auto scroll, the remaining time is displayed on the display panel 5.

The mode for showing the remaining time is optional. When the remaining time is shown by text, for example, the remaining time may be given by a message informing the user of the remaining time (e.g., "2 seconds to the next caption line") or the like.

When the remaining time is shown by an icon, the remaining time may be given by an icon representing an analog clock. In this case, when the remaining time indicated by the icon becomes zero, the caption display may be switched to a next caption line.

Further, the color of a caption line which is being played back may be changed according to the passing of the time measured by the timer. For example, a caption line may be displayed in blue at the beginning of the playback of the caption line, and may be displayed in red before it is changed over to a next caption line.

When the display of a caption line is switched, the control unit 11 may inform the user of that event by outputting an alarm or by vibration. This allows the user to recognize that the caption line has been changed, thus improving the user's convenience.

Application Example 3-4

In the embodiment, with regard to a video image being displayed, the user cannot know the timing of playing back a video image during recording of a content.

An application example 3-4 is designed to display the display time of a video image currently in reproduction in the total playback time in the content-recorded data 121 (hereinafter "total playback time TT"), thereby improving the user's convenience.

Figure 40:
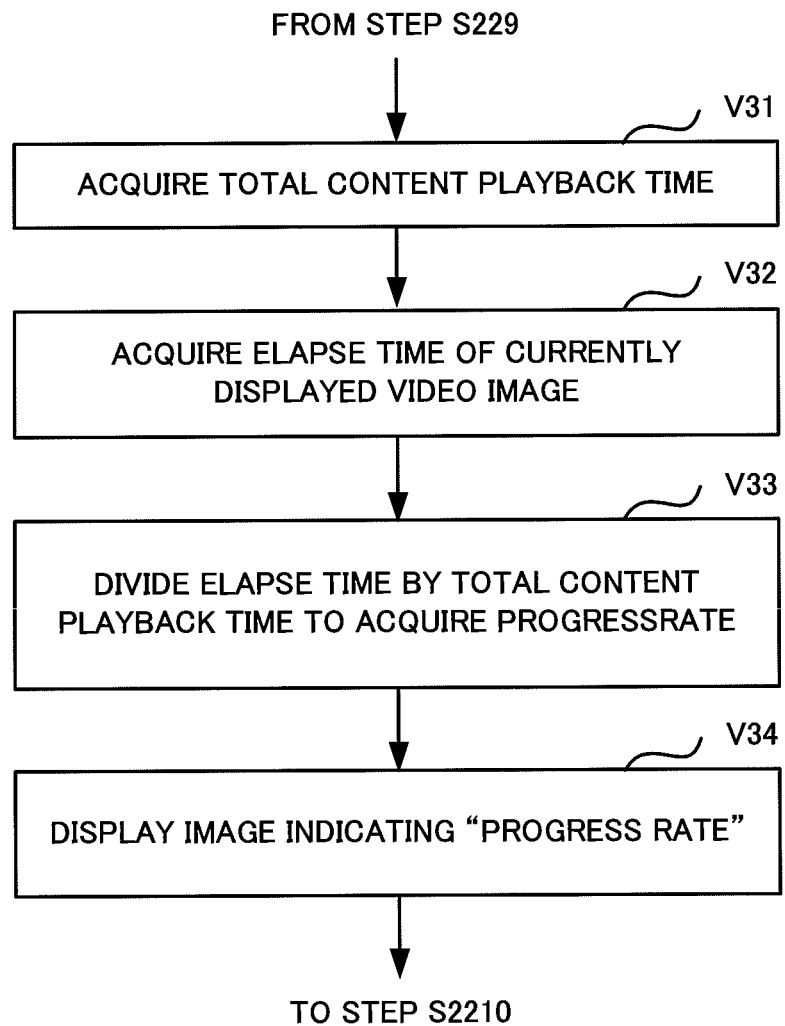
FIG. 40 is a flowchart illustrating an automatic scroll process in the application example 3-1.

The auto scroll process of the application example 3-4 is basically the same as the one shown in FIG. 34, except that in the application example 3-4, the control unit 11 executes the process of step S229 in FIG. 34, and then executes processes of steps V31 to V34 shown in FIG. 40 before executing the process of step S2210.

Specifically, after displaying a captioned video image and a caption list (steps S221 to S229 in FIG. 34), the control unit 11 acquires the total playback time TT relating to the content-recorded data 121 which is currently displayed (step V31). The total playback time TT can be acquired by, for example, associating the total playback time TT with the content-recorded data 121 as an attribute of a file storing a recorded content, beforehand.

Subsequently, the elapse time of the video image currently displayed, which is stored in step S226 in FIG. 34 (step V32), the elapse time is divided by the total playback time TT to acquire a ratio of the elapse time to the total playback time (hereinafter "progress rate") (step V33). Further, an image indicating the progress rate is displayed on the display panel 5 (step V34).

The mode for showing the progress rate is optional, and may be shown by an image or by text. As one example of image-based display, a total bar B1 (e.g., horizontal bar) representing the total playback time and a ratio bar B2 indicating the progress rate are displayed one above the other. For example, when the size of the total bar B1 is set to 200 pixels, the size of the ratio bar B2 is 200 pixels×10%=20 pixels when the progress rate is 10%.

Figure 39A:
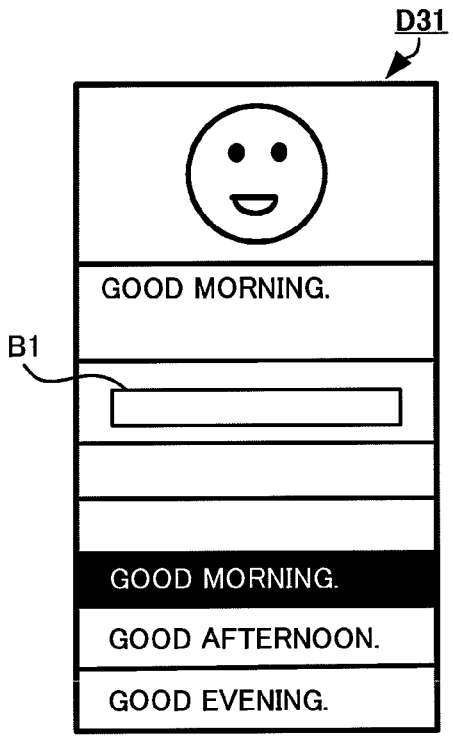
FIG. 39A is a diagram showing a first example of the screen according to the application example 3-1.

In the example of FIG. 39A, as a top caption line (caption display time "00:00:00") and a video image corresponding to the caption line are being displayed, the progress rate RT is 0. At this time, only the total bar B1 is displayed.

Figure 39B:
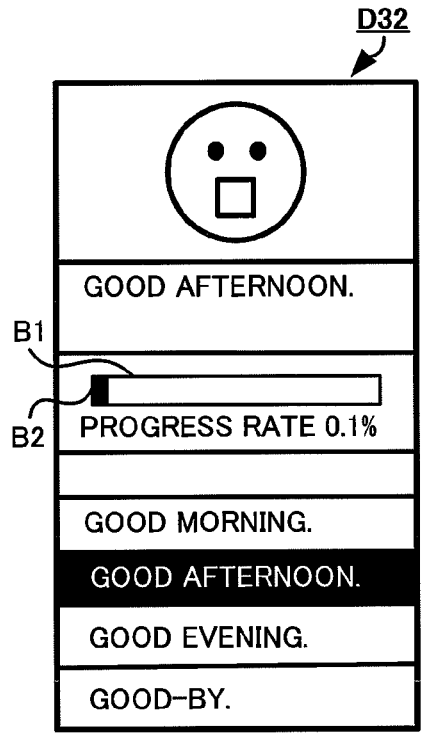
FIG. 39B is a diagram showing a second example of the screen according to the application example 3-1.

In the example of FIG. 39B, a second caption line from the top in the caption management data 122 shown in FIG. 4 is being displayed. At this time, the ratio bar B2 indicating the progress rate which is determined based on the display time of the video image (00:00:09) is displayed above (on) the total bar B1.

In the example of the display method in FIG. 39B, the user can grasp the progress rate at a present time, but cannot obtain information on the time represented by the unit of hour, minute and second or the like.

Figure 39C:
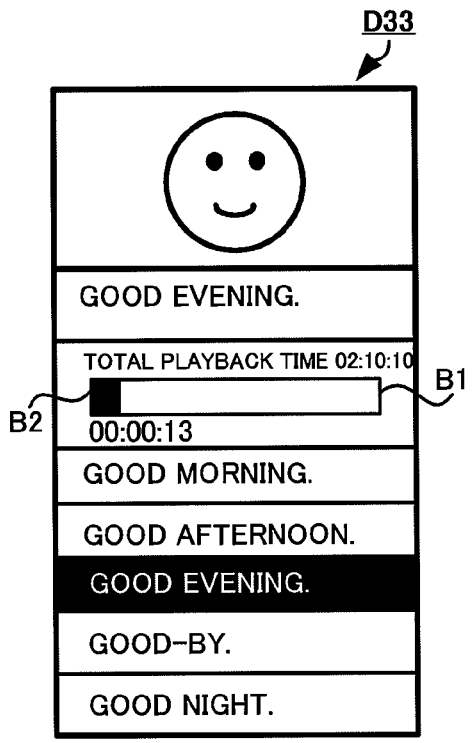
FIG. 39C is a diagram showing a third example of the screen according to the application example 3-1.

To avoid the problem, as exemplified in FIG. 39C, the total playback time TT corresponding to the total bar B1, the display time of a video image currently in reproduction which corresponds to the ratio bar B2, etc. may be displayed. This allows the use to obtain information on the time needed to play back the remaining portion of the currently viewed content, and the playback time of the content viewing of which has been completed currently, thus further improving the convenience.

Figure 39D:
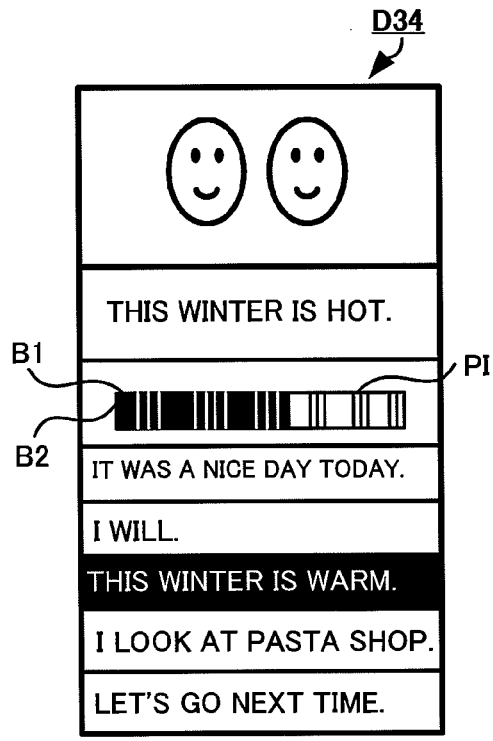
FIG. 39D is a diagram showing an fourth example of the screen according to the application example 3-1.

As exemplified in FIG. 39D, the progress rate of each caption line may be displayed at a corresponding position in the total bar B1 with an image PI indicating the presence of each caption line. Accordingly, the user can grasp that a caption line is displayed when the end of the ratio bar B2 reaches the image PI according to the execution of auto scroll.

In addition, a caption-less part in a recorded program can be grasped at a glance. When a recorded program is a drama, for example, there are no captions in scenes during the opening theme, or ending theme or during commercial. When there is a user who wants to view just the opening, however, it is apparent that a caption-less part near the top of the program is the opening part, so that the user can view the opening by playing back the program without fast forwarding that part.

In the modification shown in FIG. 39D, the progress rate RTn is acquired for each caption line Mn, and caption management data 122b having each progress rate associated with each caption line is stored in the storage unit 12. In the example of the caption management data 122b shown in FIG. 41, because the caption playback time t1 of the top caption line M1 is 00:00:00, the progress rate RT1 is "0". The progress rate may be acquired beforehand before playing back a content or may be acquired during playback of a content and temporarily stored in the storage unit 12.

When auto scroll is executed in the modification, each progress rate RTn is acquired from the caption management data 122b and the image PI is displayed at a position on the total bar B1 which corresponds to each progress rate in step V34 shown in FIG. 40. It is desirable that the image PI should be displayed in a color different from the color of each bar so that it can be distinguished even if the total bar B1 and the ratio bar B2 are displayed overlying each other.

Application Example 3-5

In the embodiment, when the user selects a top caption line in the content-recorded data 121 from the caption list, playback starts from the top caption line and a video image having a playback timing associated with the caption line.

Even when a content contains a video frame which is played back before an IDR frame corresponding to the top caption line is played back, such a video frame is not reproduced. When the top caption line is displayed three minutes after the playback of the content has started, video images are not played back until then.

The problem can be overcome by associating a pseudo caption line (hereinafter "temporary caption line") with the playback timing of the top video frame and playing back the content starting from the temporary caption line. The following will describe a cell phone 1 according to an application example 3-5 which executes such an operation.

The fundamental configuration of the cell phone 1 according to the application example 3-5 is the same as the configuration shown in FIG. 2, except that the storage unit 12 stores caption management data 122c shown in FIG. 42 instead of the caption management data 122 shown in FIG. 4. A caption line in the caption management data 122c additionally includes a temporary caption line which is not included in the content-recorded data 121, in addition to the caption lines Mn extracted from the content-recorded data 121.

In FIG. 42, "(top of program)" is newly added and a caption line indicating the content is a temporary caption line KM. A caption display time TMn is set to "00:00:00" so that this temporary caption line KM is associated with the top IDR frame in the content-recorded data 121. The storage of the temporary caption line in the caption management data 122c should be carried out at the time as a caption line Mn is extracted from the caption PES.

Further, the temporary caption line may be added during execution of an application for playing back a content when caption management data 122 shown in FIG. 4 is mapped in the work memory to display the caption line Mn.

Figure 44:
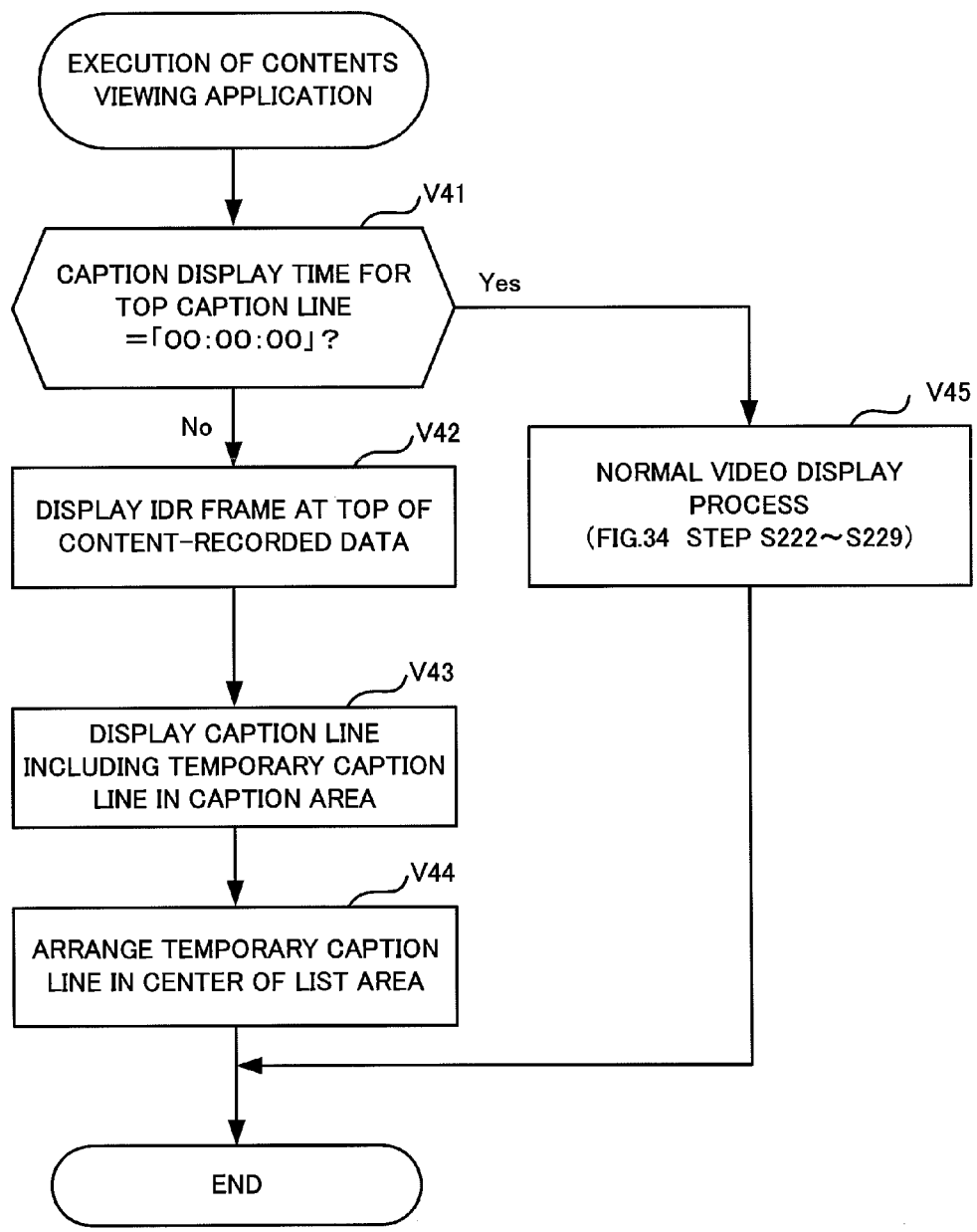
FIG. 44 is a flowchart illustrating a process of displaying a temporary caption line corresponding to a top video image in the application example 3-2.

A process for displaying a top video image in a content without changing the content of the caption management data 122 will be described below. When the user instructs execution of an application for viewing a content, as shown in FIG. 44, the control unit 11 determines whether the top caption line corresponds to the top video frame (step V41).

At this time, the control unit 11 refers to the caption management data 122 to determine whether the caption display time of the top caption line is "00:00:00", and when it is "00:00:00" (step V41; Yes), the process goes to step V45. The normal video display process in step V45 is substantially the same as processes in steps S222 to S229 shown in FIG. 34.

Figure 43A:
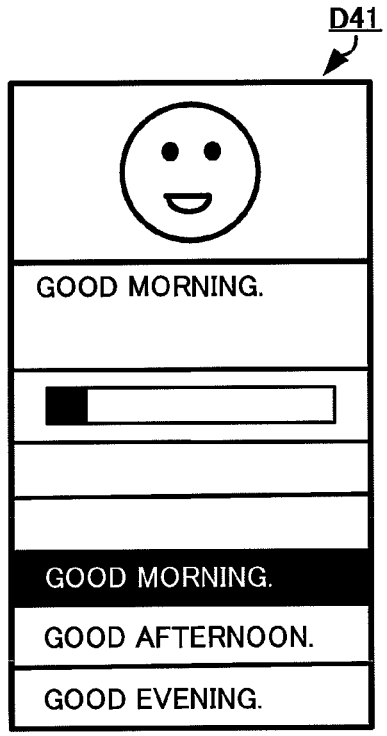
FIG. 43A is a diagram showing an example of a screen when playing back a content whose top video image does not correspond to a top caption line.
Figure 43B:
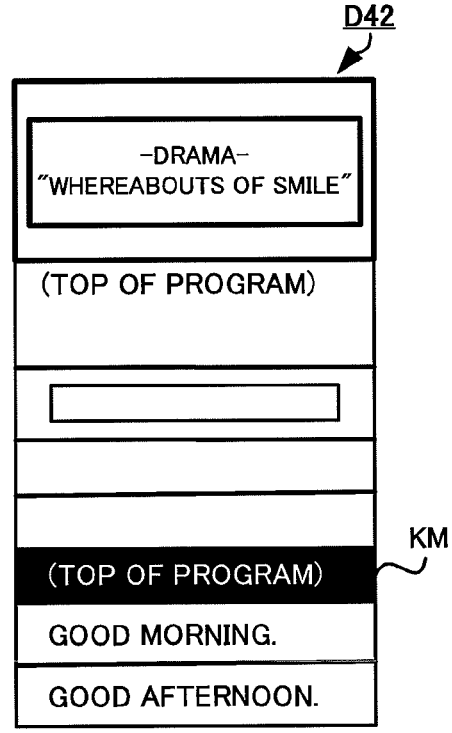
FIG. 43B is a diagram showing an example of a screen when playing back a content with a top video image made to correspond to a temporary caption line.

When the caption display time of the top caption line is not "00:00:00" (step V41; No), the IDR frame at the top of the content-recorded data 121 is displayed (step V42). Further, the temporary caption line KM corresponding to the IDR frame is displayed in the caption area MA (step V43), and a caption list where the temporary caption line KM currently displayed is positioned in the center is displayed in the list area LA (step V44). The processes of steps V42 to V44 causes a screen D42 exemplified in FIG. 43B to be displayed.

Figure 45:
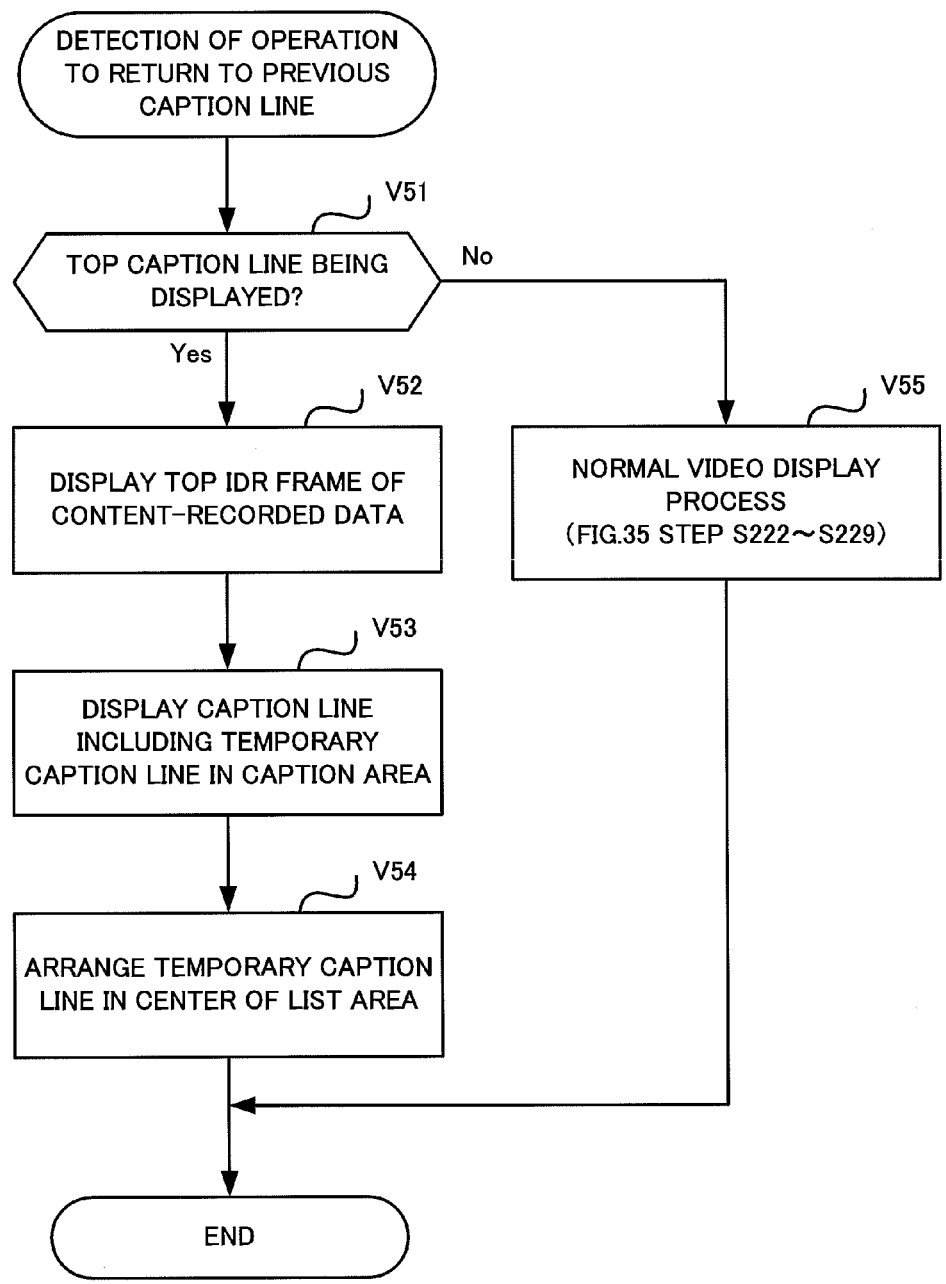
FIG. 45 is a flowchart illustrating a process of displaying a caption line preceding the currently displayed caption line by one in the application example 3-2.

In the application example 3-5, as shown in FIG. 45, when the user instructs to display a caption line preceding the caption line currently displayed by one in place of the currently displayed caption line, it is determined whether the currently displayed caption line is the top one. This instruction can be given as the user depresses the cursor key 3 upward or so.

When the currently displayed caption line is not the top caption line (step V51; No), the process goes to step V55. The process of step V55 is substantially the same as the processes of steps S222 to S229 shown in FIG. 34.

When the currently displayed caption line is the top caption line (step V51; Yes), on the other hand, the processes of steps V52 to V54 are performed. The processes of steps V52 to V54 are substantially the same as the processes of steps V42 to V44 shown in FIG. 44.

Figure 43C:
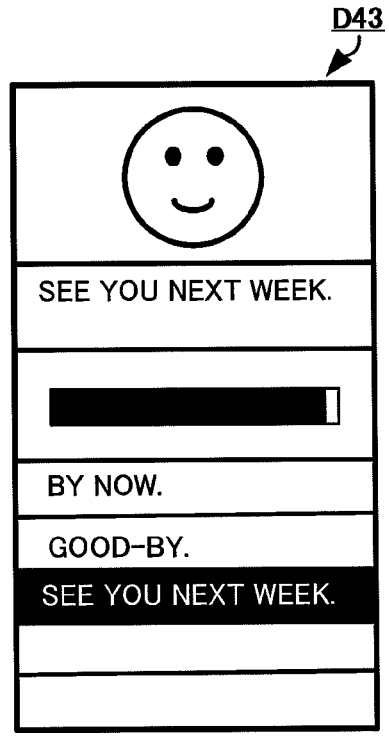
FIG. 43C is a diagram showing an example of a screen when playing back a content whose last video image does not correspond to a last caption line.
Figure 43D:
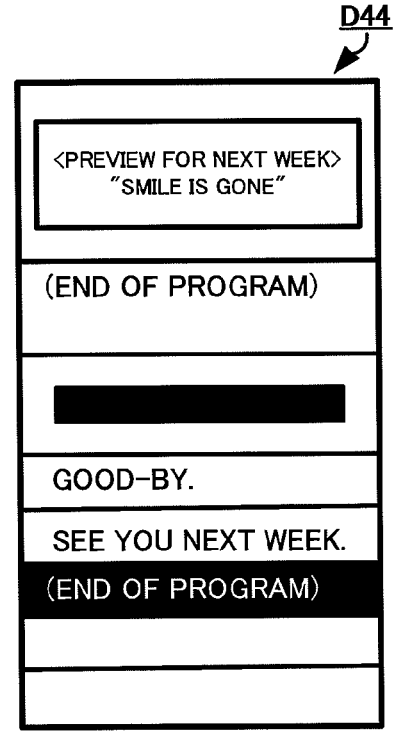
FIG. 43D is a diagram showing an example of a screen when playing back a content with a last video image made to correspond to a temporary caption line.

The association of a temporary caption line with a video image is not limited to a case where the top caption line is not associated with the top video image. The association is likewise applicable to a case where the last caption line in a content is not associated with the last video image. When the last caption line in a content is not associated with the last video image, the last video image is not displayed, so that the screen D43 exemplified in FIG. 43C is displayed. When a temporary caption line is associated with the last video image and is displayed, a screen D44 exemplified in FIG. 43D is displayed.

According to the third embodiment, as explained above, every time a predetermined "caption changeover time" elapses, a next caption line is played back instead of the caption line currently in reproduction, and the caption list is automatically scrolled. Accordingly, the user does not need to display a caption line by operating the cursor key 3 or the like, thus improving the user's convenience.

According to the application example 3-1, the caption list is automatically scrolled according to the "caption changeover time" which is obtained by multiplying the "display time t per character" by the number of characters KZn in a caption line. Accordingly, as the number of characters in a caption line becomes greater, the time for displaying the caption line becomes longer, thus improving the user's convenience.

According to the application example 3-2, a caption line is grouped according to the number of characters, and the caption list is automatically scrolled according to the "caption changeover time" corresponding to the grouping. Even when there is a small number of characters in a caption line currently displayed, the caption line is displayed according to the same "caption changeover time" as set for a caption line which contains the largest number of characters in the group, making the time for the user to read the caption line.

According to the embodiments of the present invention, the "caption changeover time" can be edited by the user. Accordingly, the user can change the display of a caption line according to the user's preference.

In the application example 3-3, the time remaining until the caption display is changed to the display of a next caption line is displayed on the display panel 5. This can allow the user to adjust the speed of reading a caption line according to the timing of changing from the display of the caption line currently displayed to the display of a next caption line.

According to the application example 3-4, during playback of a content, the degree of completion of playback of the content up to the current point to the total playback time of the content-recorded data 121 is given to the user. With the displayed information, therefore, user can determine whether or not to continue viewing a content.

Further, the total playback time, the display time of a video image currently displayed, etc. are displayed. This can allow the user to grasp the time needed to complete the playback of an unplayed part of the content currently viewed, the viewing time from the beginning of the playback of the content to the present time, and so forth.

According to the application example 3-5, when the top caption line in a content is not associated with the top video image, a temporary caption line KM is associated with the playback timing of the top video image. Then, playback of caption lines is started from the temporary caption line KM. This permits the user to view the top video image, thus leading to an improvement on the user's convenience.

The ON/OFF of the display of a caption list may be set editable by the user. In this case, auto scroll should be started when a caption line is selected from the caption list after the display of the caption list is enabled from the disabled state.

According to the application example 3-5, the content of the temporary caption line is not limited to a sequence of characters of "(top of program)", and may be another sequence of characters or blank. A video image to be associated with a temporary caption line is not limited to the top video image in a content, and may be any video image as long as it is played before a video image corresponding to the caption display time of the top caption line. For example, the temporary caption line may be the IDR frame of the top of a program or a P frame near the IDR frame.

The conception of the present invention is not limited to a dedicated computer system, and may be adaptable to any portable electronic device having a contents recording/reproducing function, such as a PDA, electronic camera, electronic wrist watch, portable TV or car navigation system. That is, a computer program which permits a computer to function and operate as the cell phone 1 may be created, distributed, lent, or installed in a computer so that the computer may be used as the cell phone 1, or transferred or lent to someone or some entity.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A method for providing captioned video playback, comprising:

storing, in a storage unit, a caption signal defining a plurality of caption lines and a video signal defining a plurality of video images in association with a playback timing;

selecting, by a caption select unit, one of the plurality of caption lines defined by the caption signal stored in the storage unit;

playing back, by a caption playback unit, the caption line selected by the caption select unit;

playing back, by a video playback unit, the video signal stored in the storage unit;

changing, by a mode changeover unit, between a caption view mode for playing back a caption line selected by the caption select unit and a video image corresponding to the caption line using the caption playback unit and the video playback unit, and a normal view mode for playing back a video image using the video playback unit;

providing, by a notifying unit, notification of a remaining time until the play back caption line is switched; and obtaining, by a remaining time display unit includes in a caption changeover unit, a remaining time until changing over displayed caption lines by obtaining a difference between the predetermined time and time counted by a timer unit and displaying the obtained remaining time, and controlling the caption playback unit to change over caption lines when the remaining time becomes zero, wherein the video playback unit includes:

a caption playback timing determining unit which determines said playback timing of said caption line selected by the caption select unit;

a video playback start timing determining unit which determines a playback start timing of the video signal corresponding to the playback timing of the caption line determined by the caption playback timing determining unit;

a difference calculating unit which acquires a difference between the playback timing of the caption line determined by the caption playback timing determining unit and the video playback start timing determined by the video playback start timing determining unit;

a difference determining unit which determines whether the difference acquired by the difference calculating unit is equal to or greater than a predetermined value; and a unit which displays a predetermined image in place of a video image defined by the video signal stored in the storage unit when the difference determining unit determines that the difference is equal to or greater than the predetermined value.

2. The captioned video playback apparatus according to claim 1, wherein the video signal includes an independent frame defining a video image alone and a frame defining a video image by referring to another video frame, and the video playback unit includes a unit which sets a top of a video image to be played back in an independent frame immediately preceding a playback timing of the caption line selected by the caption select unit when the mode changeover unit changes an operation mode from the caption view mode to the normal view mode.

3. The captioned video playback apparatus according to claim 1, wherein the video signal includes an independent frame defining a video image alone and a frame defining a video image by referring to another video frame, and the video playback unit includes:

a video playback timing determining unit which determines a playback timing of a video image currently played by the video playback unit; and a unit which sets an operation mode to the caption view mode with a caption line having a playback timing immediately following the playback timing determined by the video playback timing determining unit being a selected state when the mode changeover unit changes the operation mode from the normal view mode to the caption view mode.

4. The captioned video playback apparatus according to claim 1, wherein the caption select unit includes a list display unit which displays a list of caption lines to be selected, and a unit which selects an arbitrary caption line from the displayed list, whereby in the caption view mode, a video image played back by the video playback unit, a caption line played back by the caption playback unit and the list displayed by the list display unit are displayed on a screen.

5. The captioned video playback apparatus according to claim 1, wherein in the normal view mode, a video image played back by the video playback unit, and a caption line played back by the caption playback unit are displayed on a screen.

6. The captioned video playback apparatus according to claim 1, wherein the caption select unit selects at least two caption lines from a plurality of caption lines defined by the caption signal stored in the storage unit, the caption playback unit plays back a plurality of caption lines selected by the caption select unit, and the video playback unit plays back a video image, from the video images defined by the video signal stored in the storage unit, which is provided with a playback timing corresponding to a playback timing given to one of the caption lines played back by the caption playback unit.

7. The captioned video playback apparatus according to claim 6, wherein the caption select unit includes a unit which selects a caption line provided with a playback timing preceding or following the playback timing of each caption line currently in reproduction by a predetermined timing, the caption playback unit displays each caption line selected by the selecting unit in place of each caption line currently in reproduction, and the video playback unit displays a video image corresponding to a playback timing of each caption line newly displayed every time a caption line to be played back by the caption playback unit is changed.

8. The captioned video playback apparatus according to claim 7, wherein the caption playback instructing unit instructs to play back each caption line provided with a playback timing preceding or following a playback timing given to each caption line currently in reproduction by one.

9. The captioned video playback apparatus according to claim 6, further comprising:

a display unit having a display area for displaying data; and an area securing unit which secures each caption area for displaying each caption line on the display area and a video area for displaying each video image corresponding to a playback timing of each caption line displayed on the display area.

10. The captioned video playback apparatus according to claim 9, wherein the area securing unit includes:

a playback character number determining unit which determines a number of characters contained in each caption line currently in reproduction; and a caption area size specifying unit which acquires a size of each caption area so as to display a number of characters determined by the playback character number determining unit, whereby each caption area with a size acquired by the caption area size specifying unit is secured from the display area.

11. The captioned video playback apparatus according to claim 10, wherein the area securing unit further includes:

a display character number determining unit which determines a number of characters in each caption line displayable on each caption area;

a character number determining unit which determines whether the number determined by the playback character number determining unit is greater than the number determined by the display character number determining unit; and a size specifying instruction unit which instructs the caption area size specifying unit to acquire a size of each caption area in response to a user's operation when the character number determining unit determines that the number determined by the playback character number determining unit is greater.

12. The captioned video playback apparatus according to claim 10, wherein the area securing unit secures each caption area in such a way that each caption area and each video area do not overlie each other.

13. The captioned video playback apparatus according to claim 10, wherein the area securing unit includes a notifying unit to notify the user that each caption line is not entirely displayed on the each caption area, whereby the user is notified until securing the caption area is completed.

14. The captioned video playback apparatus according to claim 9, wherein the area securing unit includes:
- a video size determining unit which determines a size of each video image defined by the video signal; and
- a video area number determining unit which determines a number of video areas for displaying video images based on the size of each video image determined by the video size determining unit, whereby
- video areas whose quantity is determined by the video area number determining unit and caption areas equal in number to the video areas are secured on the display area.

15. A non-transitory recording medium recording a computer program for allowing a computer to function as:
- a storage unit that stores a caption signal defining a plurality of caption lines and a video signal defining a plurality of video images in association with a playback timing;
- a caption select unit that selects one of the plurality of caption lines defined by the caption signal stored in the storage unit;
- a caption playback unit that plays back the caption line selected by the caption select unit;
- a video playback unit that plays back the video signal stored in the storage unit;
- a mode changeover unit that changes between a caption view mode for playing back a caption line selected by the caption select unit and a video image corresponding to the caption line using the caption playback unit and the video playback unit, and a normal view mode for playing back a video image using the video playback unit;
- a notifying unit that notifies a remaining time until the play back caption line is switched; and
- a caption changeover unit that includes a remaining time display unit which obtains the remaining time until changing over displayed caption lines by obtaining a difference between the predetermined time and time counted by a timer unit and displays the obtained remaining time, and controls the caption playback unit to change over caption lines when the remaining time becomes zero,
- wherein the video playback unit includes:
  - a caption playback timing determining unit which determines said playback timing of said caption line selected by the caption select unit;
  - a video playback start timing determining unit which determines a playback start timing of the video signal corresponding to the playback timing of the caption line determined by the caption playback timing determining unit;
  - a difference calculating unit which acquires a difference between the playback timing of the caption line determined by the caption playback timing determining unit and the video playback start timing determined by the video playback start timing determining unit;
  - a difference determining unit which determines whether the difference acquired by the difference calculating unit is equal to or greater than a predetermined value; and
  - a unit which displays a predetermined image in place of a video image defined by said video signal stored in the storage unit when the difference determining unit determines that the difference is equal to or greater than the predetermined value.

16. A captioned video playback apparatus comprising:
- a storage unit that stores a caption signal defining a plurality of caption lines and a video signal defining a plurality of video images in association with a playback timing;
- a caption select unit that selects one of the plurality of caption lines defined by the caption signal stored in the storage unit;
- a caption playback unit that plays back the caption line selected by the caption select unit;
- a video playback unit that plays back the video signal stored in the storage unit;
- a mode changeover unit that changes between a caption view mode for playing back a caption line selected by the caption select unit and a video image corresponding to the caption line using the caption playback unit and the video playback unit, and a normal view mode for playing back a video image using the video playback unit;
- a notifying unit that notifies a remaining time until the play back caption line is switched; and
- a caption changeover unit that includes a remaining time display unit which obtains the remaining time until changing over displayed caption lines by obtaining a difference between the predetermined time and time counted by a timer unit and displays the obtained remaining time, and controls the caption playback unit to change over caption lines when the remaining time becomes zero,
- wherein the video playback unit includes:
  - a caption playback timing determining unit which determines said playback timing of said caption line selected by the caption select unit;
  - a video playback start timing determining unit which determines a playback start timing of the video signal corresponding to the playback timing of the caption line determined by the caption playback timing determining unit;
  - a difference calculating unit which acquires a difference between the playback timing of the caption line determined by the caption playback timing determining unit and the video playback start timing determined by the video playback start timing determining unit;
  - a difference determining unit which determines whether the difference acquired by the difference calculating unit is equal to or greater than a predetermined value; and
  - a unit which displays a predetermined image in place of a video image defined by said video signal stored in the storage unit when the difference determining unit determines that the difference is equal to or greater than the predetermined value.

\* \* \* \* \*